US010314032B2

(12) United States Patent
Yang et al.

(10) Patent No.: US 10,314,032 B2
(45) Date of Patent: Jun. 4, 2019

(54) METHOD AND BASE STATION IDENTIFYING PUCCH FOR PROCESSING FEEDBACK OF USER EQUIPMENT

(71) Applicant: HUAWEI TECHNOLOGIES CO., LTD., Shenzhen (CN)

(72) Inventors: Anquan Yang, Chengdu (CN); Wei Li, Toronto (CA); Zhoujian Lai, Istanbul (TR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 15/221,929

(22) Filed: Jul. 28, 2016

(65) Prior Publication Data

US 2016/0338044 A1 Nov. 17, 2016

Related U.S. Application Data

(63) Continuation of application No. PCT/CN2014/071809, filed on Jan. 29, 2014.

(51) Int. Cl.
*H04L 1/18* (2006.01)
*H04L 5/00* (2006.01)
(Continued)

(52) U.S. Cl.
CPC ....... *H04W 72/0426* (2013.01); *H04L 1/1816* (2013.01); *H04L 5/0055* (2013.01);
(Continued)

(58) Field of Classification Search
CPC .............................................. H04W 72/0426
See application file for complete search history.

(56) References Cited

U.S. PATENT DOCUMENTS

2013/0083709 A1* 4/2013 Ahn ...................... H04L 1/1607
370/280
2013/0182676 A1* 7/2013 Lee ...................... H04L 1/0027
370/329
(Continued)

FOREIGN PATENT DOCUMENTS

| CN | 102170339 | 8/2011 |
| CN | 102469599 | 5/2012 |

(Continued)

OTHER PUBLICATIONS

International Search Report, dated Oct. 29, 2014, in International Application No. PCT/CN2014/071809 (14 pp.).

(Continued)

*Primary Examiner* — Jason E Mattis
*Assistant Examiner* — Hong Shao
(74) *Attorney, Agent, or Firm* — Staas & Halsey LLP

(57) ABSTRACT

The present invention provides a data transmission method and system, and a device. The method includes: sending, by a secondary base station, an identifier of a first physical uplink control channel PUCCH code channel resource to a primary base station at a first moment, the primary base station determines to receive, by using the first PUCCH code channel resource, a feedback that is on a first data block; sending, by the secondary base station, the identifier of the first PUCCH code channel resource and the first data block to the UE at a second moment; and receiving, by the secondary base station, the feedback from the primary base station, where the feedback is received by the primary base station from the UE by using the first PUCCH code channel resource.

24 Claims, 28 Drawing Sheets

(51) Int. Cl.
*H04W 72/04* (2009.01)
*H04W 84/04* (2009.01)

(52) U.S. Cl.
CPC ....... *H04L 5/0091* (2013.01); *H04W 72/0406* (2013.01); *H04W 84/045* (2013.01)

(56) References Cited

U.S. PATENT DOCUMENTS

| | | | | |
|---|---|---|---|---|
| 2013/0322372 A1* | 12/2013 | Kim | ...... | H04W 16/14 370/329 |
| 2014/0036737 A1* | 2/2014 | Ekpenyong | ...... | H04W 8/245 370/280 |
| 2014/0078989 A1* | 3/2014 | Guo | ...... | H04W 72/0426 370/329 |
| 2014/0133474 A1* | 5/2014 | Damnjanovic | ...... | H04W 52/30 370/336 |
| 2014/0192775 A1* | 7/2014 | Li | ...... | H04W 36/0072 370/331 |
| 2014/0269575 A1* | 9/2014 | Zhang | ...... | H04W 72/042 370/329 |
| 2014/0293947 A1* | 10/2014 | Nishikawa | ...... | H04W 72/1257 370/329 |
| 2014/0328182 A1* | 11/2014 | Gao | ...... | H04W 28/08 370/236 |
| 2015/0016365 A1* | 1/2015 | Szufarska | ...... | H04W 72/0426 370/329 |
| 2015/0036604 A1* | 2/2015 | Park | ...... | H04L 5/0037 370/329 |
| 2015/0092750 A1* | 4/2015 | Huang | ...... | H04W 36/08 370/331 |
| 2015/0124725 A1* | 5/2015 | Oizumi | ...... | H04W 72/04 370/329 |
| 2015/0365207 A1* | 12/2015 | Lan | ...... | H04W 72/0426 370/329 |
| 2016/0014647 A1* | 1/2016 | Yi | ...... | H04W 36/0072 370/331 |
| 2016/0021581 A1* | 1/2016 | Deenoo | ...... | H04W 48/16 370/331 |
| 2016/0050652 A1* | 2/2016 | Wu | ...... | H04L 5/001 370/329 |
| 2016/0050706 A1* | 2/2016 | Zhang | ...... | H04W 4/70 370/280 |

FOREIGN PATENT DOCUMENTS

| | | |
|---|---|---|
| CN | 102469610 | 5/2012 |
| CN | 103139911 | 6/2013 |
| CN | 103188792 | 7/2013 |
| CN | 103517355 | 1/2014 |
| EP | 2584730 A2 | 4/2013 |
| EP | 2670202 | 12/2013 |
| JP | 2013-102398 | 5/2013 |
| WO | WO2013/075738 | 5/2013 |
| WO | 2013/179540 A1 | 12/2013 |

OTHER PUBLICATIONS

Office Action, dated Oct. 19, 2016, in Chinese Application No. 201480000557.3 (5 pp.).
Extended European Search Report, dated Dec. 19, 2016, in European Application No. 14880694.6 (8 pp.).
*PUCCH Transmission in Small Cell Environment*, 3GPP TSG RAN WG1 Meeting #72bis, Chicago, USA, Apr. 15-19, 2013, R1-130918 (4 pp.).
*Physical layer support of upper layer aspects of small cell enhancements*, 3GPP TSG RAN WG1 Meeting #74, Barcelona, Spain, Aug. 19-23, 2013, R1-132894 (3 pp.).
*Discussion on dual connectivity*, 3GPP TSG RAN WG1 Meeting #74, Barcelona, Spain, Aug. 19-23, 2013, R1-133193, pp. 1-3).
3rd Generation Partnership Project; Technical Specification Group Radio Access Network; Evolved Universal Terrestrial Radio Access (E-UTRA); *Multiplexing and channel coding* (Release 12), 3GPP TS 36.212 V12.0.0 (Dec. 2013), pp. 1-88.
3rd Generation Partnership Project; Technical Specification Group Radio Access Network; Evolved Universal Terrestrial Radio Access (E-UTRA); *Physical layer procedures* (Release 12), 3GPP TS 36.213 V12.0.0 (Dec. 2013), pp. 1-186.
International Search Report dated Oct. 29, 2014 in corresponding International Application No. PCT/CN2014/071809.
Japanese Office Action dated Aug. 1, 2017 in corresponding Japanese Patent Application No. 2016-549043.
CATT, "Correction on implicit HARQ-ACK resource determination for PUCCH format 1b with channel selection for TDD CA with different UL-DL configurations," 3GPP TSG-RAN WG1 Meeting #73, R1-132117, Apr. 24, 2013.

* cited by examiner

METHOD AND BASE STATION IDENTIFYING PUCCH FOR PROCESSING FEEDBACK OF USER EQUIPMENT

CROSS-REFERENCE TO RELATED APPLICATIONS

This application is a continuation of International Application No. PCT/CN2014/071809, filed on Jan. 29, 2014, which is incorporated herein by reference in its entirety.

TECHNICAL FIELD

The present invention relates to the communications field, and in particular, to a data transmission method and system, and a device that are in carrier aggregation.

BACKGROUND

In a CA (carrier aggregation) technology, multiple contiguous or non-contiguous carriers are aggregated to form larger bandwidth (a maximum of 100 MHz), so as to meet a requirement for a higher rate and improve utilization of a discrete spectrum.

A HetNet (heterogeneous network) is used as an important evolution solution, and the solution implements precise coverage of a mobile communications network, significantly improves network performance, and brings better experience of a voice and a mobile data service to a user. A network side of the HetNet may include a core network, a transport network, and a base station. User equipment communicating with the network includes UE (user equipment) that has a CA capability and UE that does not have a CA capability.

The UE that has a CA capability is used as an example. When the HetNet performs data transmission in a CA manner, an EPC (evolved packet core) network delivers data information to the UE by using both a primary base station and a secondary base station, and the UE needs to send a feedback to the primary base station, where the feedback is used to indicate a receive status of the data information delivered by the primary base station and/or the secondary base station. In the prior art, the secondary base station allocates a PDSCH (physical downlink shared channel) resource and a PDCCH (packet data control channel) resource to the UE, and requests, from the primary base station, a data block to be sent to the UE. After receiving the data block delivered by the primary base station, the secondary base station determines an identifier of a PUCCH (physical uplink control channel) code channel resource. The secondary base station sends the identifier of the PUCCH code channel resource to the primary base station, and sends the data block and the identifier of the PUCCH code channel resource to the UE. The UE sends, on the corresponding PUCCH code channel resource, a feedback on the data block according to the identifier of the PUCCH code channel resource. After receiving, on a corresponding PUCCH code channel, the feedback according to the identifier of the PUCCH code channel resource, the primary base station may demodulate the feedback. A feedback obtained by means of demodulation may include two types: a NACK (negative acknowledgement) and an ACK (acknowledgement). The secondary base station needs to perform HARQ (hybrid automatic repeat request) retransmission on data corresponding to the NACK. The foregoing data transmission process has relatively low transmission efficiency.

SUMMARY

Embodiments of the present invention provide a data transmission method and system, and a device, which can improve data transmission efficiency.

To achieve the foregoing objective, the following technical solutions are used in the embodiments of the present invention:

According to a first aspect, a data transmission method is provided, including:

sending, by a secondary base station, an identifier of a first physical uplink control channel PUCCH code channel resource to a primary base station at a first moment, so that the primary base station determines to receive, by using the first PUCCH code channel resource, a feedback that is on a first data block and that is sent by user equipment UE;

sending, by the secondary base station, the identifier of the first PUCCH code channel resource and the first data block to the UE at a second moment; and receiving, by the secondary base station, the feedback from the primary base station, where the feedback is received by the primary base station from the UE by using the first PUCCH code channel resource;

where the second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE.

According to a second aspect, a data transmission method is provided, including:

receiving, by a primary base station, an identifier that is of a first physical uplink control channel PUCCH code channel resource and that is sent by a secondary base station at a first moment;

receiving, by the primary base station by using the first PUCCH code channel resource, a feedback sent by user equipment UE, where the feedback is a feedback, of the UE, on a first data block sent by the secondary base station at a second moment; and sending, by the primary base station, the feedback to the secondary base station;

where the second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE.

According to a third aspect, a base station is provided, including a sending unit and a receiving unit, where the sending unit is configured to send an identifier of a first physical uplink control channel PUCCH code channel resource to a first base station at a first moment, so that the first base station determines to receive, by using the first PUCCH code channel resource, a feedback that is on a first data block and that is sent by user equipment UE;

the sending unit is further configured to send the identifier of the first PUCCH code channel resource and the first data block to the UE at a second moment; and the receiving unit is configured to receive the feedback from the first base station, where the feedback is received by the first base station from the UE by using the first PUCCH code channel resource;

where the second moment is later than the first moment, an interval T between the second moment and the first moment is greater than or equal to a delay t of one-time inter-station unidirectional transmission between the base station and the first base station, the base station serves a secondary component carrier of the UE, and the first base station serves a primary component carrier of the UE.

According to a fourth aspect, a base station is provided, including a receiving unit and a sending unit, where the receiving unit is configured to receive an identifier that is of a first physical uplink control channel PUCCH code channel resource and that is sent by a second base station at a first moment;

the receiving unit is further configured to receive, by using the first PUCCH code channel resource, a feedback sent by user equipment UE, where the feedback is a feedback, of the UE, on a first data block sent by the second base station at a second moment; and the sending unit is configured to send the feedback to the second base station;

where the second moment is later than the first moment, an interval T between the second moment and the first moment is greater than or equal to a delay t for performing one-time transmission between the second base station and the primary base station, the second base station serves a secondary component carrier of the UE, and the primary base station serves a primary component carrier of the UE.

According to a fifth aspect, a base station is provided, including a bus, and a memory and a processor that are connected to the bus, where the memory is configured to store a computer instruction, and the processor executes the computer instruction to:

send an identifier of a first physical uplink control channel PUCCH code channel resource to a first base station at a first moment, so that the first base station determines to receive, by using the first PUCCH code channel resource, a feedback that is on a first data block and that is sent by user equipment UE;

send the identifier of the first PUCCH code channel resource and the first data block to the UE at a second moment; and receive the feedback from the first base station, where the feedback is received by the first base station from the UE by using the first PUCCH code channel resource;

where the second moment is later than the first moment, an interval T between the second moment and the first moment is greater than or equal to a delay t of one-time inter-station unidirectional transmission between the base station and the first base station, the base station serves a secondary component carrier of the UE, and the first base station serves a primary component carrier of the UE.

According to a sixth aspect, a base station is provided, including a bus, and a memory and a processor that are connected to the bus, where the memory is configured to store a computer instruction, and the processor executes the computer instruction to:

receive an identifier that is of a first physical uplink control channel PUCCH code channel resource and that is sent by a second base station at a first moment;

receive, by using the first PUCCH code channel resource, a feedback sent by user equipment UE, where the feedback is a feedback, of the UE, on a first data block sent by the second base station at a second moment; and send the feedback to the second base station;

where the second moment is later than the first moment, an interval T between the second moment and the first moment is greater than or equal to a delay t for performing one-time transmission between the second base station and the base station, the second base station serves a secondary component carrier of the UE, and the base station serves a primary component carrier of the UE.

According to a seventh aspect, a data transmission system is provided, including the base station provided in the third aspect and the base station provided in the fourth aspect.

According to an eighth aspect, a data transmission system is provided, including the base station provided in the fifth aspect and the base station provided in the sixth aspect.

The present invention provides a data transmission method and system, and a device. Because a secondary base station sends an identifier of a first PUCCH code channel resource to a primary base station at a first moment, the primary base station receives the identifier of the first PUCCH code channel resource at a moment between the first moment and a second moment, which ensures that at the second moment, that is, when the secondary base station sends the identifier of the first PUCCH code channel resource and a first data block to UE, the primary base station has already acquired a basis for demodulating a feedback on the first data block, so that the primary base station can demodulate and forward the feedback in a timely manner, thereby improving data transmission efficiency.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

CA is a technology in which two or more carrier units are aggregated together to support larger transmission bandwidth. In the embodiments of the present invention, a primary base station and a secondary base station are relative concepts, and are differentiated for specific UE. The primary base station is a base station that works on a primary component carrier, that is, the primary base station serves the primary component carrier of the UE. The UE performs an initial connection setup process or starts a connection re-setup process on the base station. The secondary base station is a base station that works on a secondary component carrier, that is, the secondary base station serves the secondary component carrier of the UE. Once an RRC (radio resource control) connection is set up, the secondary base station may be configured to provide an extra radio resource. The embodiments of the present invention are applicable to multiple communications systems and scenarios. For example, the primary base station may be a macro base station, and the secondary base station may be a micro base station. For another example, the communications system may be a system corresponding to 3GPP R10 (3rd Generation Partnership Project Release 10).

Embodiment 1

Figure 1:
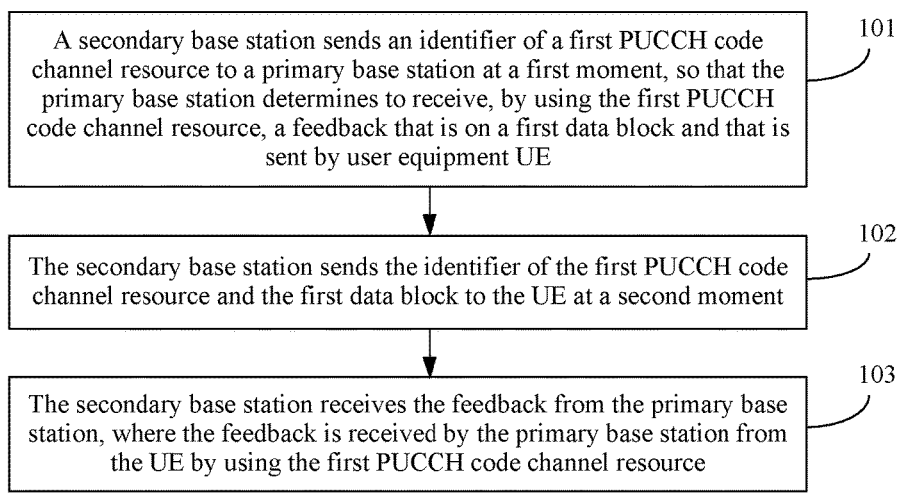
FIG. 1 is a schematic diagram of a data transmission method according to Embodiment 1 of the present invention.

This embodiment of the present invention provides a data transmission method, and the method is applicable to a communications system including a first base station, a second base station, and UE. Both the first base station and the second base station can provide a service for the UE. The following is described by using an example in which the first base station is a primary base station of the UE and the second base station is a secondary base station of the UE. As shown in FIG. 1, the method may include the following steps:

Step 101: The secondary base station sends an identifier of a first PUCCH code channel resource to the primary base station at a first moment, so that the primary base station determines to receive, by using the first PUCCH code channel resource, a feedback that is on a first data block and that is sent by the user equipment UE.

Step 102: The secondary base station sends the identifier of the first PUCCH code channel resource and the first data block to the UE at a second moment.

Step 103: The secondary base station receives the feedback from the primary base station, where the feedback is received by the primary base station from the UE by using the first PUCCH code channel resource.

The second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE.

Optionally, the delay t of one-time inter-station unidirectional transmission between the secondary base station and the primary base station meets the following formula:

$t=t1*A+B$, where t1 is a theoretical transmission delay between the primary base station and the secondary base station, A is a constant for adjusting t1, and B is an offset constant of t1.

In this way, because a secondary base station sends an identifier of a first PUCCH code channel resource to a primary base station at a first moment, the primary base station receives the identifier of the first PUCCH code channel resource at a moment between the first moment and a second moment, which ensures that at the second moment, that is, when the secondary base station sends the identifier of the first PUCCH code channel resource and a first data block to UE, the primary base station has already acquired a basis for demodulating a feedback on the first data block, so that the primary base station can demodulate and forward the feedback in a timely manner, thereby improving data transmission efficiency.

Optionally, in this embodiment, the secondary base station determines x before the first moment, where x is a quantity of the first data blocks, and the secondary base station receives and buffers, before the first moment, a service sent by the primary base station; and the secondary base station acquires x first data blocks from the buffered service before the second moment. For example, when a first condition is met, the secondary base station acquires the x first data blocks from the buffered service, or the secondary base station sends x to the primary base station. The first condition may include: a priority of the UE is higher than a priority of other UE accessing the secondary base station. Further, the first condition may further include: a priority of the service is higher than a priority of a message sent by the secondary base station to the other UE accessing the secondary base station.

Optionally, in this embodiment, the method further includes: determining, by the secondary base station, x before the first moment, where x is a quantity of the first data blocks; sending, by the secondary base station, x to the primary base station at the first moment; and receiving, by the secondary base station before the second moment, x first data blocks sent by the primary base station.

It may be understood that, in this embodiment, the secondary base station may perform different subsequent processing according to the feedback received in step 103. The following is described with an example.

For example, the method further includes: retransmitting, by the secondary base station, retransmission data to the UE if the feedback includes a negative acknowledgement NACK, where the retransmission data includes a data block, in the first data block, corresponding to the NACK; determining, by the secondary base station, whether the retransmission fails; and if the secondary base station determines that the retransmission fails, sending, by the secondary base station to the primary base station, information indicating that the retransmission fails and a sequence number corresponding to the retransmission data, where the information indicating that the retransmission fails is used to trigger the primary base station to retransmit the retransmission data to the UE.

For another example, if the secondary base station receives the feedback from the primary base station within a preset period of time and the feedback includes a NACK, the method further includes: retransmitting, by the secondary base station, retransmission data to the UE in an automatic repeat request ARQ manner, where the retransmission data includes a data block, in the first data block, corresponding to the NACK.

For another example, if a first HARQ buffer and a second HARQ buffer are disposed on the secondary base station, the method further includes: if the feedback includes a negative acknowledgment NACK and all HARQ processes in the first HARQ buffer are in an occupied state, retransmitting, by the secondary base station, retransmission data to the UE by using an HARQ process in the second HARQ buffer, where the retransmission data includes a data block, in the first data block, corresponding to the NACK. Optionally, process IDs of the HARQ processes in the first HARQ buffer may be in a one-to-one correspondence with process IDs of HARQ processes in the second HARQ buffer. Therefore, it is assumed that an HARQ process that is in the first HARQ buffer and whose process ID is y is used to send the first data block to the UE, and then the retransmitting, by the secondary base station, retransmission data to the UE by using an HARQ process in the second HARQ buffer includes the following two possible implementation manners:

In a first manner, if an HARQ process that is in the second HARQ buffer and whose process ID is y is in the occupied state, the secondary base station retransmits the retransmission data to the UE by using another process in the second HARQ buffer, and sends a downlink scheduling grant message to the UE, where the downlink scheduling grant message carries an NDI value, the another process is different from the HARQ process that is in the second HARQ buffer and whose process ID is y, and is in an idle state, and the NDI value is different from an NDI value sent by the secondary base station to the UE last time.

In a second manner, if an HARQ process that is in the second HARQ buffer and whose process ID is y is in an idle state, the secondary base station retransmits the retransmission data to the UE by using the HARQ process that is in the second HARQ buffer and whose process ID is y, and sends a downlink scheduling grant message to the UE, where the downlink scheduling grant message carries an NDI value, and the NDI value is the same as an NDI value sent by the secondary base station to the UE last time.

Embodiment 2

Figure 2:
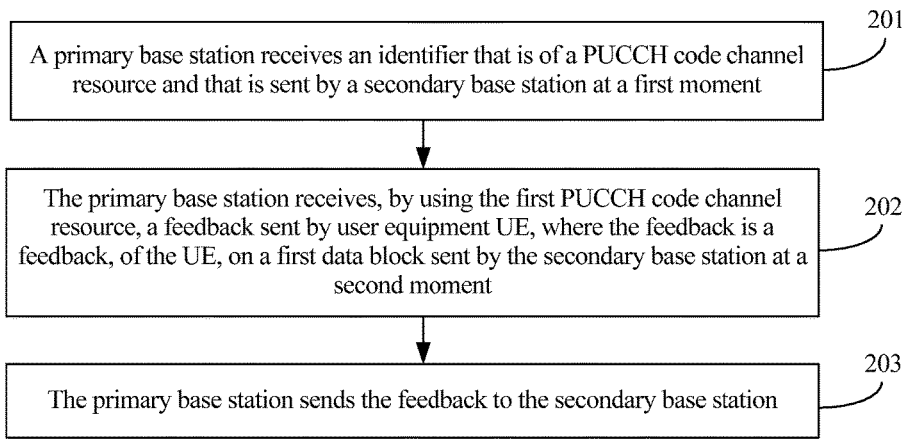
FIG. 2 is a schematic diagram of a data transmission method according to Embodiment 2 of the present invention.

This embodiment of the present invention provides a data transmission method, and the method is applicable to a communications system including a first base station, a second base station, and UE. Both the first base station and the second base station can provide a service for the UE. The following is described by using an example in which the first base station is a primary base station of the UE and the second base station is a secondary base station of the UE. As shown in FIG. 2, the method may include the following steps:

Step 201: The primary base station receives an identifier that is of a PUCCH code channel resource and that is sent by the secondary base station at a first moment.

Step 202: The primary base station receives, by using the first PUCCH code channel resource, a feedback sent by the user equipment UE, where the feedback is a feedback, of the UE, on a first data block sent by the secondary base station at a second moment.

Step 203: The primary base station sends the feedback to the secondary base station.

The second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE.

Optionally, the delay t of one-time inter-station unidirectional transmission between the secondary base station and the primary base station meets the following formula:

$t=t1*A+B$, where t1 is a theoretical transmission delay between the primary base station and the secondary base station, A is a constant for adjusting t1, and B is an offset constant of t1.

In this way, because a primary base station receives an identifier of a first PUCCH code channel resource before a second moment, it is ensured that at the second moment, that is, when a secondary base station sends the identifier of the first PUCCH code channel resource and a first data block to UE, the primary base station has already acquired a basis for demodulating a feedback on the first data block, so that the primary base station can demodulate and forward the feedback in a timely manner, thereby improving data transmission efficiency.

Optionally, before the first moment, the method further includes: receiving, by the primary base station, the identifier that is of the first physical uplink control channel PUCCH code channel resource and that is sent by the secondary base station at the first moment; receiving, by the primary base station by using the first PUCCH code channel resource, the feedback sent by the user equipment UE, where the feedback is a feedback, of the UE, on the first data block sent by the secondary base station at the second moment; and sending, by the primary base station, the feedback to the secondary base station, where the second moment is later than the first moment, the interval T between the second moment and the first moment is greater than or equal to the delay t of one-time inter-station unidirectional transmission between the secondary base station and the primary base station, the secondary base station serves the secondary component carrier of the UE, and the primary base station serves the primary component carrier of the UE.

Further, before the first moment, the method may further include: receiving, by the primary base station, a service bearer setup request sent by the UE or a gateway, where the service bearer setup request is used to request to set up a service bearer between the UE, the gateway, and the primary base station; and setting up, by the primary base station, a first Radio Link Control RLC layer logical channel and a second RLC layer logical channel, where the first RLC layer logical channel is used for transmission between the primary base station and the UE, and the second RLC layer logical channel is used for transmission between the primary base station and the secondary base station.

Still further, the method may further include: receiving, by the primary base station, a service sent by the gateway; and sending, by the primary base station, a service of a delay insensitive data service type in the service to the secondary base station before the first moment by using the second RLC layer logical channel; or receiving, by the primary base station, x sent by the secondary base station at the first moment, where x is a quantity of the first data blocks sent by the secondary base station to the UE at the second moment; and before the second moment, acquiring, by the primary base station, x first data blocks from a service of a delay insensitive data service type in the service, and sending the x first data blocks to the secondary base station by using the second RLC layer logical channel.

Alternatively, still further, the method further includes: receiving, by the primary base station, a service sent by the gateway; determining, by the primary base station, a second PUCCH code channel resource, where the second PUCCH code channel resource is used by the UE to send a feedback on a second data block to the primary base station; and sending, by the primary base station, an identifier of the second PUCCH code channel resource and the second data block to the UE by using the first RLC layer logical channel, where the second data block is a data block corresponding to a service of a delay sensitive service type in the service.

Optionally, in this embodiment, after the primary base station sends the feedback to the secondary base station, the method further includes: receiving, by the primary base station, information indicating that retransmission fails and a sequence number corresponding to retransmission data that are sent by the secondary base station, where the information indicating that the retransmission fails is sent by the secondary base station to the primary base station after it is determined that the feedback includes a NACK and the secondary base station fails to retransmit the retransmission data to the UE; and retransmitting, by the primary base station, the retransmission data to the UE, where the retransmission data is a data block, in the first data block, corresponding to the NACK.

Embodiment 3

The following further describes, by using Embodiment 3 as an example, the method provided in Embodiment 1 and the method provided in Embodiment 2. In this embodiment of the present invention, when a data transmission system that supports CA needs to perform data transmission, UE or a gateway of an EPC network may trigger setup of a service bearer, where the service bearer is a service bearer between the UE, the gateway, and a primary base station; and then perform service transmission on the corresponding service bearer. For example, when a voice service is ongoing, and the UE is a callee, the gateway triggers the setup of the service bearer. For another example, when the UE needs to download data, the UE triggers the setup of the service bearer.

In this embodiment of the present invention, an example in which the UE triggers the setup of the service bearer is used for description. In addition, in this embodiment, it is assumed that a second moment is later than a first moment, an interval T between the second moment and the first moment is greater than or equal to a delay t of one-time inter-station unidirectional transmission between a secondary base station and the primary base station, the secondary base station serves a secondary component carrier of the UE, and the primary base station serves a primary component carrier of the UE. Optionally, t meets the following formula: $t=t1*A+B$, where t1 is a theoretical transmission delay between the primary base station and the secondary base station, A is a constant for adjusting t1, and B is an offset constant of t1. A unit of t may be ms.

Figure 3:
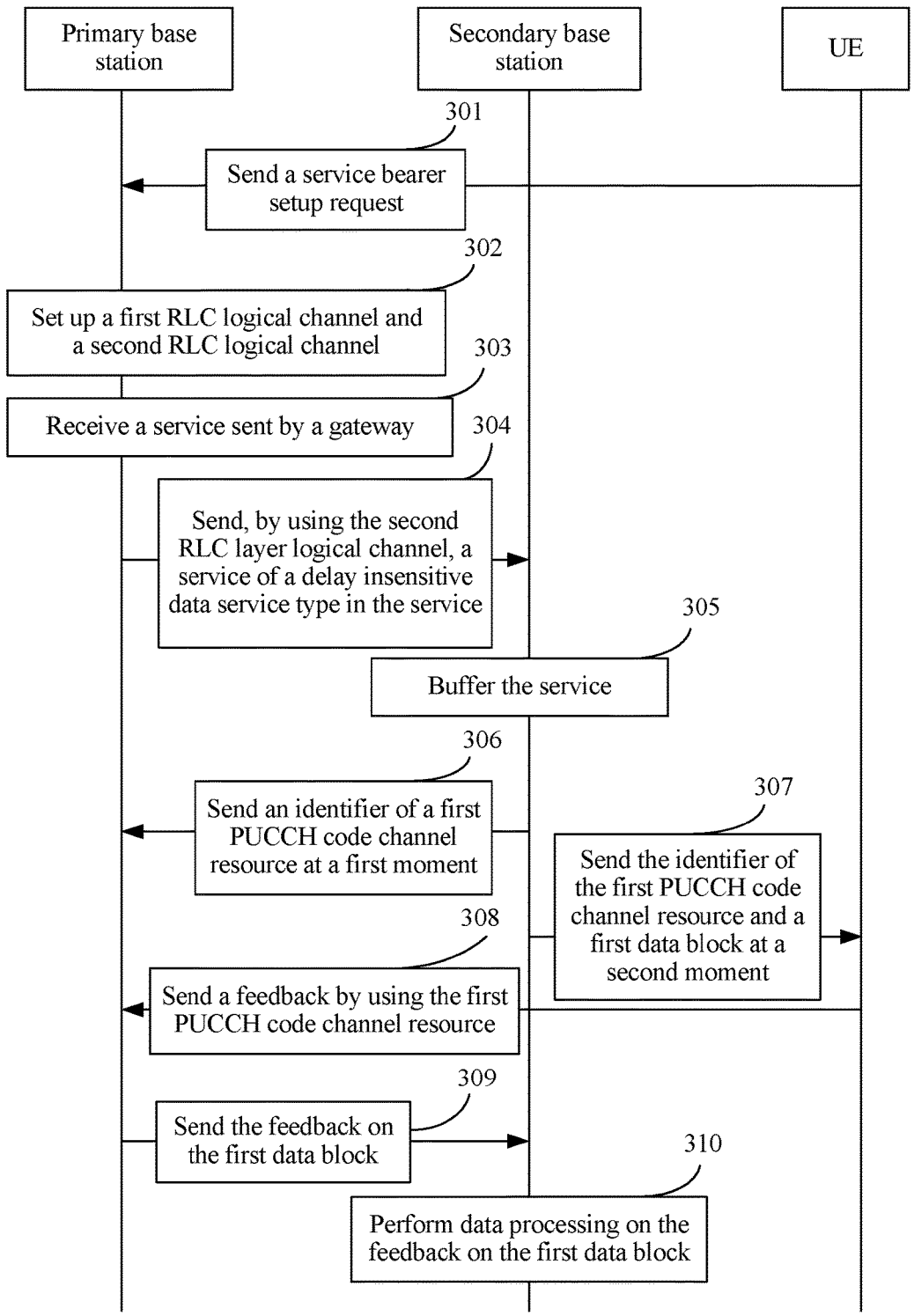
FIG. 3 is a schematic diagram of a data transmission method according to Embodiment 3 of the present invention.

This embodiment of the present invention provides a data transmission method. As shown in FIG. 3, the method includes:

Step 301: The UE sends a service bearer setup request to the primary base station.

The service bearer setup request is used to request to set up the service bearer between the UE, the gateway, and the primary base station. A process of setting up the service bearer is the same as that in the prior art, and details are not described in the present invention.

Step 302: The primary base station sets up a first Radio Link Control RLC (Radio Link Control) layer logical channel and a second RLC layer logical channel.

The first RLC layer logical channel is used for transmission between the primary base station and the UE, and the second RLC layer logical channel is used for transmission between the primary base station and the secondary base station. Wireless communications systems such as GPRS (general packet radio service), WCDMA (Wideband Code Division Multiple Access), TD-SCDMA (Time Division-Synchronous Code Division Multiple Access), or LTE (Long Term Evolution) all include an RLC layer. For example, in a WCDMA system, an RLC layer is located above a MAC (Medium/Media Access Control) layer, and is used to ensure that service data is submitted in order. In this embodiment of the present invention, an RLC layer logical channel (which may also be referred to as an RLC logical channel for short) is located at an RLC layer, and is used for service transmission, connection control, traffic control, and the like. A function of the RLC layer is implemented by an RLC entity deployed on a base station.

Step 303: The primary base station receives a service sent by the gateway.

The service received by the primary base station is sent by the gateway of the EPC network, and a service type of the service may include at least one of a delay insensitive data service and a delay sensitive data service. The delay insensitive data service refers to a data service that has a low requirement for a delay, for example, a data download service. The delay sensitive data service refers to a service that has a relatively high requirement for a delay, for example, a real-time small packet service such as a signaling service and a voice service. The primary base station may determine the service type of the service according to at least one of a QCI (QoS class identifier) type, a service feature, a delay parameter, or the like. For a specific method, reference may be made to the prior art. A QCI is a service type differentiation method in a standard protocol. QoS (quality of service) is a network security mechanism, and is a technology used to resolve a problem such as a network delay and congestion. The service feature includes a size of a data amount, a data coding feature, and the like. The delay parameter may be a PDB (packet delay budget).

Step 304: The primary base station sends a service of a delay insensitive data service type in the service to the secondary base station by using the second RLC layer logical channel.

Step 305: The secondary base station buffers the service.

After receiving the service sent by the primary base station, the secondary base station may locally buffer the service. In this embodiment, the service sent by the primary base station is a delay insensitive data service.

In the prior art, an RLC entity (entity) of a data service is deployed on a primary base station. When UE is scheduled, a secondary base station requests, from the primary base station, a data block that needs to be sent to the UE. After receiving the data block sent by the primary base station, the secondary base station sends the data block to the UE. Therefore, the UE needs to wait at least a delay of one-time inter-station unidirectional transmission between the secondary base station and the primary base station (which is also referred to as duration between a moment when one base station sends information to the other base station and a moment when the other base station receives the information) to receive the data block.

Further, in this embodiment of the present invention, an RLC agent (RLC Agent) module may be disposed on the secondary base station. The RLC agent module is configured to buffer the service sent by the primary base station by using the RLC layer logical channel, so that when the UE is scheduled, the secondary base station acquires a data block from the service buffered in the RLC agent module to send the data block to the UE. In this way, when the UE is scheduled, the secondary base station does not need to temporarily request a data block from the primary base station, and may send the data block after acquiring, from a buffer, the data block that needs to be sent to the UE, thereby reducing waiting time of the UE, and improving data transmission efficiency.

Step 306: The secondary base station sends an identifier of a first PUCCH code channel resource to the primary base station at the first moment.

When receiving the identifier of the first PUCCH code channel resource, the primary base station may determine to receive, by using the first PUCCH code channel resource, a feedback that is on a first data block and that is sent by the UE.

In this embodiment of the present invention, the identifier of the first PUCCH code channel resource is determined by the secondary base station before the first moment. For example, the secondary base station determines x before the first moment, where x is a quantity of the first data blocks, and then the secondary base station determines the identifier of the corresponding first PUCCH code channel resource according to x. Exemplarily, x is 1 or 2. In a method for determining x by the secondary base station, the secondary base station may predict, according to a transmission mode configuration of the UE, a RANK (rank indication) value, an amount of to-be-transmitted data of the service, and an average throughput rate of the secondary base station, whether the UE is to be scheduled by the secondary base station at the second moment and how many data blocks the secondary base station is to send to the UE if the UE is to be scheduled by the secondary base station. The data block is also referred to as a TB (transport block). The RANK value is used to indicate a quantity of valid data layers of a PDSCH. In this embodiment of the present invention, it is assumed that the secondary base station learns, by means of prediction, that the UE is to be scheduled at the second moment, and then a quantity that is of data blocks and that is obtained by means of prediction is the quantity x of the first data blocks.

It should be noted that, when the UE accesses the secondary base station, the secondary base station configures a preset quantity of PUCCH code channel resources for the UE. The preset quantity of PUCCH code channel resources are configured according to a preset standard, which is the same as a standard by which the primary base station configures a PUCCH code channel resource for the UE. For example, the preset quantity is 4. Optionally, a quantity of PUCCH code channel resources (which may also be referred to as a quantity of code channels for short) included in the first PUCCH code channel resource is equal to the quantity of the first data blocks, and then in this embodiment, a determined quantity of the first PUCCH code channel resources may be x. For example, the secondary base station selects x PUCCH code channel resources from the preset quantity of PUCCH code channel resources, and acquires identifiers of the x PUCCH code channel resources as the identifier of the first PUCCH code channel resource.

Step 307: The secondary base station sends the identifier of the first PUCCH code channel resource and a first data block to the UE at the second moment.

It should be noted that, the secondary base station may acquire x first data blocks from the buffered service before the second moment. For example, when a first condition is met, the secondary base station acquires the x first data blocks from the buffered service, or the secondary base station sends x to the primary base station, where the first condition includes: a priority of the UE is higher than a priority of other UE accessing the secondary base station. Optionally, the first condition further includes: a priority of the service is higher than a priority of a message sent by the secondary base station to the other UE accessing the secondary base station.

Exemplarily, when the priority of the UE is higher than the priority of the other UE accessing the secondary base station, but the priority of the service is lower than the priority of the message sent by the secondary base station to the other UE accessing the secondary base station, the secondary base station does not acquire the x first data blocks. When the priority of the UE is higher than the priority of the other UE accessing the secondary base station, and the priority of the service is also higher than the priority of the message sent by the secondary base station to the other UE accessing the secondary base station, the secondary base station acquires the x first data blocks from the buffered service.

In this way, in a process in which the secondary base station schedules the UE, it can be ensured that a message that is of a relatively high priority, such as a system message and a paging message, and that is of the other UE accessing the secondary base station is preferentially sent, thereby avoiding transmission congestion of a message of a relatively high priority caused by occupation of a channel resource by the UE.

It should be noted that, the secondary base station may send the first PUCCH code channel resource and the x first data blocks by scheduling a PDCCH resource and a PDSCH resource. For example, the PDCCH resource bears DCI (downlink control information), which includes resource allocation and other control information on one or more user equipment. In this embodiment, the PDCCH resource may carry the first PUCCH code channel resource. For another example, the PDSCH resource is used to bear data from a transmission channel DSCH (downlink shared channel), and the PDSCH resource may carry the x first data blocks. The secondary base station transmits the first PUCCH code channel resource and the x first data blocks to the UE by using an air interface.

Step 308: The primary base station receives, by using the first PUCCH code channel resource, a feedback sent by the UE.

It may be understood that, after receiving the identifier of the first PUCCH code channel resource and the first data block from the secondary base station, the UE may send the feedback on the first data block to the primary base station by using the first PUCCH code channel resource. Accordingly, the primary base station receives, by using the first PUCCH code channel resource, the feedback sent by the UE.

A rule in which the UE sends the feedback is corresponding to a rule in which the primary base station performs information parsing, thereby ensuring that a sender and a receiver have same understanding of information. Because the identifier of the first PUCCH code channel resource may include identifiers of multiple PUCCH code channel resources, the UE sends different signals on PUCCH code channel resources indicated by different identifiers, to represent different feedbacks, that is, each feedback is determined according to an identifier of a PUCCH channel resource on which a signal exists and a type of the signal. In this embodiment of the present invention, there may be multiple rules in which the UE sends the feedback and multiple rules in which the primary base station performs information parsing. For example, the UE receives two data blocks, that is, x=2. Accordingly, the identifier of the first PUCCH code channel resource includes identifiers of two PUCCH code channel resources. Referring to Table 1, Table 1 indicates a transmission situation that exists when there are two PUCCH code channel resources, where (PUCCH, 0) represents an identifier of a first PUCCH code channel resource, (PUCCH, 1) represents an identifier of a second PUCCH code channel resource, HARQ-ACK (0) represents a first data block, and HARQ-ACK (1) represents a second data block. As shown in Table 1, when the UE sends a signal "1, 1" on the second PUCCH code channel resource, that is, on (PUCCH, 1), it represents that the first data block corresponds to an ACK acknowledgement and the second data block corresponds to an ACK acknowledgement; when the UE sends a signal "1, 1" on the first PUCCH code channel resource, that is, on (PUCCH, 0), it represents that the first data block corresponds to an ACK acknowledgement and the second data block corresponds to a NACK acknowledgement; when the UE sends a signal "0, 0" on the second PUCCH code channel resource, that is, on (PUCCH, 1), it represents that the first data block corresponds to a NACK acknowledgement and the second data block corresponds to an ACK acknowledgement; and when the UE sends a signal "0, 0" on the first PUCCH code channel resource (PUCCH, 0), it represents that the first data block corresponds to a NACK acknowledgement and the second data block corresponds to a NACK acknowledgement. It should be noted that, DTX (Discontinuous Transmission, discontinuous transmission) in Table 1 represents that the secondary base station sends only a PDCCH resource to the UE, and does not send a PDSCH resource, and consequently, there is no data transmission on a corresponding PUCCH code channel resource. Because it is assumed, in this embodiment of the present invention, that the secondary base station sends both the PDCCH resource and the PDSCH resource to the UE, a DTX acknowledgement is not involved in this embodiment.

TABLE 1

| First data block | Second data block | Identifier of a PUCCH code channel resource | Signal |
| --- | --- | --- | --- |
| HARQ-ACK (0) | HARQ-ACK (1) | $n_{PUCCH}^{(1)}$ | b(0) b(1) |
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No transmission | |

Optionally, the primary base station scans all PUCCH code channel resources, and if it is obtained, by means of scanning, that there is a signal on the first PUCCH code channel resource, parses the signal on the first code channel resource to obtain the feedback on the first data block. The rule in which the primary base station performs information parsing is corresponding to the rule in which the UE sends the feedback, and for details, reference may be made to the foregoing examples. The foregoing method for representing a feedback is only schematically described, and may be preset according to a specific situation in a practical application.

Step 309: The primary base station sends the feedback on the first data block to the secondary base station.

Optionally, the primary base station may receive multiple feedbacks of the UE, which include a feedback, of the UE, on a data block sent by the primary base station to the UE, and also include the feedback on the first data block. The primary base station may exclude, from the received feedbacks, the feedback on the data block sent by the primary base station to the UE, and use the remaining feedback as the feedback on the first data block, and send the feedback on the first data block to the secondary base station.

Step 310: The secondary base station performs data processing on the feedback on the first data block.

Optionally, after receiving the feedback that is on the first data block and that is sent by the primary base station, the secondary base station determines whether the feedback includes a NACK, and the secondary base station may retransmit first retransmission data to the UE if the feedback includes a NACK. Exemplarily, the secondary base station may retransmit the first retransmission data to the UE in an HARQ manner, where the first retransmission data includes a data block, in the first data block, corresponding to the NACK. Herein, the first retransmission data may be the data block, in the first data block, corresponding to the NACK. Further, the secondary base station may determine whether the retransmission fails. If the secondary base station determines that the retransmission fails, the secondary base station sends information indicating that the retransmission fails and an SN (Sequence Number, sequence number) corresponding to the first retransmission data to the primary base station, so that the primary base station retransmits the first retransmission data to the UE, where the information indicating that the retransmission fails is used to trigger the primary base station to retransmit the first retransmission data to the UE. The primary base station may perform a query on the primary base station according to the foregoing SN to acquire the corresponding first retransmission data, and retransmit the first retransmission data to the UE in an ARQ retransmission manner. In this way, after the secondary base station fails in the first retransmission, the primary base station retransmits the first retransmission data again, which can ensure that the first retransmission data is effectively sent to the UE, and reduce a failure rate of data sending.

Optionally, the secondary base station may periodically detect whether the feedback sent by the primary base station is received. An example in which a length of one period is a preset period of time is used. If the secondary base station receives the feedback from the primary base station within the preset period of time and the feedback includes a NACK, the secondary base station may further retransmit second retransmission data to the UE in an ARQ (automatic repeat request) manner, where the second retransmission data includes a data block, in the first data block, corresponding to the NACK, and may further include a data block, in another feedback of the UE within the preset period of time, corresponding to the NACK. Because the ARQ is a periodic retransmission manner, when the secondary base station uses the ARQ manner, a quantity of stops and waits may be reduced, and data transmission efficiency may be improved. Exemplarily, if the preset period of time is a period of four HARQ RTTs (round-trip time delay), where a period of one HARQ RTT is 8 ms, the preset period of time is 32 ms. The secondary base station may detect whether feedback information is received within 32 ms, and if the feedback information is received within the preset period of time, detect whether a NACK exists in the feedback information. In the present invention, it is assumed that four NACKs exist, and then the secondary base station retransmits, in the ARQ manner, data corresponding to the four NACKs to the UE.

Optionally, a first HARQ buffer and a second HARQ buffer may be disposed on the secondary base station. If the feedback includes a negative acknowledgment NACK and all HARQ processes in the first HARQ buffer are in an occupied state, the secondary base station retransmits third retransmission data to the UE by using an HARQ process in the second HARQ buffer, where the third retransmission data includes a data block, in the first data block, corresponding to the NACK.

In this embodiment, process IDs of the HARQ processes in the first HARQ buffer are in a one-to-one correspondence with process IDs of HARQ processes in the second HARQ buffer. It is assumed that an HARQ process that is in the first HARQ buffer and whose process ID is y is used to send the first data block to the UE, and then this embodiment includes the following two possible implementation solutions:

In a first solution, if an HARQ process that is in the second HARQ buffer and whose process ID is y is in the occupied state, the secondary base station retransmits the third retransmission data to the UE by using another process in the second HARQ buffer, and sends a downlink scheduling grant message to the UE, where the downlink scheduling grant message carries an NDI value, the another process is different from the HARQ process that is in the second HARQ buffer and whose process ID is y, and is in an idle state, and the NDI value is different from an NDI value sent by the secondary base station to the UE last time; or in a second solution, if an HARQ process that is in the second HARQ buffer and whose process ID is y is in an idle state, the secondary base station retransmits the third retransmission data to the UE by using the HARQ process that is in the second HARQ buffer and whose process ID is y, and sends a downlink scheduling grant message to the UE, where the downlink scheduling grant message carries an NDI value, and the NDI value is the same as an NDI value sent by the secondary base station to the UE last time.

In this way, by increasing a quantity of HARQ buffers in a secondary base station, when all HARQ processes in a first HARQ buffer are in a state of waiting for feedback information, a second HARQ buffer is used to retransmit to-be-transmitted data, which reduces a stop and wait phenomenon in a data transmission process and avoids a delay caused by a stop and a wait, thereby reducing an entire delay of data transmission, and improving data transmission efficiency.

It should be noted that, from step 304 to step 305, the first data block is acquired from the buffer by the secondary base station when the secondary base station schedules the UE. In step 306, the secondary base station sends the identifier of the first PUCCH code channel resource to the primary base station at the first moment, and the delay t of one-time inter-station unidirectional transmission exists; afterwards, in step 307, the secondary base station sends the identifier of the first PUCCH code channel resource and the first data block to the UE at the second moment. Therefore, it can be learned that, a minimum interval between the first moment and the second moment is the delay t of one-time inter-station unidirectional transmission between the secondary base station and the primary base station; and when the first data block is acquired from the buffer by the secondary base station when the secondary base station schedules the UE, the interval T between the first moment and the second moment is t.

Figure 4:
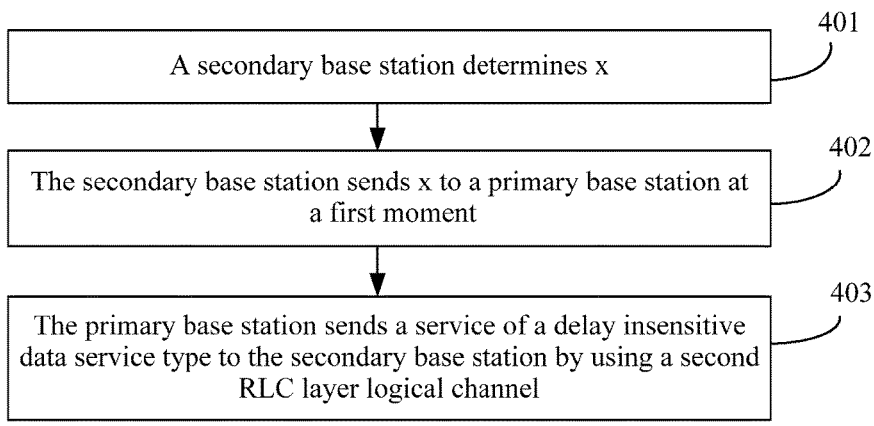
FIG. 4 is a schematic diagram of another data transmission method according to Embodiment 3 of the present invention.

This embodiment of the present invention further provides a method for requesting the first data block from the primary base station by the secondary base station when the secondary base station schedules the UE. Specifically, as shown in FIG. 4, the method includes:

Step 401: The secondary base station determines x.

x is a quantity of the first data blocks.

Step 402: The secondary base station sends x to the primary base station at the first moment.

When the first condition is met, the secondary base station sends x to the primary base station.

The first condition includes: a priority of the UE is higher than a priority of other UE accessing the secondary base station. Optionally, the first condition further includes: a priority of the service is higher than a priority of a message sent by the secondary base station to the other UE accessing the secondary base station.

Step 403: The primary base station sends a service of a delay insensitive data service type in the service to the secondary base station by using the second RLC layer logical channel.

After receiving x sent by the secondary base station at the first moment, the primary base station may acquire x first data blocks from the service that is in the service and whose service type is the delay insensitive data, and send the x first data blocks to the secondary base station by using the second RLC layer logical channel.

Optionally, the foregoing step 402 and step 306 are simultaneously executed, and step 403 is executed after step 306. For example, x in step 402 and the identifier of the first PUCCH code channel resource in step 306 are carried in a same message, and are sent by the secondary base station to the primary base station. At the first moment, the secondary base station sends the identifier of the first PUCCH code channel resource to the primary base station in step 306, and the secondary base station sends x to the primary base station in step 402, where a delay of one-time inter-station unidirectional transmission exists; afterwards, in step 403, the primary base station sends the service that is in the service and whose service type is the delay insensitive data to the secondary base station by using the second RLC layer logical channel, where another delay of one-time inter-station unidirectional transmission exists; and in step 307, the secondary base station sends the identifier of the first PUCCH code channel resource and the first data block to the UE at the second moment. Therefore, it can be learned that a minimum interval between the first moment and the second moment is a delay 2t of two-time inter-station transmission between the secondary base station and the primary base station; and when the first data block is obtained by the secondary base station by requesting from the primary base station when the secondary base station schedules the UE, the interval T between the first moment and the second moment is 2t by using the foregoing steps, that is, an interval between a moment when the secondary base station requests a data block from the primary base station and a moment when the secondary base station sends the data block to the UE is 2t. In the prior art, the secondary base station requests, from the primary base station, a data block to be sent to the UE, and the primary base station sends the data block to the secondary base station. Afterwards, the secondary base station sends an identifier of a PUCCH code channel resource to the primary base station, and then sends the identifier of the PUCCH code channel resource and the data block to the UE after the primary base station receives the identifier of the PUCCH code channel resource, so as to ensure that the primary base station acquires the identifier of the PUCCH code channel resource before the UE acquires the identifier of the PUCCH code channel resource. It can be learned that, in the foregoing existing process, an interval between a moment when the secondary base station requests a data block from the primary base station and a moment when the secondary base station sends the data block to the UE is 3t. Therefore, by using the data transmission method in the present invention, the foregoing delay can be effectively reduced, and data transmission efficiency can be effectively improved.

In this embodiment of the present invention, in addition to a process including the foregoing steps, the primary base station may further execute another process in parallel with the foregoing process. For example, the primary base station may receive a service sent by the gateway, and determine a second PUCCH code channel resource, where the second PUCCH code channel resource is used by the UE to send a feedback on a second data block to the primary base station; and the primary base station sends an identifier of the second PUCCH code channel resource and the second data block to the UE by using the first RLC layer logical channel, where the second data block is a data block corresponding to a service of a delay sensitive service type in the service.

In the prior art, after receiving a service sent by a gateway, the primary base station may separately send different data blocks in service data of a same service type to the secondary base station and the UE, and a data block sent to the secondary base station is then sent by the secondary base station to the UE. Sequence numbers of the data blocks may be disordered because of a delay of inter-station transmission between the primary base station and the secondary base station. In this embodiment of the present invention, by setting up two RLC layer logical channels and performing corresponding service type differentiation, services of different service types are effectively offloaded, and data blocks of a same service type are sent by using only a same RLC layer logical channel, thereby avoiding sequence number disorder of the data blocks, and improving timeliness of a service.

Further, the primary base station may send, by using the first RLC layer logical channel, the identifier of the second PUCCH code channel resource and the second data block to the UE at the same time when step 307 is executed, that is, both of which are executed at the second moment. In this way, at the second moment, the primary base station and the secondary base station send a data block to the UE at the same time, which may implement carrier aggregation between the primary base station and the secondary base station, and improve a peak throughput rate of a data transmission system.

According to the data transmission method provided in this embodiment of the present invention, because a secondary base station sends an identifier of a first PUCCH code channel resource to a primary base station at a first moment, the primary base station receives the identifier of the first PUCCH code channel resource at a moment between the first moment and a second moment, which ensures that at the second moment, that is, when the secondary base station sends the identifier of the first PUCCH code channel resource and a first data block to UE, the primary base station has already acquired a basis for demodulating a feedback on the first data block, so that the primary base station can demodulate and forward the feedback in a timely manner, thereby improving data transmission efficiency.

Embodiment 4

Figure 5:
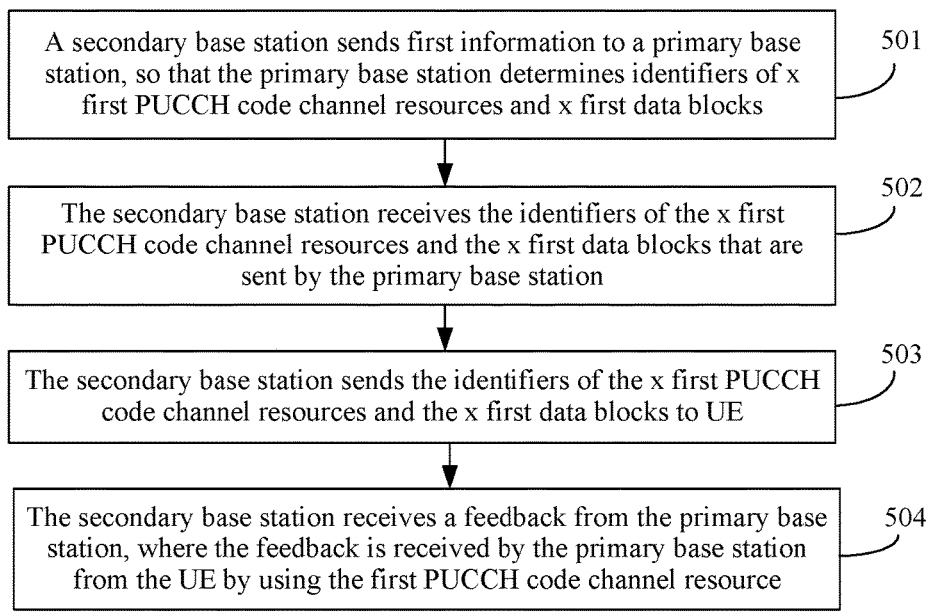
FIG. 5 is a schematic diagram of a data transmission method according to Embodiment 4 of the present invention.

This embodiment of the present invention provides a data transmission method, and the method is applicable to a communications system including a first base station, a second base station, and UE. Both the first base station and the second base station can provide a service for the UE. The following is described by using an example in which the first base station is a primary base station of the UE and the second base station is a secondary base station of the UE. As shown in FIG. 5, the method may include the following steps:

Step 501: The secondary base station sends first information to the primary base station, so that the primary base station determines identifiers of x first PUCCH code channel resources and x first data blocks.

The first information includes one of a quantity x of the first physical uplink control channel PUCCH code channel resources, a quantity x of the first data blocks sent by the secondary base station to the user equipment UE, and a first channel code word (code word), where the first PUCCH code channel resource is used by the UE to send a feedback on the first data block to the primary base station, and the first channel code word is a channel code word corresponding to the x first data blocks.

Optionally, that the secondary base station sends first information to the primary base station includes: when the secondary base station determines that a priority of the UE is higher than a priority of other UE accessing the secondary base station, the secondary base station sends the first information to the primary base station.

Step 502: The secondary base station receives the identifiers of the x first PUCCH code channel resources and the x first data blocks that are sent by the primary base station.

Step 503: The secondary base station sends the identifiers of the x first PUCCH code channel resources and the x first data blocks to the UE.

Step 504: The secondary base station receives a feedback from the primary base station, where the feedback is received by the primary base station from the UE by using the first PUCCH code channel resource.

In this embodiment of the present invention, the secondary base station serves a secondary component carrier of the UE, and the primary base station serves a primary component carrier of the UE.

In this way, because a primary base station determines identifiers of x first PUCCH code channel resources, and a secondary base station sends the identifiers of the x first PUCCH code channel resources and x first data blocks to UE, when the primary base station receives the identifier of the first PUCCH code channel resource and the first data block, the primary base station has already acquired a basis for demodulating a feedback on the first data block, so that the primary base station can demodulate and forward the feedback in a timely manner, thereby improving data transmission efficiency.

Further, the method may further include: retransmitting, by the secondary base station, retransmission data to the UE if the feedback includes a negative acknowledgement NACK, where the retransmission data includes a data block, in the x data blocks, corresponding to the NACK; determining, by the secondary base station, whether the retransmission fails; and if the secondary base station determines that the retransmission fails, sending, by the secondary base station to the primary base station, information indicating that the retransmission fails and a sequence number corresponding to the retransmission data, where the information indicating that the retransmission fails is used to trigger the primary base station to retransmit the retransmission data to the UE.

Alternatively, further, if the secondary base station receives the feedback from the primary base station within a preset period of time and the feedback includes a NACK, the method may further include: retransmitting, by the secondary base station, retransmission data to the UE in an automatic repeat request ARQ manner, where the retransmission data includes a data block, in the x data blocks, corresponding to the NACK.

Alternatively, further, if a first hybrid automatic repeat request HARQ buffer and a second HARQ buffer are disposed on the secondary base station, the method may further include: if the feedback includes a negative acknowledgment NACK and all HARQ processes in the first HARQ buffer are in an occupied state, retransmitting, by the secondary base station, retransmission data to the UE by using an HARQ process in the second HARQ buffer, where the retransmission data includes a data block, in the x data blocks, corresponding to the NACK.

Still further, process IDs of the HARQ processes in the first HARQ buffer are in a one-to-one correspondence with process IDs of HARQ processes in the second HARQ buffer. It is assumed that an HARQ process that is in the first HARQ buffer and whose process ID is y is used to send the first data block to the UE, and then the retransmitting, by the secondary base station, retransmission data to the UE by using an HARQ process in the second HARQ buffer includes the following two possible implementation manners:

In a first manner, if an HARQ process that is in the second HARQ buffer and whose process ID is y is in the occupied state, the secondary base station retransmits the retransmission data to the UE by using another process in the second HARQ buffer, and sends a downlink scheduling grant message to the UE, where the downlink scheduling grant message carries an NDI value, the another process is different from the HARQ process that is in the second HARQ buffer and whose process ID is y, and is in an idle state, and the NDI value is different from an NDI value sent by the secondary base station to the UE last time.

In a second manner, if an HARQ process that is in the second HARQ buffer and whose process ID is y is in an idle state, the secondary base station retransmits the retransmission data to the UE by using the HARQ process that is in the second HARQ buffer and whose process ID is y, and sends a downlink scheduling grant message to the UE, where the downlink scheduling grant message carries an NDI value, and the NDI value is the same as an NDI value sent by the secondary base station to the UE last time.

Optionally, in this embodiment of the present invention, the method further includes: sending, by the secondary base station, second information to the primary base station, where the second information includes one of a quantity m of third PUCCH code channel resources, a quantity m of data blocks in retransmission data sent by the secondary base station to the UE, and a second channel code word, so that the primary base station allocates an identifier of the second PUCCH code channel resource to the secondary base station, where the second PUCCH code channel resource is used by the UE to send a feedback on the retransmission data to the primary base station, and the second channel code word is a channel code word corresponding to the data block in the retransmission data; receiving, by the secondary base station, identifiers that are of the m third PUCCH code channel resources and are sent by the primary base station; sending, by the secondary base station, the identifiers of the m third PUCCH code channel resources to the UE; and receiving, by the secondary base station, the feedback on the retransmission data from the primary base station, where the feedback on the retransmission data is received by the primary base station from the UE by using the third PUCCH code channel resource.

Alternatively, in this embodiment of the present invention, the feedback includes a NACK, and that the secondary base station receives a feedback from the primary base station includes: the secondary base station receives the feedback and an identifier of a third PUCCH code channel resource from the primary base station, where the third PUCCH code channel resource is used by the UE to send a feedback on retransmission data to the primary base station; and the method further includes: sending, by the secondary base station, the identifier of the third PUCCH code channel resource to the UE; and receiving, by the secondary base station, the feedback on the retransmission data from the primary base station, where the feedback on the retransmission data is received by the primary base station from the UE by using the third PUCCH code channel resource.

Embodiment 5

Figure 6:
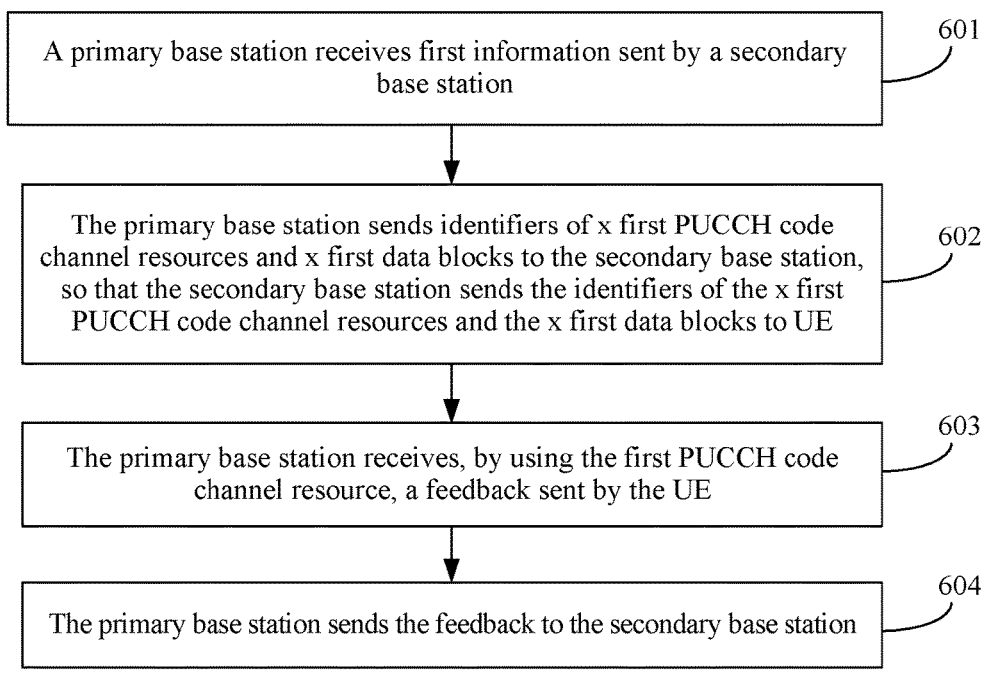
FIG. 6 is a schematic diagram of a data transmission method according to Embodiment 5 of the present invention.

This embodiment of the present invention provides a data transmission method, and the method is applicable to a communications system including a first base station, a second base station, and UE. Both the first base station and the second base station can provide a service for the UE. The following is described by using an example in which the first base station is a primary base station of the UE and the second base station is a secondary base station of the UE. As shown in FIG. 6, the method may include the following steps:

Step 601: The primary base station receives first information sent by the secondary base station.

The first information includes one of a quantity x of first physical uplink control channel PUCCH code channel resources, a quantity x of first data blocks sent by the secondary base station to the user equipment UE, and a first channel code word, where the first PUCCH code channel resource is used by the UE to send a feedback on the first data block to the primary base station, and the first channel code word is a channel code word corresponding to x first data blocks.

Step 602: The primary base station sends identifiers of x first PUCCH code channel resources and x first data blocks to the secondary base station, so that the secondary base station sends the identifiers of the x first PUCCH code channel resources and the x first data blocks to the UE.

Step 603: The primary base station receives, by using the first PUCCH code channel resource, a feedback sent by the UE.

Step 604: The primary base station sends the feedback to the secondary base station.

In this embodiment of the present invention, the secondary base station serves a secondary component carrier of the UE, and the primary base station serves a primary component carrier of the UE.

In this way, because a primary base station determines identifiers of x first PUCCH code channel resources, and a secondary base station sends the identifiers of the x first PUCCH code channel resources and x first data blocks to UE, when the primary base station receives the identifier of the first PUCCH code channel resource and the first data block, the primary base station has already acquired a basis for demodulating a feedback on the first data block, so that the primary base station can demodulate and forward the feedback in a timely manner, thereby improving data transmission efficiency.

Optionally, before step 601 in which the primary base station receives first information sent by the secondary base station, the method further includes: receiving, by the primary base station, a service bearer setup request sent by the UE or a gateway, where the service bearer setup request is used to request to set up a service bearer between the UE, the gateway, and the primary base station; and setting up, by the primary base station, a first Radio Link Control RLC layer logical channel and a second RLC layer logical channel, where the first RLC layer logical channel is used for transmission between the primary base station and the UE, and the second RLC layer logical channel is used for transmission between the primary base station and the secondary base station.

Further, the method may further include: receiving, by the primary base station, a service sent by the gateway; and acquiring, by the primary base station, the x first data blocks from a service of a delay insensitive data service type in the service, and determining the identifiers of the x first PUCCH code channel resources. That the primary base station sends identifiers of x first PUCCH code channel resources and x first data blocks to the secondary base station includes: the primary base station sends the identifiers of the x first PUCCH code channel resources and the x first data blocks to the secondary base station by using the second RLC layer logical channel.

Optionally, the method further includes: receiving, by the primary base station, a service sent by the gateway; determining, by the primary base station, an identifier of a second PUCCH code channel resource, where the second PUCCH code channel resource is used by the UE to send a feedback on a second data block to the primary base station; and sending, by the primary base station, the identifier of the second PUCCH code channel resource and the second data block to the UE by using the first RLC layer logical channel, where the second data block is a data block corresponding to a service of a delay sensitive service type in the service.

Optionally, in this embodiment of the present invention, if the feedback includes a negative acknowledgement NACK, after the primary base station sends the feedback to the secondary base station, the method further includes: receiving, by the primary base station, information indicating that retransmission fails and a sequence number corresponding to retransmission data that are sent by the secondary base station, where the information indicating that the retransmission fails is sent by the secondary base station to the primary base station after it is determined that the feedback includes a NACK and the secondary base station fails to retransmit the retransmission data to the UE; and retransmitting, by the primary base station, the retransmission data to the UE, where the retransmission data includes a data block, in the x first data blocks, corresponding to the NACK.

Alternatively, in this embodiment of the present invention, if the feedback includes a NACK, after the primary base station sends the feedback to the secondary base station, the method further includes: receiving, by the primary base station, second information sent by the secondary base station, where the second information includes one of a quantity m of third PUCCH code channel resources, a quantity m of data blocks in retransmission data sent by the secondary base station to the UE, and a second channel code word, where the third PUCCH code channel resource is used by the UE to send a feedback on the retransmission data to the primary base station, the second channel code word is a channel code word corresponding to the data block in the retransmission data, and the retransmission data includes a data block, in the x first data blocks, corresponding to the NACK; sending, by the primary base station, identifiers that are of the m third PUCCH code channel resources to the secondary base station, so that the secondary base station sends the identifiers of the m third PUCCH code channel resources to the UE; receiving, by the primary base station, the feedback on the retransmission data from the UE by using the third PUCCH code channel resource; and sending, by the primary base station, the feedback on the retransmission data to the secondary base station.

Alternatively, in this embodiment of the present invention, if the feedback includes a NACK, that the primary base station sends the feedback to the secondary base station includes: the primary base station sends the feedback and an identifier of a third PUCCH code channel resource to the secondary base station, so that the secondary base station sends the identifier of the third PUCCH code channel resource to the UE, where the third PUCCH code channel resource is used by the UE to send a feedback on retransmission data to the primary base station, and the retransmission data includes a data block, in the x first data blocks, corresponding to the NACK, and is sent by the secondary base station to the UE. The method further includes: receiving, by the primary base station, the feedback on the retransmission data from the UE by using the third PUCCH code channel resource; and sending, by the primary base station, the feedback on the retransmission data to the secondary base station.

Embodiment 6

The following further describes, by using Embodiment 6 as an example, the method provided in Embodiment 4 and the method provided in Embodiment 5. In this embodiment of the present invention, when a data transmission system that supports CA needs to perform data transmission, UE or a gateway of an EPC network may trigger setup of a service bearer, where the service bearer is a service bearer between the UE, the gateway, and a primary base station; and then perform service transmission on the corresponding service bearer. For example, when a voice service is ongoing, and the UE is a callee, the gateway triggers the setup of the service bearer. For another example, when the UE needs to download data, the UE triggers the setup of the service bearer.

Figure 7:
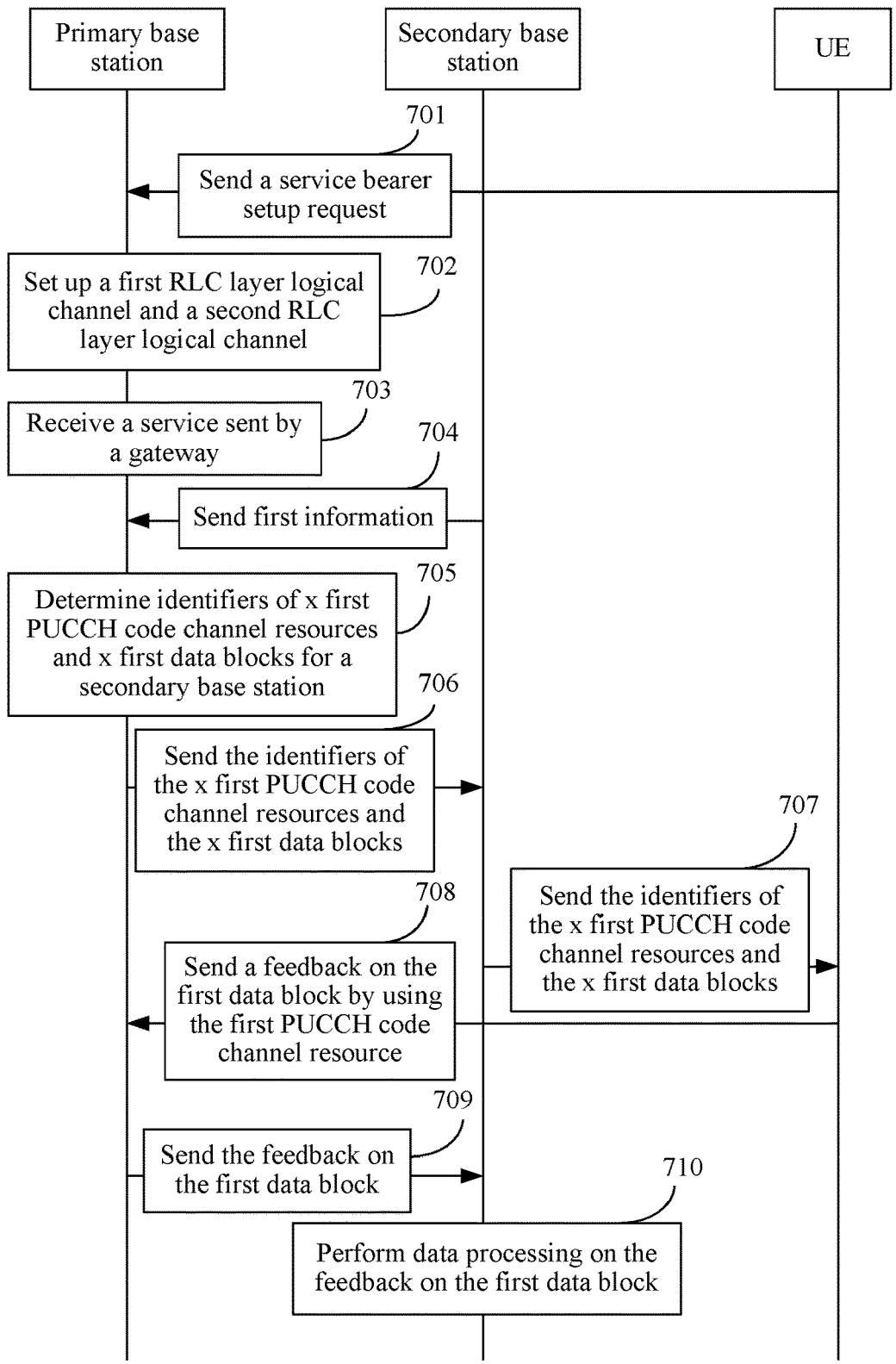
FIG. 7 is a schematic diagram of a data transmission method according to Embodiment 6 of the present invention.

In this embodiment of the present invention, an example in which the UE triggers the setup of the service bearer is used for description. In addition, in this embodiment, it is assumed that a secondary base station serves a secondary component carrier of the UE, and the primary base station serves a primary component carrier of the UE, as shown in FIG. 7.

Step 701: The UE sends a service bearer setup request to the primary base station.

The service bearer setup request is used to request to set up the service bearer between the UE, the gateway, and the primary base station. A process of setting up the service bearer is the same as that in the prior art, and details are not described in the present invention.

Step 702: The primary base station sets up a first RLC layer logical channel and a second RLC layer logical channel according to the service bearer setup request.

The first RLC layer logical channel is used for transmission between the primary base station and the UE, and the second RLC layer logical channel is used for transmission between the primary base station and the secondary base station.

Wireless communications systems such as GPRS, WCDMA, TD-SCDMA, or LTE all include an RLC layer. For example, in a WCDMA system, the RLC layer is located above a MAC layer, and is used to ensure that service data is submitted in order. In this embodiment of the present invention, an RLC layer logical channel is located at an RLC layer, and is used for service transmission, connection control, traffic control, and the like. A function of the RLC layer is implemented by an RLC entity deployed on a base station.

Step 703: The primary base station receives a service sent by the gateway.

The service received by the primary base station is sent by the gateway of the EPC network, and a service type of the service may include at least one of a delay insensitive data service and a delay sensitive data service. The delay insensitive data service refers to a data service that has a low requirement for a delay, for example, a data download service. The delay sensitive data service refers to a service that has a relatively high requirement for a delay, for example, a real-time small packet service such as a signaling service and a voice service. The primary base station may determine the service type of the service according to at least one of a QCI (QoS Class Identifier, QoS class identifier) type, a service feature, a delay parameter, or the like. For a specific method, reference may be made to the prior art. A QCI is a service type differentiation method in a standard protocol. QoS (Quality of Service, quality of service) is a network security mechanism, and is a technology used to resolve a problem such as a network delay and congestion. The service feature includes a size of a data amount, a data coding feature, and the like. The delay parameter may be a PDB.

Step 704: The secondary base station sends first information to the primary base station, where the first information includes one of a quantity x of first PUCCH code channel resources, a quantity x of first data blocks sent by the secondary base station to the user equipment UE, and a first channel code word.

For example, the first PUCCH code channel resource is used by the UE to send a feedback on the first data block to the primary base station, and the first channel code word is a channel code word corresponding to x first data blocks. The first information may be independently sent by the secondary base station to the primary base station, or may be carried in a resource request sent by the secondary base station to the primary base station.

Exemplarily, the secondary base station may determine x, for example, x is 1 or 2. In a method for determining x by the secondary base station, the secondary base station may predict, according to a transmission mode configuration of the UE, a RANK (rank indication) value, an amount of to-be-transmitted data of the service, and an average throughput rate of the secondary base station, whether the UE is to be scheduled by the secondary base station at a second moment and how many data blocks the secondary base station is to send to the UE if the UE is to be scheduled by the secondary base station. The data block is also referred to as a TB. The RANK value is used to indicate a quantity of valid data layers of a PDSCH. In this embodiment of the present invention, it is assumed that a quantity that is of data blocks and that is predicted by the secondary base station is the quantity x of the first data blocks.

Optionally, a quantity of PUCCH code channel resources (which may also be referred to as a quantity of code channels for short) included in the first PUCCH code channel resource is equal to the quantity of the first data blocks. Therefore, because the secondary base station has already determined the quantity x of the first data blocks, it may be accordingly determined that the quantity of the first PUCCH code channel resource is x. Specially, a quantity x of data blocks is also in a one-to-one correspondence with a code word. Exemplarily, when the quantity of data blocks is 1, the quantity of data blocks corresponds to a single code word; when the quantity of data blocks is 2, the quantity of data blocks corresponds to a dual code word. Therefore, in this step, the first information sent by the secondary base station to the primary base station is any one of the quantity x of the first PUCCH code channel resources, the quantity x of the first data blocks sent by the secondary base station to the user equipment UE, and the first channel code word, any one of which can enable the primary base station to determine a quantity of first PUCCH code channel resources needed by the secondary base station and a quantity of first data blocks needed by the secondary base station, so that the primary base station allocates the first PUCCH code channel resource and the first data block to the secondary base station (refer to the following step 705).

Optionally, in this embodiment of the present invention, when a first condition is met, the secondary base station sends the first information to the primary base station, where the first condition includes: a priority of the UE is higher than a priority of other UE accessing the secondary base station. Further, the first condition may further include: a priority of the service is higher than a priority of a message sent by the secondary base station to the other UE accessing the secondary base station.

Exemplarily, when the priority of the UE is higher than the priority of the other UE accessing the secondary base station, but the priority of the service is lower than the priority of the message sent by the secondary base station to the other UE accessing the secondary base station, the secondary base station does not send the first information to the primary base station. When the priority of the UE is higher than the priority of the other UE accessing the secondary base station, and the priority of the service is also higher than the priority of the message sent by the secondary base station to the other UE accessing the secondary base station, the secondary base station sends the first information to the primary base station, so that the primary base station allocates identifiers of x first PUCCH code channel resources and the x first data blocks to the secondary base station according to the first information.

In this way, in a process in which the secondary base station schedules the UE, it can be ensured that a message that is of a relatively high priority, such as a system message and a paging message, and that is of the other UE accessing the secondary base station is preferentially sent, thereby avoiding transmission congestion of a message of a relatively high priority caused by occupation of a channel resource by the UE.

Step 705: The primary base station determines identifiers of x first PUCCH code channel resources and x first data blocks for the secondary base station.

Because the first information includes one of the quantity x of the first PUCCH code channel resources, the quantity x of the first data blocks sent by the secondary base station to the user equipment UE, and the first channel code word, when the first information includes the quantity x of the first PUCCH code channel resources, the primary base station may accordingly determine that the quantity of the first data blocks is x; when the first information includes the quantity x of the first data blocks, the primary base station may accordingly determine that the quantity of the first PUCCH code channel resources is x; when the first information includes the first channel code word, the primary base station determines the quantity of the first data blocks according to the first channel code word, and then determines the quantity of the first PUCCH code channel resources according to the quantity of the first data blocks. For example, if the first channel code word included in the first information is a single code word, the primary base station determines that the quantity of the first data blocks is 1, and that the quantity of the first PUCCH code channel resources is also 1.

The primary base station may acquire the x first data blocks from a service of the delay insensitive data service type in the service, and determine the identifiers of the x first PUCCH code channel resources, where the determining the identifiers of the x first PUCCH code channel resources may be an action of allocating the identifier of the first PUCCH code channel resource.

It should be noted that, when the UE accesses the primary base station, the primary base station configures a preset quantity of PUCCH code channel resources for the UE. The preset quantity of PUCCH code channel resources are configured according to a preset standard, which is the same as a standard by which the secondary base station configures a PUCCH code channel resource for the UE. For example, the preset quantity is 4. Optionally, the quantity of PUCCH code channel resources (which may also be referred to as the quantity of code channels for short) included in the first PUCCH code channel resource is equal to the quantity of the first data blocks, and then in this embodiment, a determined quantity of the first PUCCH code channel resources may be x. For example, the primary base station selects x PUCCH code channel resources from the preset quantity of PUCCH code channel resources, and acquires identifiers of the x PUCCH code channel resources as the identifier of the first PUCCH code channel resource.

Step 706: The primary base station sends the identifiers of the x first PUCCH code channel resources and the x first data blocks to the secondary base station.

Optionally, the primary base station sends the identifiers of the x first PUCCH code channel resources and the x first data blocks to the secondary base station by using the second RLC layer logical channel.

Step 707: The secondary base station sends the identifiers of the x first PUCCH code channel resources and the x first data blocks to the UE.

Optionally, the secondary base station may send the first PUCCH code channel resource and the x first data blocks by scheduling a PDCCH resource and a PDSCH resource. For example, the PDCCH resource bears DCI, which includes resource allocation and other control information on one or more user equipment. In this embodiment, the PDCCH resource may carry the first PUCCH code channel resource. For another example, the PDSCH resource is used to bear data from a transmission channel DSCH, and the PDSCH resource may carry the x first data blocks. The secondary base station transmits the first PUCCH code channel resource and the x first data blocks to the UE by using an air interface.

Step 708: The primary base station receives, by using the first PUCCH code channel resource, a feedback sent by the UE.

It may be understood that, after receiving the identifier of the first PUCCH code channel resource and the first data block from the secondary base station, the UE may send the feedback on the first data block to the primary base station by using the first PUCCH code channel resource. Accordingly, the primary base station receives, by using the first PUCCH code channel resource, the feedback sent by the UE.

A rule in which the UE sends the feedback is corresponding to a rule in which the primary base station performs information parsing, thereby ensuring that a sender and a receiver have same understanding of information. Because the identifier of the first PUCCH code channel resource may include identifiers of multiple PUCCH code channel resources, the UE sends different signals on PUCCH code channel resources indicated by different identifiers, to represent different feedbacks, that is, each feedback is determined according to an identifier of a PUCCH channel resource on which a signal exists and a type of the signal. In this embodiment of the present invention, there may be multiple rules in which the UE sends the feedback and multiple rules in which the primary base station performs information parsing. For example, the UE receives two data blocks, that is, x=2. Accordingly, the identifier of the first PUCCH code channel resource includes identifiers of two PUCCH code channel resources. Referring to Table 1, which is shown in Embodiment 3, Table 1 indicates a transmission situation that exists when there are two PUCCH code channel resources, where (PUCCH, 0) represents an identifier of a first PUCCH code channel resource, (PUCCH, 1) represents an identifier of a second PUCCH code channel resource, HARQ-ACK (0) represents a first data block, and HARQ-ACK (1) represents a second data block. As shown in Table 1, when the UE sends a signal "1, 1" on the second PUCCH code channel resource, that is, on (PUCCH, 1), it represents that the first data block corresponds to an ACK acknowledgement and the second data block corresponds to an ACK acknowledgement; when the UE sends a signal "1, 1" on the first PUCCH code channel resource, that is, on (PUCCH, 0), it represents that the first data block corresponds to an ACK acknowledgement and the second data block corresponds to a NACK acknowledgement; when the UE sends a signal "0, 0" on the second PUCCH code channel resource, that is, on (PUCCH, 1), it represents that the first data block corresponds to a NACK acknowledgement and the second data block corresponds to an ACK acknowledgement; and when the UE sends a signal "0, 0" on the first PUCCH code channel resource (PUCCH, 0), it represents that the first data block corresponds to a NACK acknowledgement and the second data block corresponds to a NACK acknowledgement. It should be noted that, DTX (Discontinuous Transmission, discontinuous transmission) in Table 1 represents that the secondary base station sends only a PDCCH resource to the UE, and does not send a PDSCH resource, and consequently, there is no data transmission on a corresponding PUCCH code channel resource. Because it is assumed, in this embodiment of the present invention, that the secondary base station sends both the PDCCH resource and the PDSCH resource to the UE, a DTX acknowledgement is not involved in this embodiment.

Optionally, the primary base station scans all PUCCH code channel resources, and if it is obtained, by means of scanning, that there is a signal on the first PUCCH code channel resource, parses the signal on the first code channel resource to obtain the feedback on the first data block. The rule in which the primary base station performs information parsing is corresponding to the rule in which the UE sends the feedback, and for details, reference may be made to the foregoing examples. The foregoing method for representing a feedback is only schematically described, and may be preset according to a specific situation in a practical application.

Step 709: The primary base station sends the feedback on the first data block to the secondary base station.

Optionally, the primary base station may receive multiple feedbacks of the UE, which include a feedback, of the UE, on a data block directly sent by the primary base station (that is, a sending process does not include forwarding by another device) to the UE, and also include the feedback on the first data block. The primary base station may exclude, from the received feedbacks, the feedback on the data block directly sent by the primary base station to the UE, and use the remaining feedback as the feedback on the first data block, and send the feedback on the first data block to the secondary base station.

Step 710: The secondary base station performs processing according to the feedback on the first data block.

For example, after receiving the feedback that is on the first data block and that is sent by the primary base station, the secondary base station determines whether the feedback includes a NACK, and the secondary base station may retransmit first retransmission data to the UE if the feedback includes a NACK. Exemplarily, the secondary base station may retransmit the first retransmission data to the UE in an HARQ manner, where the first retransmission data includes a data block, in the first data block, corresponding to the NACK. Herein, the first retransmission data may be the data block, in the first data block, corresponding to the NACK.

Further, the secondary base station may further determine whether the retransmission fails. If the secondary base station determines that the retransmission fails, the secondary base station sends information indicating that the retransmission fails and a sequence number (SN) corresponding to the first retransmission data to the primary base station, so that the primary base station retransmits the first retransmission data to the UE, where the information indicating that the retransmission fails is used to trigger the primary base station to retransmit the first retransmission data to the UE. In this way, after the secondary base station fails in the first retransmission, the primary base station retransmits the first retransmission data again, which can ensure that the first retransmission data is effectively sent to the UE, and reduce a failure rate of data sending.

For another example, the secondary base station may periodically detect whether the feedback sent by the primary base station is received. An example in which a length of one period is a preset period of time is used. If the secondary base station receives the feedback from the primary base station within the preset period of time and the feedback includes a NACK, the secondary base station may further retransmit second retransmission data to the UE in an ARQ (Automatic Repeat-reQuest, automatic repeat request) manner, where the second retransmission data may include a data block, in the first data block, corresponding to the NACK, and may further include a data block, in another feedback of the UE within the preset period of time, corresponding to the NACK. Because the ARQ is a periodic retransmission manner, when the secondary base station uses the ARQ manner, a quantity of stops and waits may be reduced, and data transmission efficiency may be improved. Exemplarily, if the preset period of time is a period of four HARQ RTTs, where a period of one HARQ RTT is 8 ms, the preset period of time is 32 ms. The secondary base station may detect whether feedback information is received within 32 ms, and if the feedback information is received within the preset period of time, detect whether a NACK exists in the feedback information. In the present invention, it is assumed that four NACKs exist, and then the secondary base station retransmits, in the ARQ manner, data corresponding to the four NACKs to the UE.

For another example, a first HARQ buffer and a second HARQ buffer may be disposed on the secondary base station. If the feedback includes a negative acknowledgment NACK and all HARQ processes in the first HARQ buffer are in an occupied state, the secondary base station retransmits third retransmission data to the UE by using an HARQ process in the second HARQ buffer, where the third retransmission data includes a data block, in the first data block, corresponding to the NACK.

In this embodiment, process IDs of the HARQ processes in the first HARQ buffer are in a one-to-one correspondence with process IDs of HARQ processes in the second HARQ buffer. It is assumed that an HARQ process that is in the first HARQ buffer and whose process ID is y is used to send the first data block to the UE, and then this embodiment includes the following two possible implementation solutions:

In a first solution, if an HARQ process that is in the second HARQ buffer and whose process ID is y is in the occupied state, the secondary base station retransmits the third retransmission data to the UE by using another process in the second HARQ buffer, and sends a downlink scheduling grant message to the UE, where the downlink scheduling grant message carries an NDI value, the another process is different from the HARQ process that is in the second HARQ buffer and whose process ID is y, and is in an idle state, and the NDI value is different from an NDI value sent by the secondary base station to the UE last time.

In a second solution, if an HARQ process that is in the second HARQ buffer and whose process ID is y is in an idle state, the secondary base station retransmits the third retransmission data to the UE by using the HARQ process that is in the second HARQ buffer and whose process ID is y, and sends a downlink scheduling grant message to the UE, where the downlink scheduling grant message carries an NDI value, and the NDI value is the same as an NDI value sent by the secondary base station to the UE last time.

In this way, by increasing a quantity of HARQ buffers in a secondary base station, when all HARQ processes in a first HARQ buffer are in a state of waiting for feedback information, a second HARQ buffer is used to retransmit to-be-transmitted data, which reduces a stop and wait phenomenon in a data transmission process and avoids a delay caused by a stop and a wait, thereby reducing an entire delay of data transmission, and improving data transmission efficiency.

Optionally, in a process of retransmitting the retransmission data, the secondary base station acquires an identifier of a third PUCCH code channel resource in different manners, where the third PUCCH code channel resource is used by the UE to send a feedback on the retransmission data to the primary base station. For example, the secondary base station requests the identifier of the third PUCCH code channel resource from the primary base station. For another example, the primary base station actively allocates the identifier of the third PUCCH code channel resource to the secondary base station. Details are described in the following.

Figure 8:
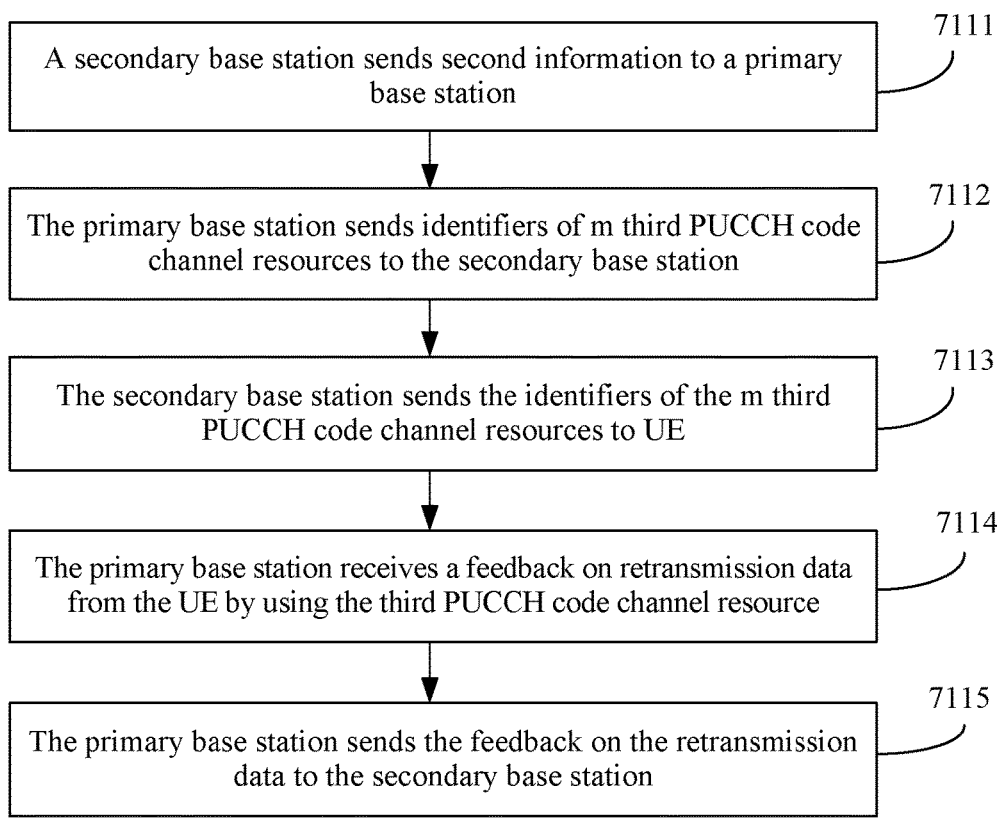
FIG. 8 is a schematic diagram of a method for requesting an identifier of a third PUCCH code channel resource from a primary base station by a secondary base station according to Embodiment 6 of the present invention.

As shown in FIG. 8, a method for requesting the identifier of the third PUCCH code channel resource from the primary base station by the secondary base station includes:

7111. The secondary base station sends second information to the primary base station.

The second information is generated after the secondary base station receives the feedback, the second information includes one of a quantity m of third PUCCH code channel resources, a quantity m of data blocks in retransmission data sent by the secondary base station to the UE, and a second channel code word, where the third PUCCH code channel resource is used by the UE to send a feedback on the retransmission data to the primary base station, and the second channel code word is a channel code word corresponding to the data block in the retransmission data.

Optionally, a quantity of PUCCH code channel resources included in the third PUCCH code channel resource is equal to the quantity of data blocks in the retransmission data. Therefore, because the secondary base station has already determined the quantity m of data blocks in the retransmission data, it may be accordingly determined that the quantity of third PUCCH code channel resources is m. Specially, the quantity m of data blocks is also in a one-to-one correspondence with a code word. Exemplarily, when the quantity of data blocks is 1, the quantity of data blocks corresponds to a single code word; when the quantity of data blocks is 2, the quantity of data blocks corresponds to a dual code word.

It may be understood that the second information may trigger the primary base station to allocate the third PUCCH code channel resource to the secondary base station (like step 7112); therefore, the second information may be considered as being used to request a PUCCH code channel resource.

7112. The primary base station sends identifiers of m third PUCCH code channel resources to the secondary base station.

It may be understood that, in this step, the primary base station determines, according to the second information, the m third PUCCH code channel resources allocated to the secondary base station, and then sends the identifiers of the m third PUCCH code channel resources to the secondary base station.

For example, if the second information includes the quantity m of third PUCCH code channel resources, the primary base station may directly determine that the quantity of third PUCCH code channel resources is m. For another example, if the first information includes the quantity m of data blocks in the retransmission data, the primary base station may accordingly determine that the quantity of first PUCCH code channel resources is the same as the quantity of data blocks in the retransmission data, that is, m. For another example, when the first information includes the second channel code word, if the second channel code word is a dual code word, the primary base station determines that the quantity of data blocks in the retransmission data is 2; if the second channel code word is a single code word, the primary base station determines that the quantity of data blocks in the retransmission data is 1; and then the primary base station determines that the quantity of third PUCCH code channel resources is the same as the quantity of data blocks in the retransmission data.

When the UE accesses the primary base station, the primary base station configures a preset quantity of PUCCH code channel resources for the UE. The preset quantity of PUCCH code channel resources are configured according to a preset standard, which is the same as a standard by which the secondary base station configures the PUCCH code channel resource for the UE. The primary base station may configure m third PUCCH code channel resources for the secondary base station, that is, select m PUCCH code channel resources from the preset quantity of PUCCH code channel resources, and acquire identifiers of the m PUCCH code channel resources as the identifier of the third PUCCH code channel resource, and then send the identifiers of the m third PUCCH code channel resources to the secondary base station.

7113. The secondary base station sends the identifiers of the m third PUCCH code channel resources to the UE.

7114. The primary base station receives a feedback on retransmission data from the UE by using the third PUCCH code channel resource.

For a feedback process, reference may be made to the foregoing step 708.

7115. The primary base station sends the feedback on the retransmission data to the secondary base station.

Figure 9:
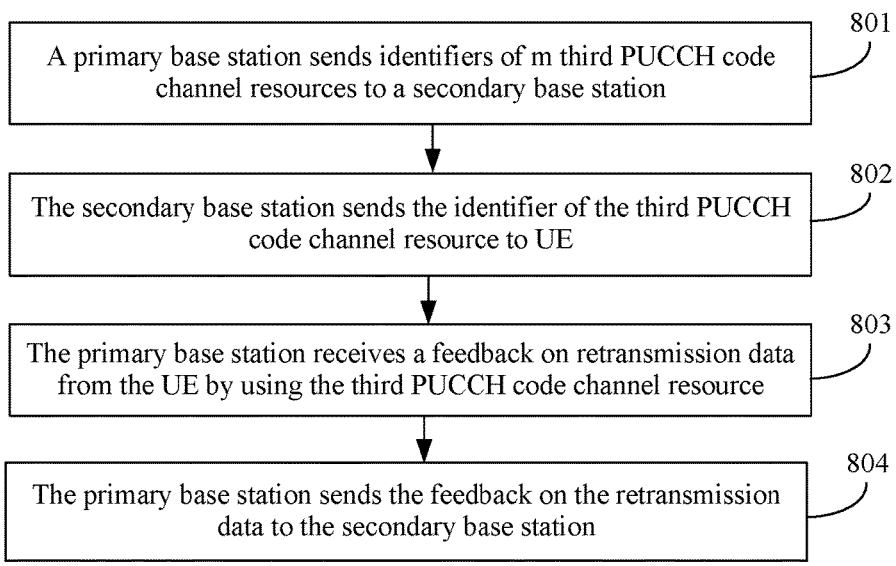
FIG. 9 is a schematic diagram of a method for actively allocating an identifier of a third PUCCH code channel resource to a secondary base station by a primary base station according to Embodiment 6 of the present invention.

As shown in FIG. 9, a method for actively allocating the identifier of the third PUCCH code channel resource to the secondary base station by the primary base station includes:

801. The primary base station sends identifiers of m third PUCCH code channel resources to the secondary base station.

The third PUCCH code channel resource is used by the UE to send a feedback on retransmission data to the primary base station.

It should be noted that the primary base station may exclude, from received feedbacks, a feedback on a data block sent by the primary base station to the UE, and use the remaining feedback as the feedback on the first data block; and then determine whether a NACK exists in the feedback on the first data block, and if a NACK exists, allocate the third PUCCH code channel resource to a data block, in the first data block, corresponding to the NACK, that is, the retransmission data. Step 801 and step 708 are executed at the same time, that is, the primary base station sends the identifier of the third PUCCH code channel resource at the same time of sending the feedback on the first data block, and does not need to execute step 801 after another trigger occurs. In this way, a quantity of times of inter-station transmission and delays can be effectively reduced.

802. The secondary base station sends the identifier of the third PUCCH code channel resource to the UE.

803. The primary base station receives a feedback on retransmission data from the UE by using the third PUCCH code channel resource.

For a feedback process, reference may be made to the foregoing step 708.

804. The primary base station sends the feedback on the retransmission data to the secondary base station.

It should be noted that, in a process of executing the foregoing steps, the primary base station may receive a service sent by the gateway, and determine a second PUCCH code channel resource, where the second PUCCH code channel resource is used by the UE to send a feedback on a second data block to the primary base station; and the primary base station sends an identifier of the second PUCCH code channel resource and the second data block to the UE by using the first RLC layer logical channel, where the second data block is a data block corresponding to a service of a delay sensitive service type in the service.

In the prior art, after receiving a service sent by a gateway, the primary base station may separately send different data blocks in service data of a same service type to the secondary base station and the UE, and a data block sent to the secondary base station is then sent by the secondary base station to the UE. Sequence numbers of the data blocks may be disordered because of a delay of inter-station transmission between the primary base station and the secondary base station. In this embodiment of the present invention, by setting up two RLC layer logical channels and performing corresponding service type differentiation, services of different service types are effectively offloaded, and data blocks of a same service type are sent by using only a same RLC layer logical channel, thereby avoiding sequence number disorder of the data blocks, and improving timeliness of a service.

Further, the primary base station may send, by using the first RLC layer logical channel, the identifier of the second PUCCH code channel resource and the second data block to the UE at the same time when step 707 is executed. In this way, the primary base station and the secondary base station send a data block to the UE at the same time, which may implement carrier aggregation between the primary base station and the secondary base station, and improve a peak throughput rate of a data transmission system.

According to the data transmission method provided in this embodiment of the present invention, because a primary base station determines identifiers of x first PUCCH code channel resources, and a secondary base station sends the identifiers of the x first PUCCH code channel resources and x first data blocks to UE, when the primary base station receives the identifier of the first PUCCH code channel resource and the first data block, the primary base station has already acquired a basis for demodulating a feedback on the first data block, so that the primary base station can demodulate and forward the feedback in a timely manner, thereby improving data transmission efficiency.

Embodiment 7

This embodiment of the present invention provides a data transmission method, and the method is applicable to a communications system including a first base station and UE. The first base station provides a service for the UE. Further, the method is also applicable to a scenario in which both the first base station and a second base station provide a service for the UE. For example, in the foregoing Embodiment 1 to Embodiment 6, examples in which the method is applied to a CA scenario are provided. The first base station is a primary base station of the UE, and the second base station is a secondary base station of the UE.

Figure 10:
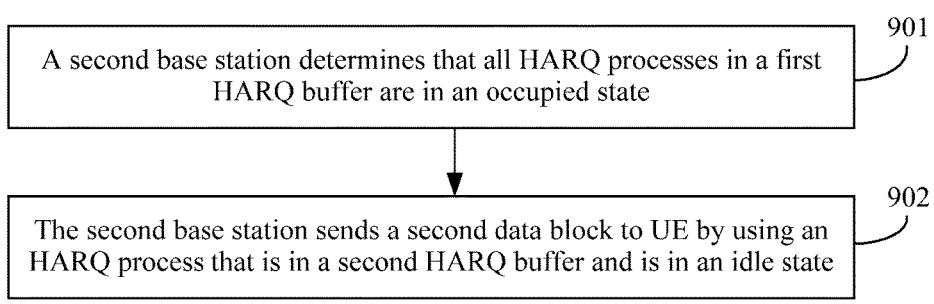
FIG. 10 is a schematic diagram of a data transmission method according to Embodiment 7 of the present invention.

In this embodiment, as shown in FIG. 10, the method includes the following steps:

Step 901: The second base station determines that all HARQ processes in a first HARQ buffer are in an occupied state.

Step 902: The second base station sends a second data block to the user equipment UE by using an HARQ process that is in a second HARQ buffer and is in an idle state.

The first HARQ buffer and the second HARQ buffer are different HARQ buffers disposed on the second base station. Each of the HARQ buffers is provided with a preset quantity of HARQ processes, and a quantity of HARQ processes in an HARQ buffer is equal to a quantity of TTIs (Transmission Time Interval, transmission time interval).

In this way, by disposing a first HARQ buffer and a second HARQ buffer on a second base station, a quantity of HARQ buffers is increased. When all HARQ processes in the first HARQ buffer are in an occupied state, a second data block is sent by using an HARQ process that is in the second HARQ buffer and that is in an idle state, which reduces a stop and wait phenomenon in a data transmission process and avoids a delay caused by a stop and a wait, thereby improving data transmission efficiency.

Optionally, process IDs of the HARQ processes in the first HARQ buffer are in a one-to-one correspondence with process IDs of HARQ processes in the second HARQ buffer.

Further, before the second base station determines that all the HARQ processes in the first HARQ buffer are in the occupied state, the method further includes: sending, by the second base station, a first data block to the UE by using an HARQ process that is in the first HARQ buffer and whose process ID is y.

Accordingly, before the second base station sends the second data block to the UE by using the HARQ process that is in the second HARQ buffer and that is in the idle state, the method further includes: receiving, by the second base station, a feedback, of the UE, on the first data block. If the feedback includes a negative acknowledgment NACK, the second data block is a data block, in the first data block, corresponding to the NACK; or if the feedback includes a positive acknowledgment ACK, the second data block is a data block different from the first data block.

Still further, if the feedback includes a NACK and an HARQ process that is in the second HARQ buffer and whose process ID is y is in an idle state, that the second base station sends a second data block to the UE by using an HARQ process that is in a second HARQ buffer and is in an idle state includes: the second base station sends the second data block to the UE by using the HARQ process that is in the second HARQ buffer and whose process ID is y, and sends a downlink scheduling grant message to the UE, where the downlink scheduling grant message carries an NDI value, and the NDI value is the same as an NDI value sent by the second base station to the UE last time.

Optionally, if the feedback includes a NACK, after the second base station sends the second data block to the UE by using the HARQ process that is in the second HARQ buffer and that is in the idle state, the method further includes: determining, by the second base station, that the second data block fails to be sent by using the HARQ process that is in the second HARQ buffer and that is in the idle state; and sending, by the second base station to the first base station, information that indicates the failure and a sequence number corresponding to the second data block, where the information that indicates the failure is used to trigger the first base station to retransmit the second data block to the UE. The second base station serves a secondary component carrier of the UE, and the first base station serves a primary component carrier of the UE.

Optionally, in this embodiment, the receiving, by the second base station, a feedback, of the UE, on the first data block includes: receiving, by the second base station, the feedback from the first base station, where the feedback is sent by the UE to the first base station by using a first physical uplink control channel PUCCH code channel resource, and an identifier of the first PUCCH code channel resource is determined by the second base station and is sent by the second base station to the first base station and the UE, or an identifier of the first PUCCH code channel resource is received by the second base station from the first base station after the second base station requests the first base station to allocate a PUCCH code channel resource.

Embodiment 8

By using Embodiment 8 as an example, the following further describes the method provided in Embodiment 7.

This embodiment and the foregoing Embodiment 1 to Embodiment 6 may be cross-referenced and complemented to each other. It may be understood that, when this embodiment is applicable to a CA scenario, a second base station may serve a secondary component carrier of UE, and a first base station may serve a primary component carrier of the UE.

Figure 11:
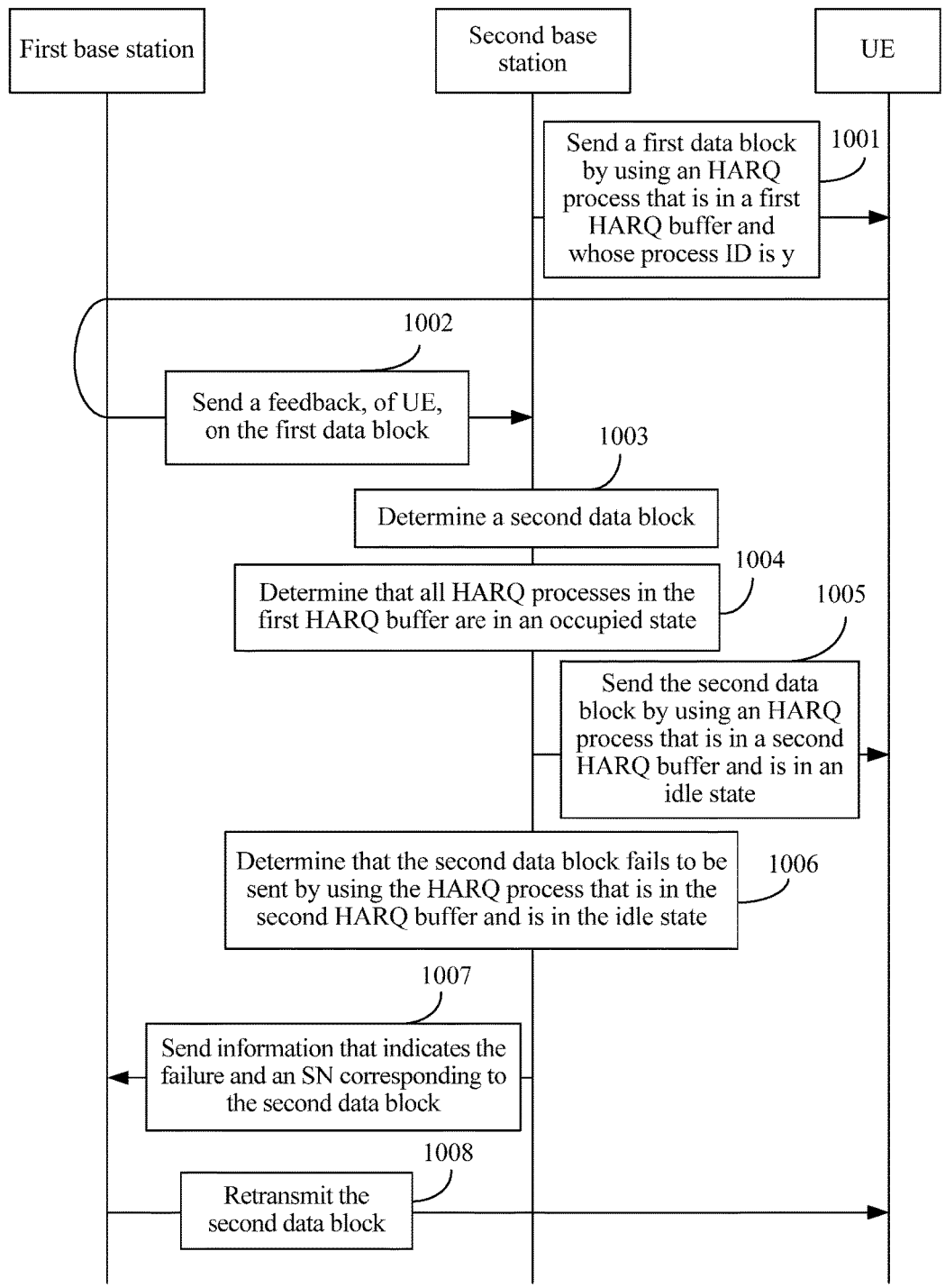
FIG. 11 is a schematic diagram of a data transmission method according to Embodiment 8 of the present invention.

This embodiment of the present invention provides a data transmission method. As shown in FIG. 11, the method includes the following steps:

Step 1001: The second base station sends a first data block to the UE by using an HARQ process that is in a first HARQ buffer and whose process ID is y.

Step 1002: The second base station receives a feedback, of the UE, on the first data block.

Optionally, the second base station receives the feedback from the first base station, where the feedback is sent by the UE to the first base station by using a first PUCCH code channel resource. An identifier of the first PUCCH code channel resource is determined by the second base station and is sent by the second base station to the first base station and the UE, or an identifier of the first PUCCH code channel resource is received by the second base station from the first base station after the second base station requests the first base station to allocate a PUCCH code channel resource. For a specific process, reference may be made to corresponding descriptions in Embodiment 3 and Embodiment 7, and details are not described again in this embodiment.

Step 1003: The second base station determines a second data block.

The second data block may be classified into two types, which are new data and retransmission data, where the new data is data to be transmitted to the UE the first time, and the retransmission data is data to be transmitted to the UE the second time or more than the second time.

Optionally, if the feedback includes a NACK and the second data block is a data block, in the first data block, corresponding to the NACK, in this case, the second data block is the retransmission data. Alternatively, if the feedback includes a positive acknowledgement ACK and the second data block is a data block different from the first data block, in this case, the second data block is the new data.

Optionally, in this embodiment of the present invention, data that needs to be transmitted to the UE may be buffered at an RLC layer of the first base station or an RLC layer of the second base station. When a priority of the UE is higher than a priority of other UE accessing the second base station, the second base station acquires second data from a service locally buffered at the RLC layer of the second base station or a service buffered at the RLC layer of the first base station, and then the second data is the new data. After the data is transmitted to the UE the first time, the data is buffered at a MAC layer of the first base station or a MAC layer of the second base station. The second base station receives a feedback sent by the first base station, and if the feedback includes a NACK, data corresponding to the NACK is acquired at the MAC layer as the retransmission data. Therefore, if the second data acquired by the second base station is from the RLC layer, the data is the new data; if the second data acquired by the second base station is from the MAC layer, the data is the retransmission data.

Step 1004: The second base station determines that all HARQ processes in the first HARQ buffer are in an occupied state.

In this embodiment of the present invention, a status of an HARQ process in an HARQ buffer is generally classified into two types: one is an idle state, that is, the HARQ process is not occupied by data; the other is an occupied state, that is, the HARQ buffer performs data transmission by using the HARQ process, where the HARQ process is occupied by data, and waits for corresponding feedback information. Generally, each HARQ process can transmit two data blocks.

Step 1005: The second base station sends the second data block to the user equipment UE by using an HARQ process that is in a second HARQ buffer and is in an idle state.

The first HARQ buffer and the second HARQ buffer are different HARQ buffers disposed on the second base station. Optionally, process IDs of the HARQ processes in the first HARQ buffer are in a one-to-one correspondence with process IDs of HARQ processes in the second HARQ buffer.

Optionally, if the feedback includes a NACK and an HARQ process that is in the second HARQ buffer and whose process ID is y is in an idle state, the second base station sends the second data block to the UE by using the HARQ process that is in the second HARQ buffer and whose process ID is y, and sends a downlink scheduling grant message to the UE, where the downlink scheduling grant message carries an NDI value, and the NDI value is the same as an NDI (New Data Index, new data index) value sent by the second base station to the UE last time.

Optionally, if the feedback includes a NACK and an HARQ process that is in the second HARQ buffer and whose process ID is y is in an occupied state, the second base station retransmits the retransmission data to the UE by using another process in the second HARQ buffer, and sends a downlink scheduling grant message to the UE, where the downlink scheduling grant message carries an NDI value, a process ID of the another process is not y, the another process is in an idle state, and the NDI value is different from an NDI value sent by the second base station to the UE last time.

It should be noted that, the NDI value is used to indicate whether transmitted data is the new data. If the NDI value is the same as the NDI value sent by the second base station to the UE the last time, it indicates that currently-transmitted data is the retransmission data; if the NDI value is different from the NDI value sent by the second base station to the UE the last time, it indicates that the currently-transmitted data is the new data. The UE determines, according to the received NDI value, whether the corresponding second data block is the new data. Specially, if the feedback includes a NACK and the HARQ process that is in the second HARQ buffer and whose process ID is y is in an occupied state, because the second base station retransmits the retransmission data to the UE by using the another process in the second HARQ buffer, although retransmission of the second data block is actually executed on a second-base-station side, that is, the second base station can determine that the second data block is the retransmission data, the second base station adds a new NDI value to the downlink scheduling grant message, and after receiving the NDI value, the UE determines that the second data block is the new data, and processes the second data block in a manner of processing new data. Details are not described again in the present invention.

Generally, 0 and 1 are used to identify whether transmitted data is new data. Exemplarily, if a currently-received NDI value is 0, and an NDI value sent by the second base station to the UE last time is 0, the UE considers that currently-received data is retransmission data; if an NDI value sent by the second base station to the UE last time is 1, the UE considers that currently-received data is new data.

Step 1006: The second base station determines that the second data block fails to be sent by using the HARQ process that is in the second HARQ buffer and that is in the idle state.

Step 1007: The second base station sends, to the first base station, information that indicates the failure and an SN corresponding to the second data block, where the information that indicates the failure is used to trigger the first base station to retransmit the second data block to the UE.

Step 1008: The first base station retransmits the second data block to the UE.

The first base station may perform a query on the first base station according to the sequence number (SN) corresponding to the second data block to acquire corresponding first retransmission data, and retransmit the first retransmission data to the UE in an ARQ retransmission manner. In this way, after the second base station fails in the first retransmission, the first base station retransmits the first retransmission data again, which can ensure that the first retransmission data is effectively sent to the UE, and reduce a failure rate of data sending.

Specially, an HARQ buffer that is different from the first HARQ buffer and the second HARQ buffer may further be disposed on the second base station and used as a standby HARQ buffer. When all HARQ processes in the first HARQ buffer and the second HARQ buffer are in an occupied state, the second data block is sent to the UE by using an HARQ process that is in the standby HARQ buffer and is in an idle state.

It should be noted that a sequence of the steps in the data transmission method provided in this embodiment may be properly adjusted, a step may also be accordingly added or removed according to a condition, and a specific step may also be adjusted with reference to the steps in the foregoing embodiment and Embodiment 7. Any variation of the method that is readily figured out by a person skilled in the art within the technical scope disclosed in the present invention shall fall within the protection scope of the present invention, and therefore, details are not described again.

According to the data transmission method provided in this embodiment of the present invention, by disposing a first HARQ buffer and a second HARQ buffer on a second base station, a quantity of HARQ buffers is increased. When all HARQ processes in the first HARQ buffer are in an occupied state, a second data block is sent by using an HARQ process that is in the second HARQ buffer and that is in an idle state, which reduces a stop and wait phenomenon in a data transmission process and avoids a delay caused by a stop and a wait, thereby improving data transmission efficiency.

The present invention further provides an apparatus and a system that are configured/used to implement the data transmission method provided in the foregoing embodiments, which are described with examples in the following.

Embodiment 9

Figure 12:
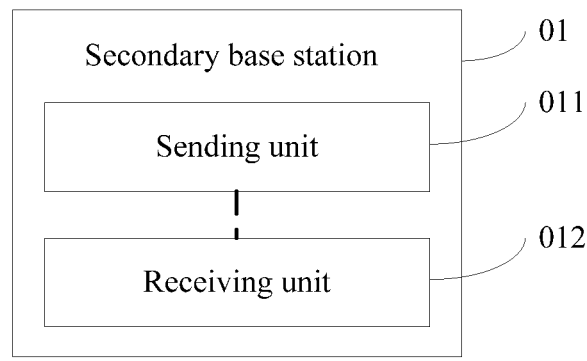
FIG. 12 is a schematic structural diagram of a base station according to Embodiment 9 of the present invention.

This embodiment of the present invention provides a base station 01. As shown in FIG. 12, the base station 01 includes a sending unit 011 and a receiving unit 012.

The sending unit 011 is configured to send an identifier of a first physical uplink control channel PUCCH code channel resource to a first base station at a first moment, so that the first base station determines to receive, by using the first PUCCH code channel resource, a feedback that is on a first data block and that is sent by user equipment UE.

The sending unit 011 is further configured to send the identifier of the first PUCCH code channel resource and the first data block to the UE at a second moment.

The receiving unit 012 is configured to receive the feedback from the first base station, where the feedback is received by the first base station from the UE by using the first PUCCH code channel resource.

The second moment is later than the first moment, an interval T between the second moment and the first moment is greater than or equal to a delay t for performing one-time transmission between the base station 01 and the first base station, the base station 01 serves a secondary component carrier of the UE, and the first base station serves a primary component carrier of the UE.

Figure 13:
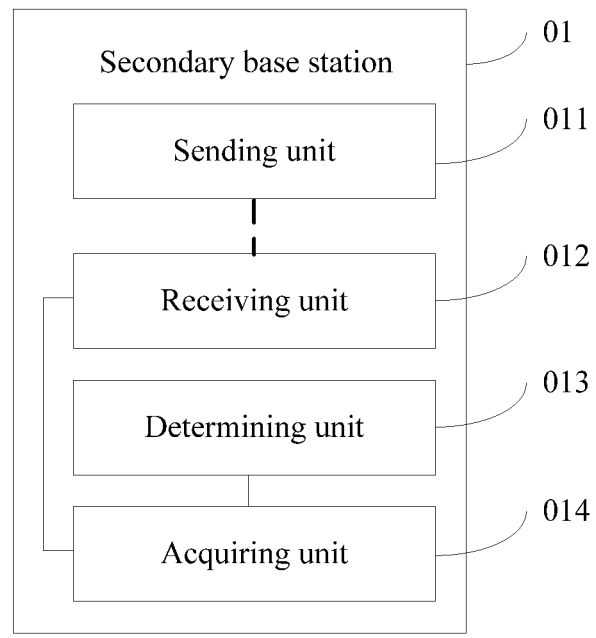
FIG. 13 is a schematic structural diagram of another base station according to Embodiment 9 of the present invention.

Optionally, as shown in FIG. 13, the base station 01 may further include:

a determining unit 013, configured to determine x before the first moment, where x is a quantity of the first data blocks, and the receiving unit 012 is further configured to receive and buffer, before the first moment, a service sent by the first base station; and an acquiring unit 014, configured to acquire x first data blocks from the buffered service before the second moment.

Figure 14:
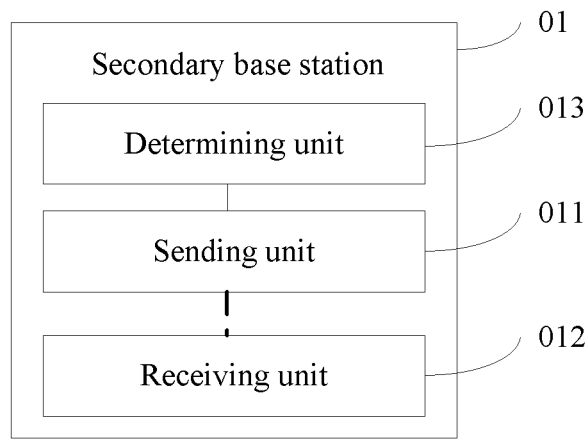
FIG. 14 is a schematic structural diagram of still another base station according to Embodiment 9 of the present invention.

Optionally, as shown in FIG. 14, the base station 01 may include:

a determining unit 013, configured to determine x before the first moment, where x is a quantity of the first data blocks; the sending unit 011 is further configured to send x to the first base station at the first moment; and the receiving unit 012 is further configured to receive, before the second moment, x first data blocks sent by the first base station.

Optionally, when a first condition is met, the acquiring unit 014 is configured to acquire the x first data blocks from the buffered service, or the sending unit 011 sends x to the first base station, where the first condition includes: a priority of the UE is higher than a priority of other UE accessing the base station 01. Optionally, the first condition may further include: a priority of the service is higher than a priority of a message sent by the base station 01 to the other UE accessing the base station 01.

Optionally, the delay t of one-time inter-station unidirectional transmission between the base station 01 and the first base station meets the following formula:

$t=t1*A+B$, where t1 is a theoretical transmission delay between the first base station and the base station 01, A is a constant for adjusting t1, and B is an offset constant of t1.

Figure 15:
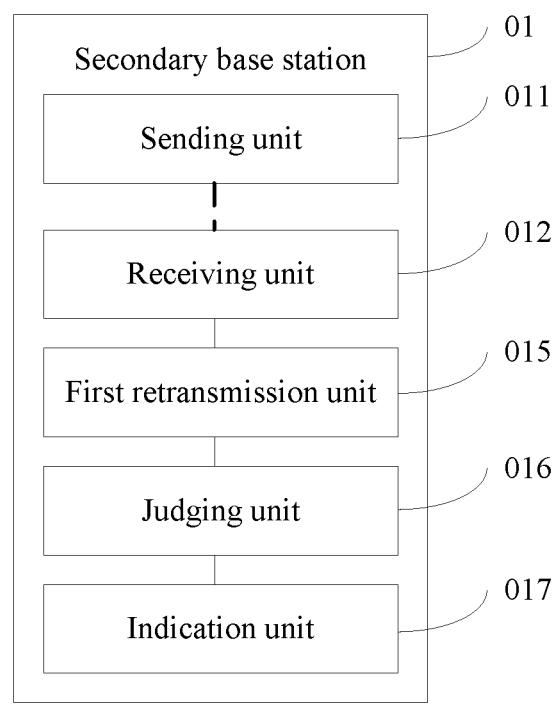
FIG. 15 is a schematic structural diagram of yet another base station according to Embodiment 9 of the present invention.

Optionally, as shown in FIG. 15, the base station 01 may further include:

a first retransmission unit 015, configured to retransmit retransmission data to the UE when the feedback includes a negative acknowledgement NACK, where the retransmission data includes a data block, in the first data block, corresponding to the NACK;

a judging unit 016, configured to determine whether the retransmission fails; and an indication unit 017, configured to: when the judging unit 016 determines that the retransmission fails, send, to the first base station, information indicating that the retransmission fails and a sequence number corresponding to the retransmission data, where the information indicating that the retransmission fails is used to trigger the first base station to retransmit the retransmission data to the UE.

Figure 16:
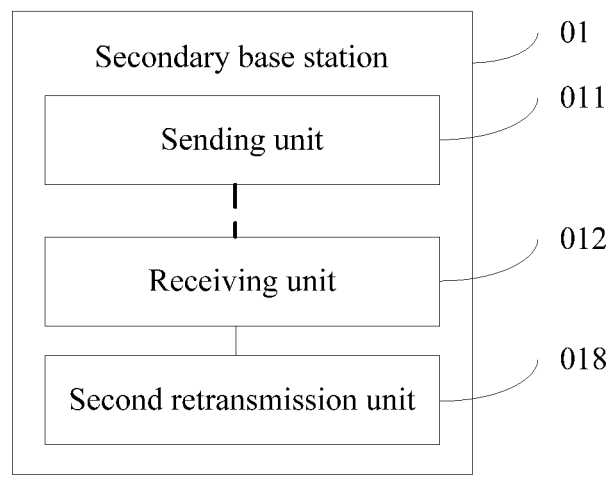
FIG. 16 is a schematic structural diagram of still yet another base station according to Embodiment 9 of the present invention.

Optionally, as shown in FIG. 16, the base station 01 may further include:

a second retransmission unit 018, configured to: when the feedback is received from the first base station within a preset period of time and the feedback includes a NACK, retransmit retransmission data to the UE in an automatic repeat request ARQ manner, where the retransmission data includes a data block, in the first data block, corresponding to the NACK.

Figure 17:
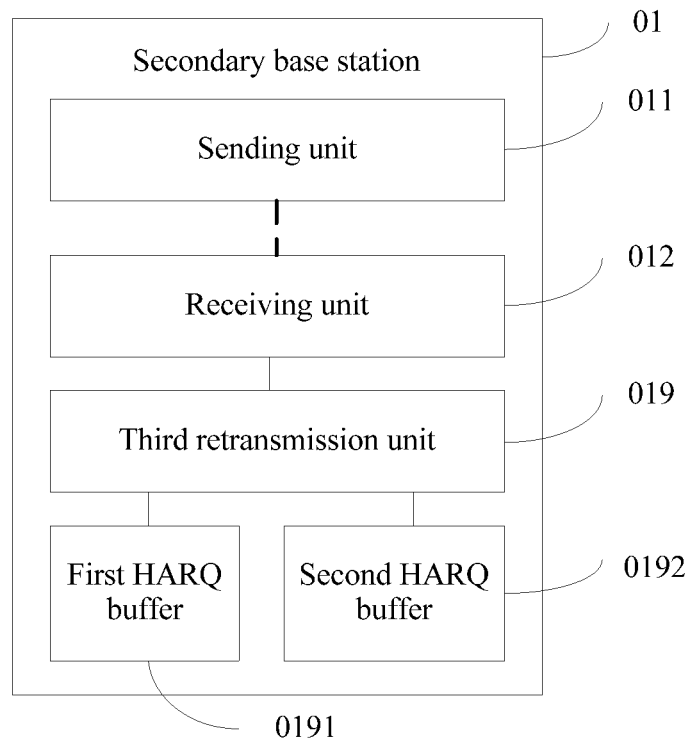
FIG. 17 is a schematic structural diagram of a further base station according to Embodiment 9 of the present invention.

Optionally, as shown in FIG. 17, the base station 01 further includes a first HARQ buffer 0191, a second HARQ buffer 0192, and a third retransmission unit 019.

The third retransmission unit 019 is configured to: when the feedback includes a negative acknowledgment NACK and all HARQ processes in the first HARQ buffer 0191 are in an occupied state, retransmit retransmission data to the UE by using an HARQ process in the second HARQ buffer 0192, where the retransmission data includes a data block, in the first data block, corresponding to the NACK.

Optionally, process IDs of the HARQ processes in the first HARQ buffer 0191 are in a one-to-one correspondence with process IDs of HARQ processes in the second HARQ buffer 0192.

When an HARQ process that is in the first HARQ buffer 0191 and whose process ID is y is used to send the first data block to the UE, the third retransmission unit 019 may be specifically configured to:

if an HARQ process that is in the second HARQ buffer 0192 and whose process ID is y is in an occupied state, retransmit the retransmission data to the UE by using another process in the second HARQ buffer 0192, and send a downlink scheduling grant message to the UE, where the downlink scheduling grant message carries an NDI value, the another process is different from the HARQ process that is in the second HARQ buffer and whose process ID is y, and is in an idle state, and the NDI value is different from an NDI value sent by the base station to the UE last time; or if an HARQ process that is in the second HARQ buffer 0192 and whose process ID is y is in an idle state, retransmit the retransmission data to the UE by using the HARQ process that is in the second HARQ buffer 0192 and whose process ID is y, and send a downlink scheduling grant message to the UE, where the downlink scheduling grant message carries an NDI value, and the NDI value is the same as an NDI value sent by the base station to the UE last time.

In this way, because a sending unit sends an identifier of a first PUCCH code channel resource to a first base station at a first moment, the first base station receives the identifier of the first PUCCH code channel resource at a moment between the first moment and a second moment, which ensures that at the second moment, that is, when the base station sends the identifier of the first PUCCH code channel resource and a first data block to UE, the first base station has already acquired a basis for demodulating a feedback on the first data block, so that the first base station can demodulate and forward the feedback in a timely manner, thereby improving data transmission efficiency.

Embodiment 10

Figure 18:
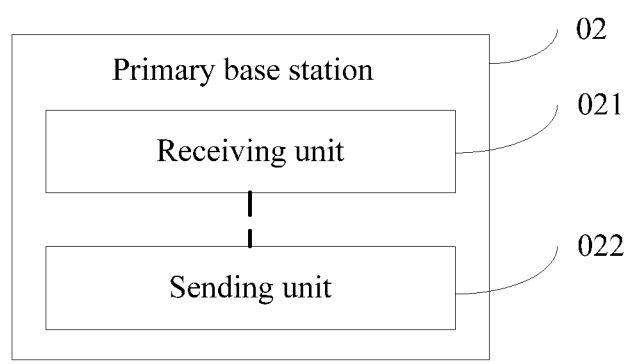
FIG. 18 is a schematic structural diagram of a base station according to Embodiment 10 of the present invention.

This embodiment of the present invention provides a base station 02. As shown in FIG. 18, the base station 02 includes a receiving unit 022 and a sending unit 021.

The receiving unit 021 is configured to receive an identifier that is of a first physical uplink control channel PUCCH code channel resource and that is sent by a second base station at a first moment.

The receiving unit 022 is further configured to receive, by using the first PUCCH code channel resource, a feedback sent by user equipment UE, where the feedback is a feedback, of the UE, on a first data block sent by the second base station at a second moment.

The sending unit 021 is configured to send the feedback to the second base station.

The second moment is later than the first moment, an interval T between the second moment and the first moment is greater than or equal to a delay t for performing one-time transmission between the second base station and the base station 02, the second base station serves a secondary component carrier of the UE, and the base station 02 serves a primary component carrier of the UE.

Optionally, the receiving unit 021 is further configured to receive, before the first moment, a service bearer setup request sent by the UE or a gateway, where the service bearer setup request is used to request to set up a service bearer between the UE, the gateway, and the base station 02.

Figure 19:
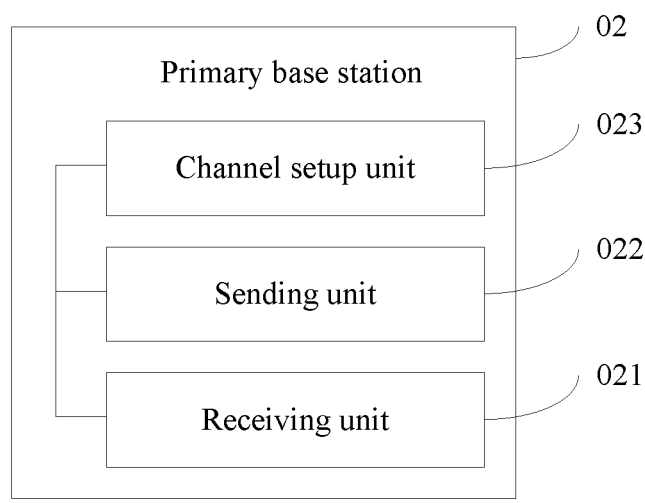
FIG. 19 is a schematic structural diagram of another base station according to Embodiment 10 of the present invention.

As shown in FIG. 19, the base station 02 may further include:

a channel setup unit 023, configured to set up a first Radio Link Control RLC layer logical channel and a second RLC layer logical channel, where the first RLC layer logical channel is used for transmission between the base station and the UE, and the second RLC layer logical channel is used for transmission between the base station and the second base station.

Figure 20:
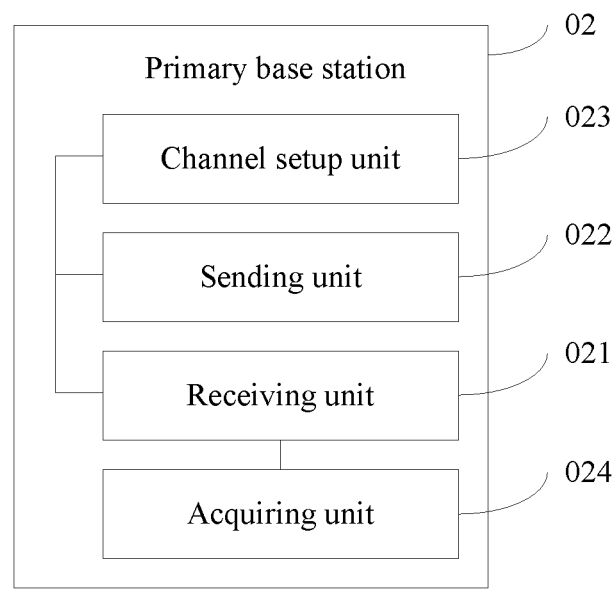
FIG. 20 is a schematic structural diagram of still another base station according to Embodiment 10 of the present invention.

Optionally, in this embodiment, the receiving unit 021 is further configured to receive a service sent by the gateway, and the sending unit 022 is further configured to send a service of a delay insensitive data service type in the service to the second base station before the first moment by using the second RLC layer logical channel. Alternatively, in this embodiment, the receiving unit 021 is further configured to receive x sent by the second base station at the first moment, where x is a quantity of the first data blocks sent by the second base station to the UE at the second moment. As shown in FIG. 20, the base station 02 may further include an acquiring unit 024, configured to acquire, before the second moment, x first data blocks from a service of a delay insensitive data service type in the service, where the sending unit 022 sends the x first data blocks to the second base station by using the second RLC layer logical channel.

Figure 21:
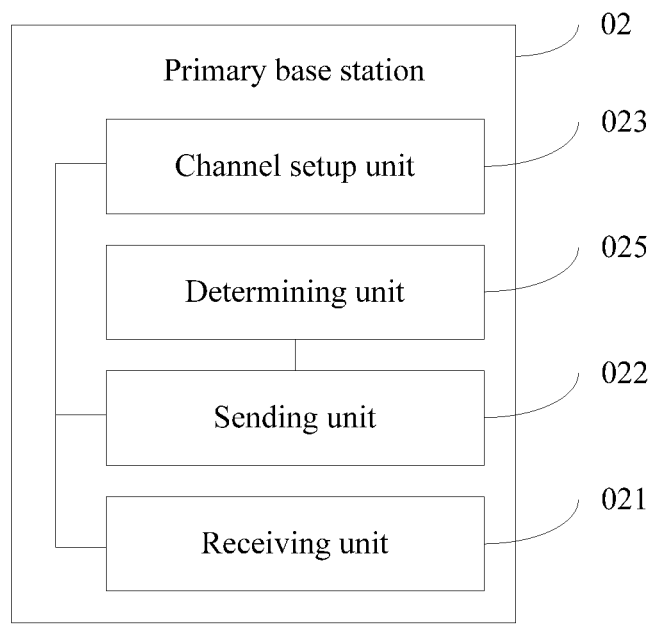
FIG. 21 is a schematic structural diagram of yet another base station according to Embodiment 10 of the present invention.

Optionally, in this embodiment, the receiving unit 021 is further configured to receive a service sent by the gateway. As shown in FIG. 21, the base station 02 further includes: a determining unit 025, configured to determine a second PUCCH code channel resource, where the second PUCCH code channel resource is used by the UE to send a feedback on a second data block to the base station 02. The sending unit 022 is further configured to send an identifier of the second PUCCH code channel resource and the second data block to the UE by using the first RLC layer logical channel, where the second data block is a data block corresponding to a service of a delay sensitive service type in the service.

Optionally, the delay t of one-time inter-station unidirectional transmission between the second base station and the base station meets the following formula:

$t=t1*A+B$, where t1 is a theoretical transmission delay between the base station 02 and the second base station, A is a constant for adjusting t1, and B is an offset constant of t1.

Figure 22:
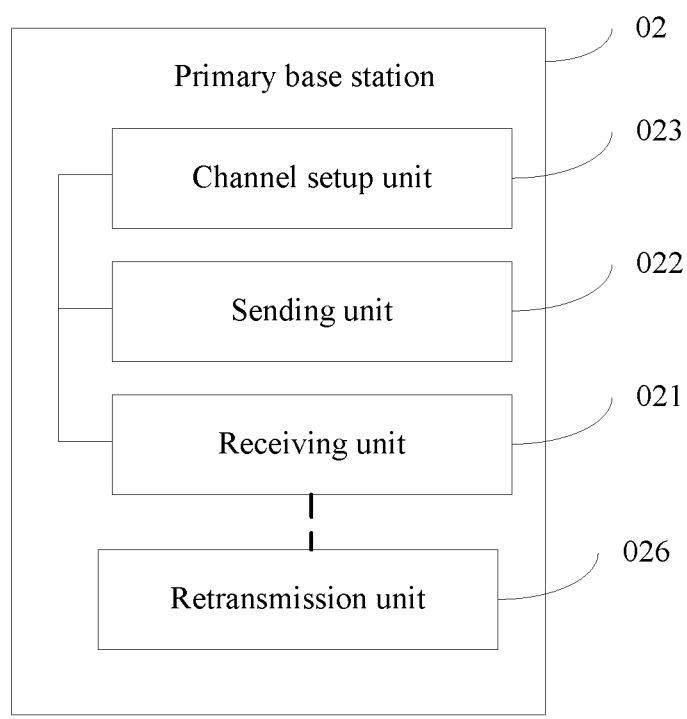
FIG. 22 is a schematic structural diagram of still yet another base station according to Embodiment 10 of the present invention.

Optionally, in this embodiment of the present invention, the receiving unit 021 is further configured to: after the base station 02 sends the feedback to the second base station, receive information indicating that retransmission fails and a sequence number corresponding to retransmission data that are sent by the second base station, where the information indicating that the retransmission fails is sent by the second base station to the base station 02 after it is determined that the feedback includes a NACK and the second base station fails to retransmit the retransmission data to the UE. Optionally, as shown in FIG. 22, the base station 02 further includes a retransmission unit 026, configured to retransmit the retransmission data to the UE, where the retransmission data is a data block, in the first data block, corresponding to the NACK.

Because a receiving unit receives an identifier of a first PUCCH code channel resource before a second moment, it is ensured that at the second moment, that is, when a second base station sends the identifier of the first PUCCH code channel resource and a first data block to UE, the base station has already acquired a basis for demodulating a feedback on the first data block, so that the base station can demodulate and forward the feedback in a timely manner, thereby improving data transmission efficiency.

Embodiment 11

Figure 23:
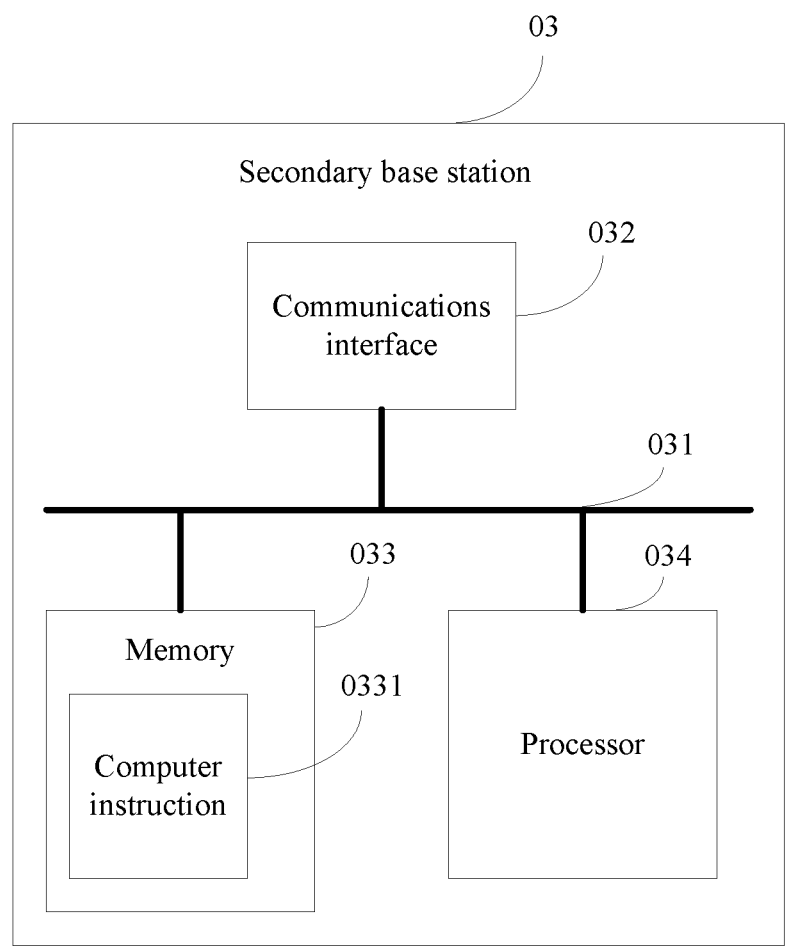
FIG. 23 is a schematic structural diagram of a base station according to Embodiment 11 of the present invention.

This embodiment of the present invention further provides another base station 03. As shown in FIG. 23, the base station 03 includes a bus 031, and a memory 033 and a processor 034 that are connected to the bus 031. Optionally, the base station 03 further includes a communications interface 032 that is connected to the bus 031 and that is configured to communicate with another network element. For example, the processor 034 executes, by using the communications interface 032, actions that include sending, receiving, and the like.

In this embodiment, the memory 033 is configured to store a computer instruction 0331, and the processor 034 executes the computer instruction 0331 to:

send an identifier of a first physical uplink control channel PUCCH code channel resource to a first base station at a first moment, so that the first base station determines to receive, by using the first PUCCH code channel resource, a feedback that is on a first data block and that is sent by user equipment UE;

send the identifier of the first PUCCH code channel resource and the first data block to the UE at a second moment; and receive the feedback from the first base station, where the feedback is received by the first base station from the UE by using the first PUCCH code channel resource;

where the second moment is later than the first moment, an interval T between the second moment and the first moment is greater than or equal to a delay t for performing one-time transmission between the base station 03 and the first base station, the base station 03 serves a secondary component carrier of the UE, and the first base station serves a primary component carrier of the UE.

Optionally, the processor 034 executes the computer instruction 0331 to further:

determine x before the first moment, where x is a quantity of the first data blocks, and receive and buffer, before the first moment, a service sent by the first base station; and acquire x first data blocks from the buffered service before the second moment; or determine x before the first moment, where x is a quantity of the first data blocks; send x to the first base station at the first moment; and receive, before the second moment, x first data blocks sent by the first base station.

Optionally, the processor 034 executes the computer instruction 0331 to:

when a first condition is met, acquire the x first data blocks from the buffered service, or send x to the first base station, where the first condition includes: a priority of the UE is higher than a priority of other UE accessing the base station 03. Optionally, the first condition further includes: a priority of the service is higher than a priority of a message sent by the base station 03 to the other UE accessing the base station 03.

Optionally, the delay t of one-time inter-station unidirectional transmission between the base station and the first base station meets the following formula:

$t=t1*A+B$, where t1 is a theoretical transmission delay between the first base station and the base station 03, A is a constant for adjusting t1, and B is an offset constant of t1.

Optionally, the processor 034 executes the computer instruction 0331 to further:

retransmit retransmission data to the UE if the feedback includes a negative acknowledgement NACK, where the retransmission data includes a data block, in the first data block, corresponding to the NACK;

determine whether the retransmission fails; and if it is determined that the retransmission fails, send, to the first base station, information indicating that the retransmission fails and a sequence number corresponding to the retransmission data, where the information indicating that the retransmission fails is used to trigger the first base station to retransmit the retransmission data to the UE.

Optionally, the processor 034 executes the computer instruction 0331 to:

if the base station 03 receives the feedback from the first base station within a preset period of time and the feedback includes a NACK, retransmit retransmission data to the UE in an automatic repeat request ARQ manner, where the retransmission data includes a data block, in the first data block, corresponding to the NACK.

Optionally, the base station 03 further includes a first HARQ buffer and a second HARQ buffer. For example, the memory further includes a first HARQ buffer and a second HARQ buffer. Accordingly, the processor 034 executes the computer instruction 0331 to:

if the feedback includes a negative acknowledgment NACK and all HARQ processes in the first HARQ buffer are in an occupied state, retransmit retransmission data to the UE by using an HARQ process in the second HARQ buffer, where the retransmission data includes a data block, in the first data block, corresponding to the NACK.

Optionally, process IDs of the HARQ processes in the first HARQ buffer are in a one-to-one correspondence with process IDs of HARQ processes in the second HARQ buffer.

If an HARQ process that is in the first HARQ buffer and whose process ID is y is used to send the first data block to the UE, the processor 034 executes the computer instruction 0331 to:

if an HARQ process that is in the second HARQ buffer and whose process ID is y is in the occupied state, retransmit the retransmission data to the UE by using another process in the second HARQ buffer, and send a downlink scheduling grant message to the UE, where the downlink scheduling grant message carries an NDI value, the another process is different from the HARQ process that is in the second HARQ buffer and whose process ID is y, and is in an idle state, and the NDI value is different from an NDI value sent by the base station to the UE last time; or if an HARQ process that is in the second HARQ buffer and whose process ID is y is in an idle state, retransmit the retransmission data to the UE by using the HARQ process that is in the second HARQ buffer and whose process ID is y, and send a downlink scheduling grant message to the UE, where the downlink scheduling grant message carries an NDI value, and the NDI value is the same as an NDI value sent by the base station to the UE last time.

In this way, because a processor sends an identifier of a first PUCCH code channel resource to a first base station at a first moment, the first base station receives the identifier of the first PUCCH code channel resource at a moment between the first moment and a second moment, which ensures that at the second moment, that is, when the base station sends the identifier of the first PUCCH code channel resource and a first data block to UE, the first base station has already acquired a basis for demodulating a feedback on the first data block, so that the first base station can demodulate and forward the feedback in a timely manner, thereby improving data transmission efficiency.

Embodiment 12

Figure 24:
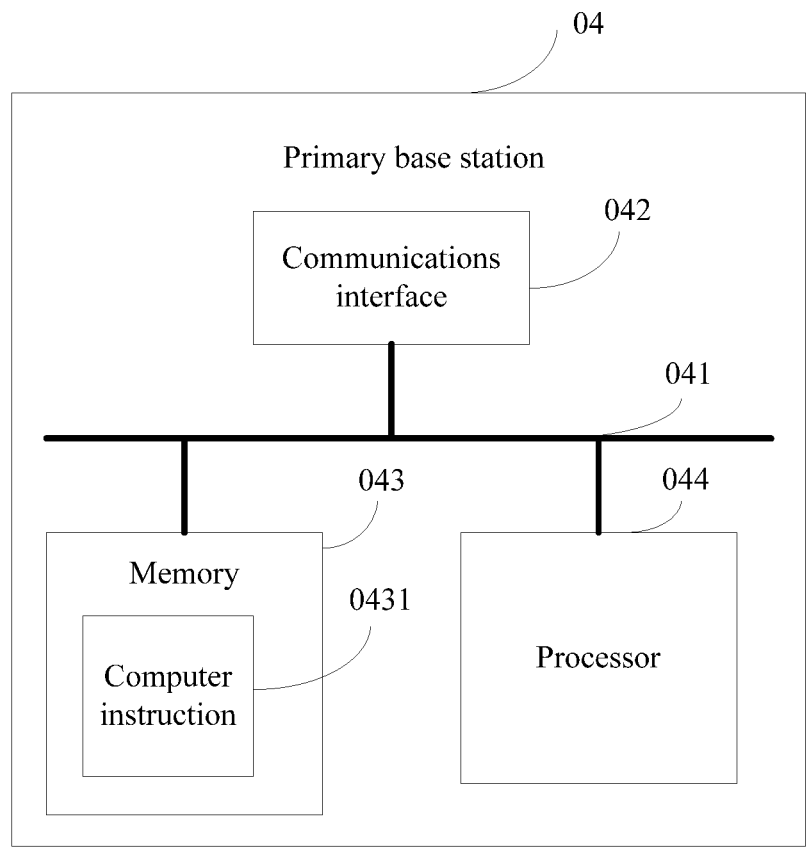
FIG. 24 is a schematic structural diagram of a base station according to Embodiment 12 of the present invention.

This embodiment of the present invention provides a base station 04. As shown in FIG. 24, the base station 04 includes a bus 041, and a memory 043 and a processor 044 that are connected to the bus 041. Optionally, the base station 04 further includes a communications interface 042 that is connected to the bus 041 and that is configured to communicate with another network element. For example, the processor 044 executes, by using the communications interface 042, actions that include sending, receiving, and the like.

In this embodiment, the memory 043 is configured to store a computer instruction 0431, and the processor 043 executes the computer instruction 0431 to:

receive an identifier that is of a first physical uplink control channel PUCCH code channel resource and that is sent by a second base station at a first moment;

receive, by using the first PUCCH code channel resource, a feedback sent by user equipment UE, where the feedback is a feedback, of the UE, on a first data block sent by the second base station at a second moment; and send the feedback to the second base station.

The second moment is later than the first moment, an interval T between the second moment and the first moment is greater than or equal to a delay t for performing one-time transmission between the second base station and the base station 04, the second base station serves a secondary component carrier of the UE, and the base station 04 serves a primary component carrier of the UE.

Optionally, the processor 04 executes the computer instruction 0431 to further:

receive, before the first moment, a service bearer setup request sent by the UE or a gateway, where the service bearer setup request is used to request to set up a service bearer between the UE, the gateway, and the base station 04; and set up a first Radio Link Control RLC layer logical channel and a second RLC layer logical channel, where the first RLC layer logical channel is used for transmission between the base station 04 and the UE, and the second RLC layer logical channel is used for transmission between the base station 04 and the second base station.

Optionally, the processor 044 executes the computer instruction 0431 to further: receive a service sent by the gateway; and send a service of a delay insensitive data service type in the service to the second base station before the first moment by using the second RLC layer logical channel; or receive x sent by the second base station at the first moment, where x is a quantity of the first data blocks sent by the second base station to the UE at the second moment; and before the second moment, acquire x first data blocks from a service of a delay insensitive data service type in the service and send the x first data blocks to the second base station by using the second RLC layer logical channel.

Optionally, the processor 04 executes the computer instruction 0431 to further: receive a service sent by the gateway; determine a second PUCCH code channel resource, where the second PUCCH code channel resource is used by the UE to send a feedback on a second data block to the base station 04; and send an identifier of the second PUCCH code channel resource and the second data block to the UE by using the first RLC layer logical channel, where the second data block is a data block corresponding to a service of a delay sensitive service type in the service.

Optionally, the delay t of one-time inter-station unidirectional transmission between the second base station and the base station 04 meets the following formula:

$$t = t1*A + B, \text{ where}$$

t1 is a theoretical transmission delay between the base station 04 and the second base station, A is a constant for adjusting t1, and B is an offset constant of t1.

Optionally, the processor 04 executes the computer instruction 0431 to further:

after the base station 04 sends the feedback to the second base station, receive information indicating that retransmission fails and a sequence number corresponding to retransmission data that are sent by the second base station, where the information indicating that the retransmission fails is sent by the second base station to the base station 04 after it is determined that the feedback includes a NACK and the second base station fails to retransmit the retransmission data to the UE; and retransmit the retransmission data to the UE, where the retransmission data is a data block, in the first data block, corresponding to the NACK.

In this way, because a processor receives an identifier of a first PUCCH code channel resource before a second moment, it is ensured that at the second moment, that is, when a second base station sends the identifier of the first PUCCH code channel resource and a first data block to UE, the base station has already acquired a basis for demodulating a feedback on the first data block, so that the base station can demodulate and forward the feedback in a timely manner, thereby improving data transmission efficiency.

Embodiment 13

This embodiment of the present invention provides a data transmission system, which includes the base station described in Embodiment 9 and the base station described in Embodiment 10.

This embodiment of the present invention provides a data transmission system, which includes the base station described in Embodiment 11 and the base station described in Embodiment 12.

Embodiment 14

Figure 25:
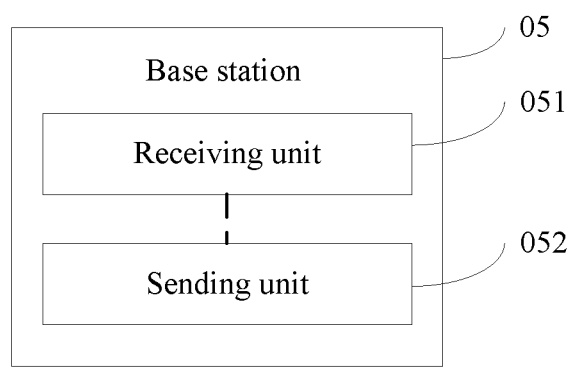
FIG. 25 is a schematic structural diagram of a base station according to Embodiment 14 of the present invention.

This embodiment of the present invention provides a base station 05. As shown in FIG. 25, the base station 05 includes a sending unit 051 and a receiving unit 052.

The sending unit 051 is configured to send first information to a first base station, where the first information includes one of a quantity x of first physical uplink control channel PUCCH code channel resources, a quantity x of first data blocks sent by the base station to user equipment UE, and a first channel code word, so that the first base station determines identifiers of x first PUCCH code channel resources and x first data blocks, where the first PUCCH code channel resource is used by the UE to send a feedback on the first data block to the first base station, and the first channel code word is a channel code word corresponding to the x first data blocks.

The receiving unit 052 is configured to receive the identifiers of the x first PUCCH code channel resources and the x first data blocks that are sent by the first base station.

The sending unit 051 is further configured to send the identifiers of the x first PUCCH code channel resources and the x first data blocks to the UE.

The receiving unit 052 is further configured to receive the feedback from the first base station, where the feedback is received by the first base station from the UE by using the first PUCCH code channel resource.

The base station 05 serves a secondary component carrier of the UE, and the first base station serves a primary component carrier of the UE.

Optionally, the sending unit 051 is specifically configured to: when the base station determines that a priority of the UE is higher than a priority of other UE accessing the base station, send the first information to the first base station.

Figure 26:
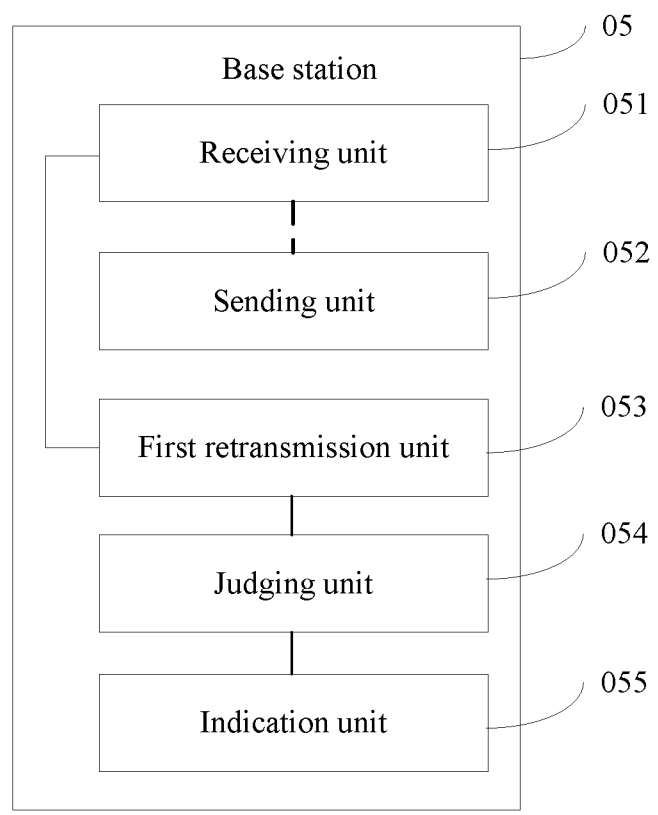
FIG. 26 is a schematic structural diagram of another base station according to Embodiment 14 of the present invention.

Optionally, as shown in FIG. 26, the base station 05 further includes:

a first retransmission unit 053, configured to retransmit retransmission data to the UE if the feedback includes a negative acknowledgement NACK, where the retransmission data includes a data block, in the x data blocks, corresponding to the NACK;

a judging unit 054, configured to determine whether the retransmission fails; and an indication unit 055, configured to: if it is determined that the retransmission fails, send, to the first base station, information indicating that the retransmission fails and a sequence number corresponding to the retransmission data, where the information indicating that the retransmission fails is used to trigger the first base station to retransmit the retransmission data to the UE.

Figure 27:
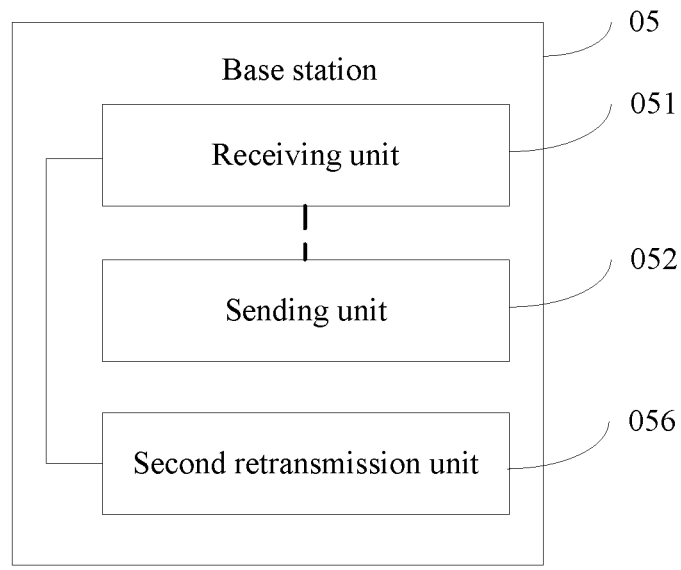
FIG. 27 is a schematic structural diagram of still another base station according to Embodiment 14 of the present invention.

Optionally, as shown in FIG. 27, the base station 05 further includes:

a second retransmission unit 056, configured to: when the base station receives the feedback from the first base station within a preset period of time and the feedback includes a NACK, retransmit retransmission data to the UE in an automatic repeat request ARQ manner, where the retransmission data includes a data block, in the x data blocks, corresponding to the NACK.

Figure 28:
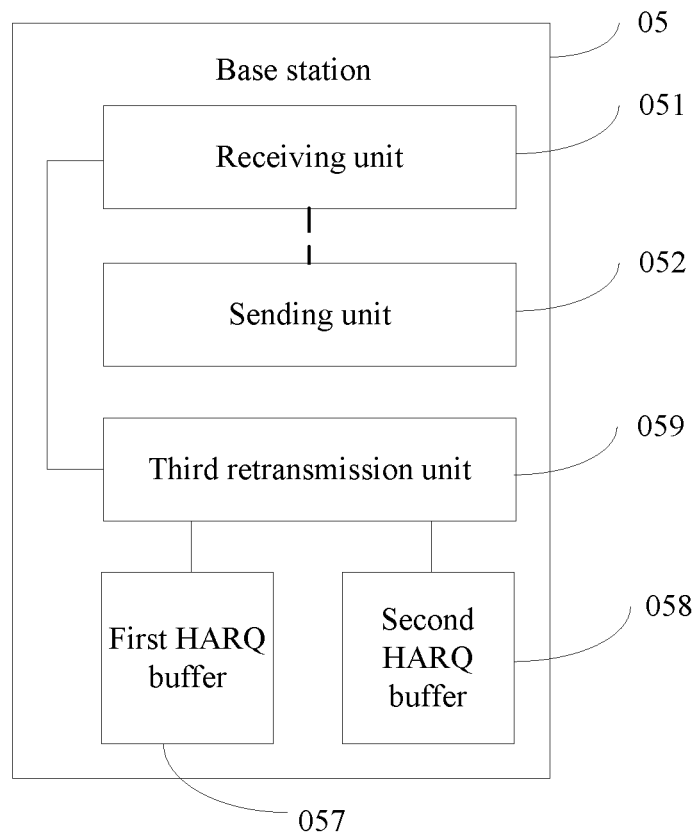
FIG. 28 is a schematic structural diagram of yet another base station according to Embodiment 14 of the present invention.

Optionally, as shown in FIG. 28, the base station 05 further includes a first hybrid automatic repeat request HARQ buffer 057, a second HARQ buffer 058, and a third retransmission unit 059.

The third retransmission unit 059 is configured to: when the feedback includes a negative acknowledgment NACK and all HARQ processes in the first HARQ buffer 057 are in an occupied state, retransmit retransmission data to the UE by using an HARQ process in the second HARQ buffer 058, where the retransmission data includes a data block, in the x data blocks, corresponding to the NACK.

Optionally, process IDs of the HARQ processes in the first HARQ buffer 057 are in a one-to-one correspondence with process IDs of HARQ processes in the second HARQ buffer 058.

If an HARQ process that is in the first HARQ buffer 057 and whose process ID is y is used to send the first data block to the UE, the third retransmission unit 059 is specifically configured to:

if an HARQ process that is in the second HARQ buffer 058 and whose process ID is y is in an occupied state, retransmit the retransmission data to the UE by using another process in the second HARQ buffer 058, and send a downlink scheduling grant message to the UE, where the downlink scheduling grant message carries an NDI value, the another process is different from the HARQ process that is in the second HARQ buffer 058 and whose process ID is y, and is in an idle state, and the NDI value is different from an NDI value sent by the base station to the UE last time; or if an HARQ process that is in the second HARQ buffer 058 and whose process ID is y is in an idle state, retransmit the retransmission data to the UE by using the HARQ process that is in the second HARQ buffer 058 and whose process ID is y, and send a downlink scheduling grant message to the UE, where the downlink scheduling grant message carries an NDI value, and the NDI value is the same as an NDI value sent by the base station to the UE last time.

Optionally, the sending unit 051 is further configured to send second information to the first base station, where the second information includes one of a quantity m of third PUCCH code channel resources, a quantity m of data blocks in retransmission data sent by the base station to the UE, and a second channel code word, so that the first base station determines an identifier of the third PUCCH code channel resource, where the third PUCCH code channel resource is used by the UE to send a feedback on the retransmission data to the first base station, and the second channel code word is a channel code word corresponding to the data block in the retransmission data. Accordingly, the receiving unit 052 is further configured to receive identifiers that are of the m third PUCCH code channel resources and are sent by the first base station; the sending unit 051 is further configured to send the identifiers of the m third PUCCH code channel resources to the UE; and the receiving unit 052 is further configured to receive the feedback on the retransmission data from the first base station, where the feedback on the retransmission data is received by the first base station from the UE by using the third PUCCH code channel resource.

Optionally, the feedback includes a NACK, and the receiving unit 052 is specifically configured to receive the feedback and an identifier of a third PUCCH code channel resource from the first base station, where the third PUCCH code channel resource is used by the UE to send a feedback on retransmission data to the first base station. Accordingly, the sending unit 051 is further configured to send the identifier of the third PUCCH code channel resource to the UE; and the receiving unit 052 is further configured to receive the feedback on the retransmission data from the first base station, where the feedback on the retransmission data is received by the first base station from the UE by using the third PUCCH code channel resource.

In this way, because a first base station determines identifiers of x first PUCCH code channel resources, and a sending unit sends the identifiers of the x first PUCCH code channel resources and x first data blocks to UE, when the first base station receives the identifier of the first PUCCH code channel resource and the first data block, the first base station has already acquired a basis for demodulating a feedback on the first data block, so that the first base station can demodulate and forward the feedback in a timely manner, thereby improving data transmission efficiency.

Embodiment 15

Figure 29:
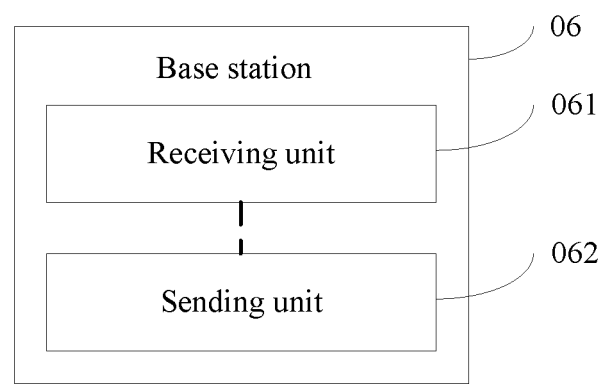
FIG. 29 is a schematic structural diagram of a base station according to Embodiment 15 of the present invention.

This embodiment of the present invention provides a base station 06. As shown in FIG. 29, the base station 06 includes a receiving unit 061 and a sending unit 062.

The receiving unit 061 is configured to receive first information sent by a second base station, where the first information includes one of a quantity x of first physical uplink control channel PUCCH code channel resources, a quantity x of first data blocks sent by the second base station to user equipment UE, and a first channel code word, where the first PUCCH code channel resource is used by the UE to send a feedback on the first data block to the base station, and the first channel code word is a channel code word corresponding to x first data blocks.

The sending unit 062 is configured to send identifiers of x first PUCCH code channel resources and the x first data blocks to the second base station, so that the second base station sends the identifiers of the x first PUCCH code channel resources and the x first data blocks to the UE.

The receiving unit 061 is further configured to receive, by using the first PUCCH code channel resource, the feedback sent by the UE.

The sending unit 062 is further configured to send the feedback to the second base station.

The second base station serves a secondary component carrier of the UE, and the base station 06 serves a primary component carrier of the UE.

Figure 30:
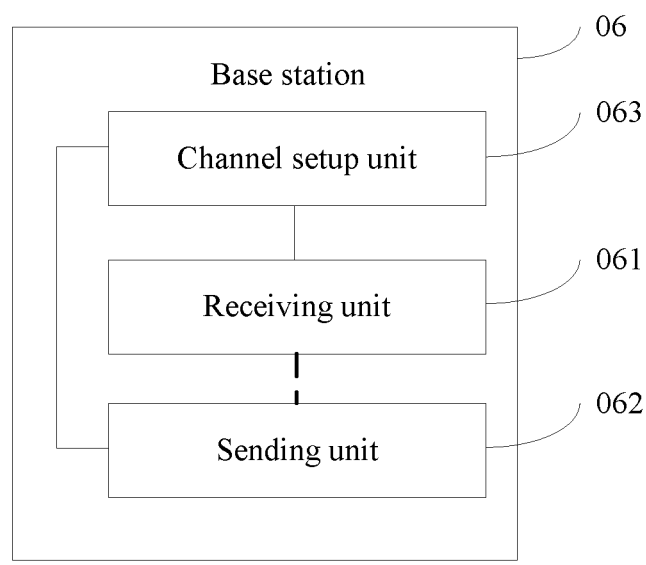
FIG. 30 is a schematic structural diagram of another base station according to Embodiment 15 of the present invention.

Optionally, the receiving unit 061 is further configured to: before receiving the first information sent by the second base station, receive a service bearer setup request sent by the UE or a gateway, where the service bearer setup request is used to request to set up a service bearer between the UE, the gateway, and the base station. As shown in FIG. 30, the base station 06 further includes a channel setup unit 063, configured to set up a first Radio Link Control RLC layer logical channel and a second RLC layer logical channel, where the first RLC layer logical channel is used for transmission between the base station and the UE, and the second RLC layer logical channel is used for transmission between the base station and the second base station.

Figure 31:
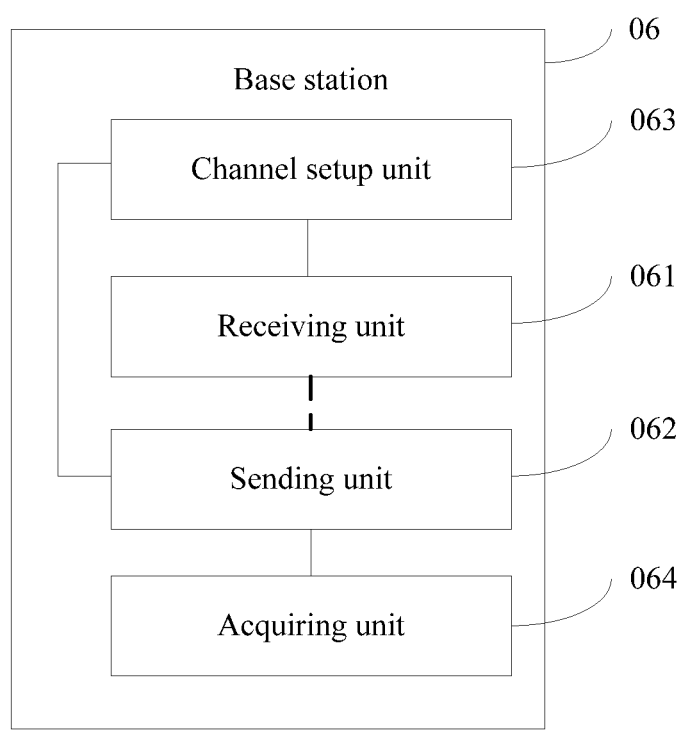
FIG. 31 is a schematic structural diagram of still another base station according to Embodiment 15 of the present invention.

Optionally, the receiving unit 061 is further configured to receive a service sent by the gateway. As shown in FIG. 31, the base station 06 further includes an acquiring unit 064, configured to acquire the x first data blocks from a service of a delay insensitive data service type in the service, and determine the identifiers of the x first PUCCH code channel resources. Accordingly, that the sending unit 062 is further configured to send identifiers of x first PUCCH code channel resources and the x first data blocks to the second base station includes: the sending unit 062 is further configured to send the identifiers of the x first PUCCH code channel resources and the x first data blocks to the second base station by using the second RLC layer logical channel.

Figure 32:
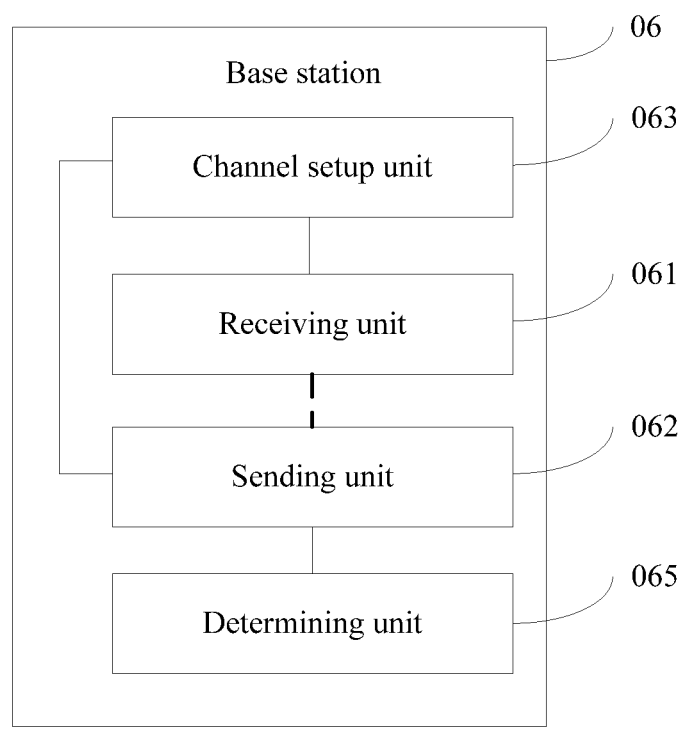
FIG. 32 is a schematic structural diagram of yet another base station according to Embodiment 15 of the present invention.

Optionally, the receiving unit 061 is further configured to receive a service sent by the gateway. As shown in FIG. 32, the base station 06 further includes a determining unit 065, configured to determine an identifier of a second PUCCH code channel resource, where the second PUCCH code channel resource is used by the UE to send a feedback on a second data block to the base station. Accordingly, the sending unit 062 is further configured to send the identifier of the second PUCCH code channel resource and the second data block to the UE by using the first RLC layer logical channel, where the second data block is a data block corresponding to a service of a delay sensitive service type in the service.

Figure 33:
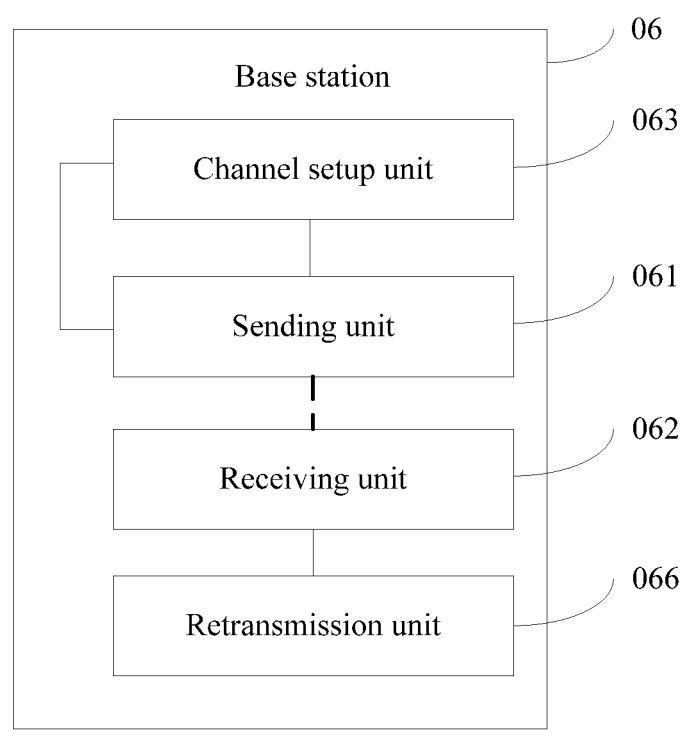
FIG. 33 is a schematic structural diagram of still yet another base station according to Embodiment 15 of the present invention.

Optionally, the feedback includes a negative acknowledgement NACK, and after the feedback is sent to the second base station, the receiving unit 061 is further configured to receive information indicating that retransmission fails and a sequence number corresponding to retransmission data that are sent by the second base station, where the information indicating that the retransmission fails is sent by the second base station to the base station after it is determined that the feedback includes a NACK and the second base station fails to retransmit the retransmission data to the UE. As shown in FIG. 33, the base station 06 further includes a retransmission unit 066, configured to retransmit the retransmission data to the UE, where the retransmission data includes a data block, in the x first data blocks, corresponding to the NACK.

Optionally, the feedback includes a NACK, and after the feedback is sent to the second base station, the receiving unit 061 is further configured to receive second information sent by the second base station, where the second information includes one of a quantity m of third PUCCH code channel resources, a quantity m of data blocks in retransmission data sent by the second base station to the UE, and a second channel code word, where the third PUCCH code channel resource is used by the UE to send a feedback on the retransmission data to the base station, the second channel code word is a channel code word corresponding to the data block in the retransmission data, and the retransmission data includes a data block, in the x first data blocks, corresponding to the NACK. Accordingly, the sending unit 062 is further configured to send identifiers that are of the m third PUCCH code channel resources to the second base station, so that the second base station sends the identifiers of the m third PUCCH code channel resources to the UE; the receiving unit 061 is further configured to receive the feedback on the retransmission data from the UE by using the third PUCCH code channel resource; and the sending unit 062 is further configured to send the feedback on the retransmission data to the second base station.

Optionally, the feedback includes a NACK, and the sending unit 062 is specifically configured to send the feedback and an identifier of a third PUCCH code channel resource to the second base station, so that the second base station sends the identifier of the third PUCCH code channel resource to the UE, where the third PUCCH code channel resource is used by the UE to send a feedback on retransmission data to the base station, and the retransmission data includes a data block, in the x first data blocks, corresponding to the NACK and is sent by the second base station to the UE. Accordingly, the receiving unit 061 is further configured to receive the feedback on the retransmission data from the UE by using the third PUCCH code channel resource; and the sending unit 062 is configured to send the feedback on the retransmission data to the second base station.

In this way, because the base station determines identifiers of x first PUCCH code channel resources, and a secondary base station sends the identifiers of the x first PUCCH code channel resources and x first data blocks to UE, when a receiving unit receives the identifier of the first PUCCH code channel resource and the first data block, the base station has already acquired a basis for demodulating a feedback on the first data block, so that the base station can demodulate and forward the feedback in a timely manner, thereby improving data transmission efficiency.

Embodiment 16

Figure 34:
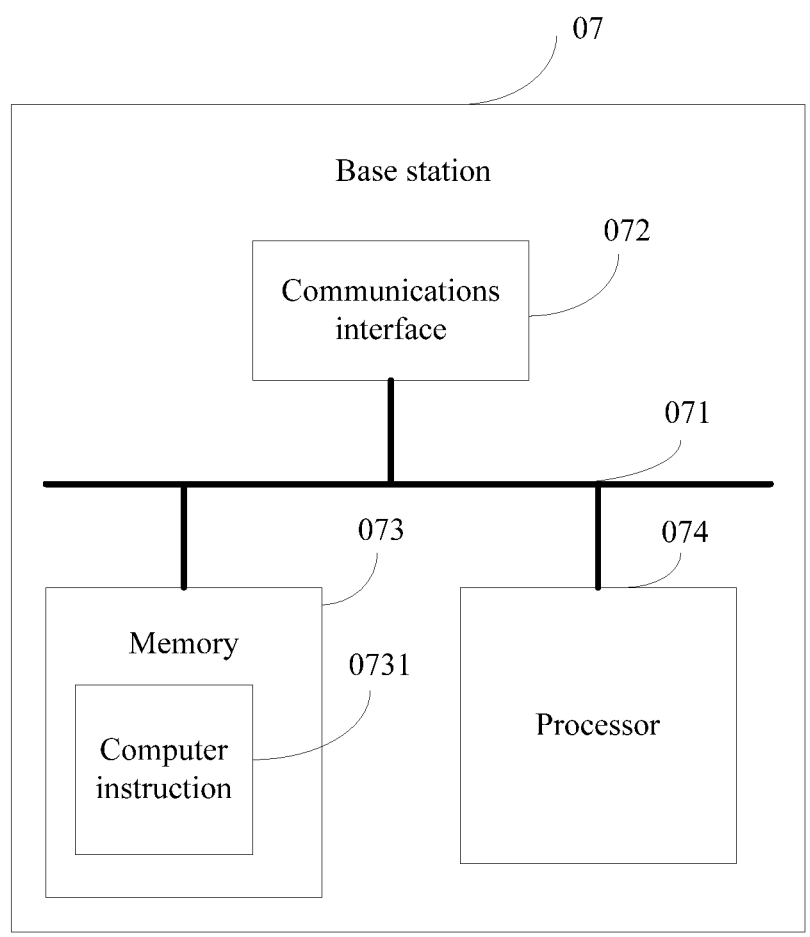
FIG. 34 is a schematic structural diagram of a base station according to Embodiment 16 of the present invention.

This embodiment of the present invention provides a base station 07. As shown in FIG. 34, the base station 07 includes a bus 071, and a memory 073 and a processor 074 that are connected to the bus 071. Optionally, the base station 07 further includes a communications interface 072 that is connected to the bus 071 and that is configured to communicate with another network element. For example, the processor 074 executes, by using the communications interface 072, actions that include sending, receiving, and the like.

In this embodiment, the memory 073 is configured to store a computer instruction 0731, and the processor 074 executes the computer instruction 0731 to:

send first information to a first base station, where the first information includes one of a quantity x of first physical uplink control channel PUCCH code channel resources, a quantity x of first data blocks sent by the base station to user equipment UE, and a first channel code word, so that the first base station determines identifiers of x first PUCCH code channel resources and x first data blocks, where the first PUCCH code channel resource is used by the UE to send a feedback on the first data block to the first base station, and the first channel code word is a channel code word corresponding to the x first data blocks;

receive the identifiers of the x first PUCCH code channel resources and the x first data blocks that are sent by the first base station;

send the identifiers of the x first PUCCH code channel resources and the x first data blocks to the UE; and receive the feedback from the first base station, where the feedback is received by the first base station from the UE by using the first PUCCH code channel resource, where the base station 07 serves a secondary component carrier of the UE, and the first base station serves a primary component carrier of the UE.

Optionally, the processor 074 executes the computer instruction 0731 to further: when it is determined that a priority of the UE is higher than a priority of other UE accessing the base station 07, send the first information to the first base station.

Optionally, the processor 074 executes the computer instruction 0731 to: retransmit retransmission data to the UE if the feedback includes a negative acknowledgement NACK, where the retransmission data includes a data block, in the x data blocks, corresponding to the NACK; determine whether the retransmission fails; and if it is determined that the retransmission fails, send, to the first base station, information indicating that the retransmission fails and a sequence number corresponding to the retransmission data, where the information indicating that the retransmission fails is used to trigger the first base station to retransmit the retransmission data to the UE.

Optionally, the processor 074 executes the computer instruction 0731 to: if the feedback is received from the first base station within a preset period of time and the feedback includes a NACK, retransmit retransmission data to the UE in an automatic repeat request ARQ manner, where the retransmission data includes a data block, in the x data blocks, corresponding to the NACK.

Figure 35:
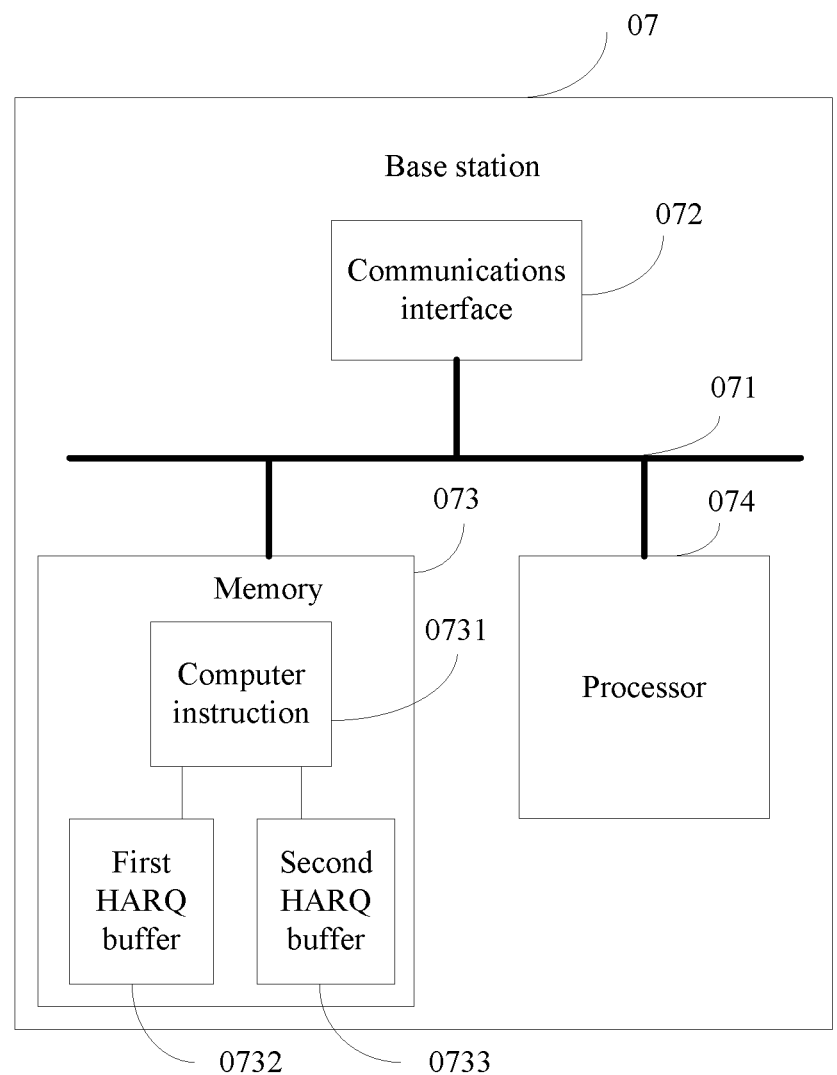
FIG. 35 is a schematic structural diagram of another base station according to Embodiment 16 of the present invention.

Alternatively, as shown in FIG. 35, the base station 07 further includes a first hybrid automatic repeat request HARQ buffer 0732 and a second HARQ buffer 0733, for example, in the memory 073. The processor 0731 executes the computer instruction 0731 to: if the feedback includes a negative acknowledgment NACK and all HARQ processes in the first HARQ buffer 0732 are in an occupied state, retransmit retransmission data to the UE by using an HARQ process in the second HARQ buffer 0733, where the retransmission data includes a data block, in the x data blocks, corresponding to the NACK.

Optionally, process IDs of the HARQ processes in the first HARQ buffer 0732 are in a one-to-one correspondence with process IDs of HARQ processes in the second HARQ buffer 0733. If an HARQ process that is in the first HARQ buffer 0732 and whose process ID is y is used to send the first data block to the UE, the processor 074 executes the computer instruction 0731 to:

if an HARQ process that is in the second HARQ buffer 0733 and whose process ID is y is in an occupied state, retransmit the retransmission data to the UE by using another process in the second HARQ buffer 0733, and send a downlink scheduling grant message to the UE, where the downlink scheduling grant message carries an NDI value, the another process is different from the HARQ process that is in the second HARQ buffer 0733 and whose process ID is y, and is in an idle state, and the NDI value is different from an NDI value sent by the base station to the UE last time; or if an HARQ process that is in the second HARQ buffer 0733 and whose process ID is y is in an idle state, retransmit the retransmission data to the UE by using the HARQ process that is in the second HARQ buffer 0733 and whose process ID is y, and send a downlink scheduling grant message to the UE, where the downlink scheduling grant message carries an NDI value, and the NDI value is the same as an NDI value sent by the base station to the UE last time.

Optionally, the processor 074 executes the computer instruction 0731 to: send second information to the first base station, where the second information includes one of a quantity m of third PUCCH code channel resources, a quantity m of data blocks in retransmission data sent by the base station to the UE, and a second channel code word, so that the first base station determines an identifier of the third PUCCH code channel resource, where the third PUCCH code channel resource is used by the UE to send a feedback on the retransmission data to the first base station, and the second channel code word is a channel code word corresponding to the data block in the retransmission data; receive identifiers that are of the m third PUCCH code channel resources and are sent by the first base station; send the identifiers of the m third PUCCH code channel resources to the UE; and receive the feedback on the retransmission data from the first base station, where the feedback on the retransmission data is received by the first base station from the UE by using the third PUCCH code channel resource.

Optionally, the feedback includes a NACK, the processor 074 executes the computer instruction 0731 to specifically: receive the feedback and an identifier of a third PUCCH code channel resource from the first base station, where the third PUCCH code channel resource is used by the UE to send a feedback on retransmission data to the first base station. Accordingly, the processor 074 executes the computer instruction 0731 to further: send the identifier of the third PUCCH code channel resource to the UE; and receive the feedback on the retransmission data from the first base station, where the feedback on the retransmission data is received by the first base station from the UE by using the third PUCCH code channel resource.

In this way, because a first base station determines identifiers of x first PUCCH code channel resources, and a processor sends the identifiers of the x first PUCCH code channel resources and x first data blocks to UE, when the first base station receives the identifier of the first PUCCH code channel resource and the first data block, the first base station has already acquired a basis for demodulating a feedback on the first data block, so that the first base station can demodulate and forward the feedback in a timely manner, thereby improving data transmission efficiency.

Embodiment 17

Figure 36:
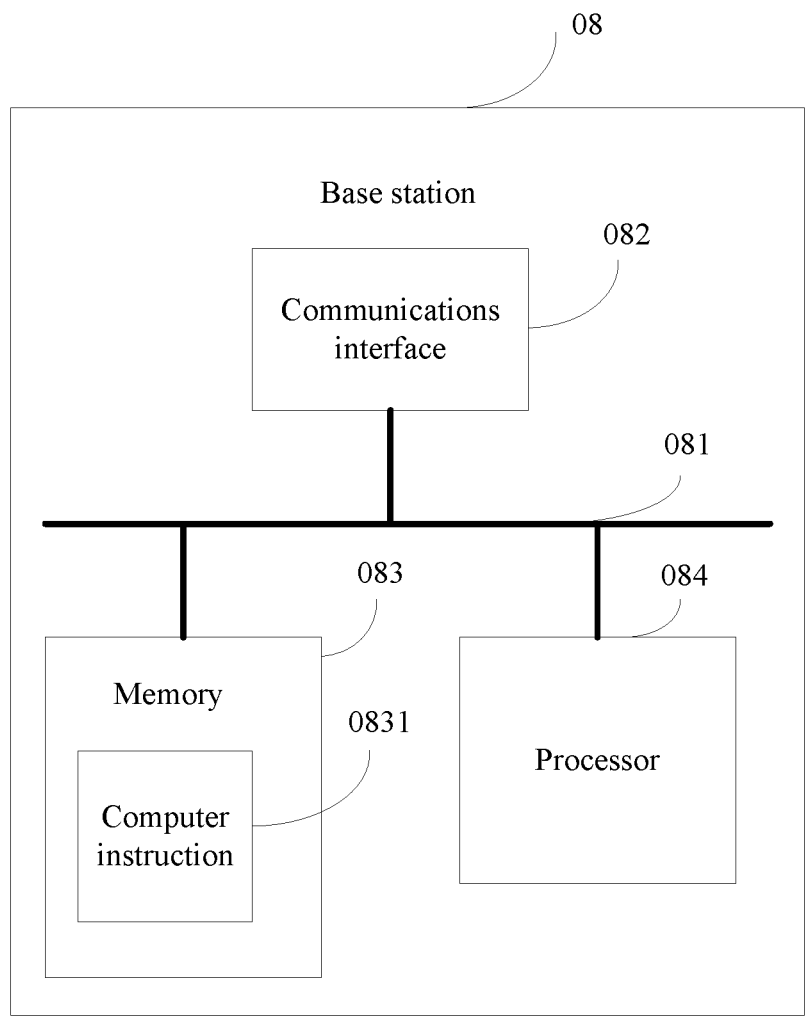
FIG. 36 is a schematic structural diagram of a base station according to Embodiment 17 of the present invention.

This embodiment of the present invention provides a base station 08. As shown in FIG. 36, the base station 08 includes a bus 081, and a memory 083 and a processor 084 that are connected to the bus 081. Optionally, the base station 08 further includes a communications interface 082 that is connected to the bus 081 and that is configured to communicate with another network element. For example, the processor 084 executes, by using the communications interface 082, actions that include sending, receiving, and the like.

In this embodiment, the memory 083 is configured to store a computer instruction 0831, and the processor 084 executes the computer instruction 0831 to:

receive first information sent by a second base station, where the first information includes one of a quantity x of first physical uplink control channel PUCCH code channel resources, a quantity x of first data blocks sent by the second base station to user equipment UE, and a first channel code word, where the first PUCCH code channel resource is used by the UE to send a feedback on the first data block to the base station, and the first channel code word is a channel code word corresponding to x first data blocks;

send identifiers of x first PUCCH code channel resources and the x first data blocks to the second base station, so that the second base station sends the identifiers of the x first PUCCH code channel resources and the x first data blocks to the UE;

receive, by using the first PUCCH code channel resource, the feedback sent by the UE; and send the feedback to the second base station, where the second base station serves a secondary component carrier of the UE, and the base station 08 serves a primary component carrier of the UE.

Optionally, before the base station 08 receives the first information sent by the second base station, the processor 084 executes the computer instruction 0831 to: receive a service bearer setup request sent by the UE or a gateway, where the service bearer setup request is used to request to set up a service bearer between the UE, the gateway, and the base station; and set up a first Radio Link Control RLC layer logical channel and a second RLC layer logical channel, where the first RLC layer logical channel is used for transmission between the base station and the UE, and the second RLC layer logical channel is used for transmission between the base station and the second base station.

Optionally, the processor 084 executes the computer instruction 0831 to further: receive a service sent by the gateway; acquire the x first data blocks from a service of a delay insensitive data service type in the service, and determine the identifiers of the x first PUCCH code channel resources; and accordingly, the sending identifiers of x first PUCCH code channel resources and the x first data blocks to the second base station includes: sending the identifiers of the x first PUCCH code channel resources and the x first data blocks to the second base station by using the second RLC layer logical channel.

Optionally, the processor 084 executes the computer instruction 0831 to further: receive a service sent by the gateway; determine an identifier of a second PUCCH code channel resource, where the second PUCCH code channel resource is used by the UE to send a feedback on a second data block to the base station; and send the identifier of the second PUCCH code channel resource and the second data block to the UE by using the first RLC layer logical channel, where the second data block is a data block corresponding to a service of a delay sensitive service type in the service.

Optionally, the feedback includes a negative acknowledgement NACK, and after the base station sends the feedback to the second base station, the processor 084 executes the computer instruction 0831 to further: receive information indicating that retransmission fails and a sequence number corresponding to retransmission data that are sent by the second base station, where the information indicating that the retransmission fails is sent by the second base station to the base station after it is determined that the feedback includes a NACK and the second base station fails to retransmit the retransmission data to the UE; and retransmit the retransmission data to the UE, where the retransmission data includes a data block, in the x first data blocks, corresponding to the NACK.

Optionally, the feedback includes a NACK, and after the base station 08 sends the feedback to the second base station, the processor 084 executes the computer instruction 0831 to further: receive second information sent by the second base station, where the second information includes one of a quantity m of third PUCCH code channel resources, a quantity m of data blocks in retransmission data sent by the second base station to the UE, and a second channel code word, where the third PUCCH code channel resource is used by the UE to send a feedback on the retransmission data to the base station, the second channel code word is a channel code word corresponding to the data block in the retransmission data, and the retransmission data includes a data block, in the x first data blocks, corresponding to the NACK; send identifiers that are of the m third PUCCH code channel resources to the second base station, so that the second base station sends the identifiers of the m third PUCCH code channel resources to the UE; receive the feedback on the retransmission data from the UE by using the third PUCCH code channel resource; and send the feedback on the retransmission data to the second base station.

Optionally, the feedback includes a NACK, and the processor 084 executes the computer instruction 0831 to specifically: send the feedback and an identifier of a third PUCCH code channel resource to the second base station, so that the second base station sends the identifier of the third PUCCH code channel resource to the UE, where the third PUCCH code channel resource is used by the UE to send a feedback on retransmission data to the base station, and the retransmission data includes a data block, in the x first data blocks, corresponding to the NACK and is sent by the second base station to the UE. Accordingly, the processor executes the computer instruction to further: receive the feedback on the retransmission data from the UE by using the third PUCCH code channel resource; and send the feedback on the retransmission data to the second base station.

In this way, because a processor determines identifiers of x first PUCCH code channel resources, and the processor sends the identifiers of the x first PUCCH code channel resources and x first data blocks to UE, when the processor receives the identifier of the first PUCCH code channel resource and the first data block, the processor has already acquired a basis for demodulating a feedback on the first data block, so that the processor can demodulate and forward the feedback in a timely manner, thereby improving data transmission efficiency.

Embodiment 18

This embodiment of the present invention provides a data transmission system, which includes the base station described in Embodiment 14 and the base station described in Embodiment 15.

This embodiment of the present invention provides a data transmission system, which includes the base station described in Embodiment 16 and the base station described in Embodiment 17.

Embodiment 19

Figure 37:
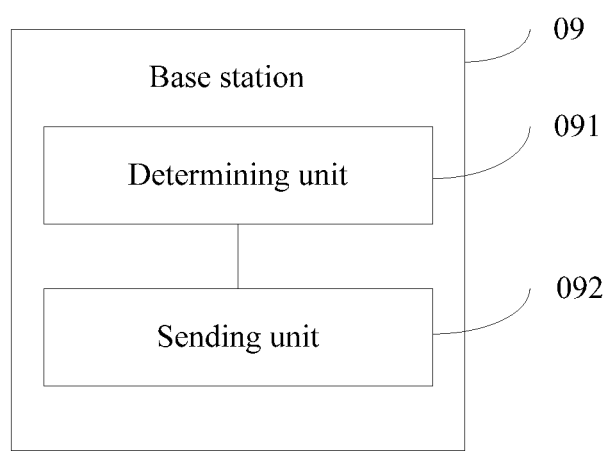
FIG. 37 is a schematic structural diagram of a base station according to Embodiment 19 of the present invention.

This embodiment of the present invention further provides another base station 09. As shown in FIG. 37, the base station 09 includes:

a determining unit 091, configured to determine that all HARQ processes in a first hybrid automatic repeat request HARQ buffer are in an occupied state; and a sending unit 092, configured to send a second data block to user equipment UE by using an HARQ process that is in a second HARQ buffer and is in an idle state.

The first HARQ buffer and the second HARQ buffer are different HARQ buffers disposed on the base station.

Optionally, process IDs of the HARQ processes in the first HARQ buffer are in a one-to-one correspondence with process IDs of HARQ processes in the second HARQ buffer.

Figure 38:
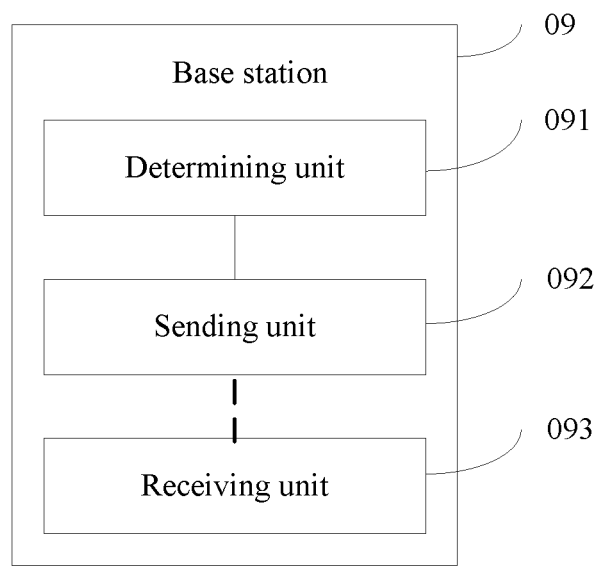
FIG. 38 is a schematic structural diagram of another base station according to Embodiment 19 of the present invention.

Optionally, the sending unit 092 is further configured to: before the base station 09 determines that all the HARQ processes in the first HARQ buffer are in the occupied state, send a first data block to the UE by using an HARQ process that is in the first HARQ buffer and whose process ID is y. As shown in FIG. 38, the base station 09 further includes a receiving unit 093, configured to: before the second data block is sent to the UE by using the HARQ process that is in the second HARQ buffer and that is in the idle state, receive a feedback, of the UE, on the first data block, where if the feedback includes a negative acknowledgment NACK, the second data block is a data block, in the first data block, corresponding to the NACK; or if the feedback includes a positive acknowledgment ACK, the second data block is a data block different from the first data block.

Optionally, if the feedback includes a NACK and an HARQ process that is in the second HARQ buffer and whose process ID is y is in an idle state, the sending unit 092 is specifically configured to: send the second data block to the UE by using the HARQ process that is in the second HARQ buffer and whose process ID is y, and send a downlink scheduling grant message to the UE, where the downlink scheduling grant message carries an NDI value, and the NDI value is the same as an NDI value sent by the base station to the UE last time.

Figure 39:
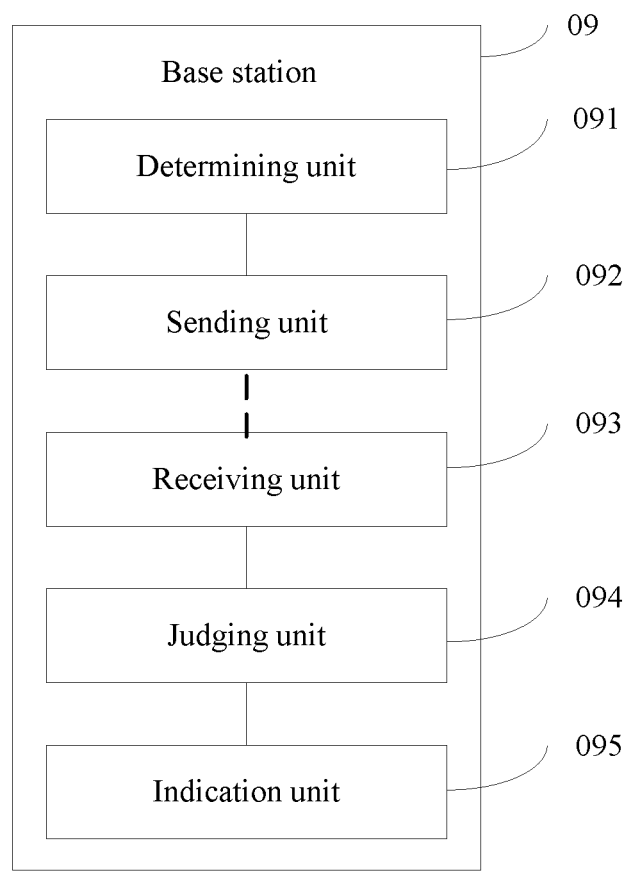
FIG. 39 is a schematic structural diagram of still another base station according to Embodiment 19 of the present invention.

Optionally, if the feedback includes a NACK, as shown in FIG. 39, the base station 09 further includes: a judging unit 094, configured to: after the second data block is sent to the UE by using the HARQ process that is in the second HARQ buffer and that is in the idle state, determine that the second data block fails to be sent by using the HARQ process that is in the second HARQ buffer and that is in the idle state; and an indication unit 095, configured to send, to the first base station, information that indicates the failure and a sequence number corresponding to the second data block, where the information that indicates the failure is used to trigger the first base station to retransmit the second data block to the UE. The base station 09 serves a secondary component carrier of the UE, and the first base station serves a primary component carrier of the UE.

Optionally, the receiving unit 093 is specifically configured to receive the feedback from a first base station, where the feedback is sent by the UE to the first base station by using a first physical uplink control channel PUCCH code channel resource, and an identifier of the first PUCCH code channel resource is determined by the base station and is sent by the base station to the first base station and the UE, or an identifier of the first PUCCH code channel resource is received by the base station from the first base station after the base station requests the first base station to allocate a PUCCH code channel resource.

In this way, by disposing a first HARQ buffer and a second HARQ buffer on a second base station, a quantity of HARQ buffers is increased. When all HARQ processes in the first HARQ buffer are in an occupied state, a sending unit sends a second data block by using an HARQ process that is in the second HARQ buffer and that is in an idle state, which reduces a stop and wait phenomenon in a data transmission process and avoids a delay caused by a stop and a wait, thereby improving data transmission efficiency.

Embodiment 20

Figure 40:
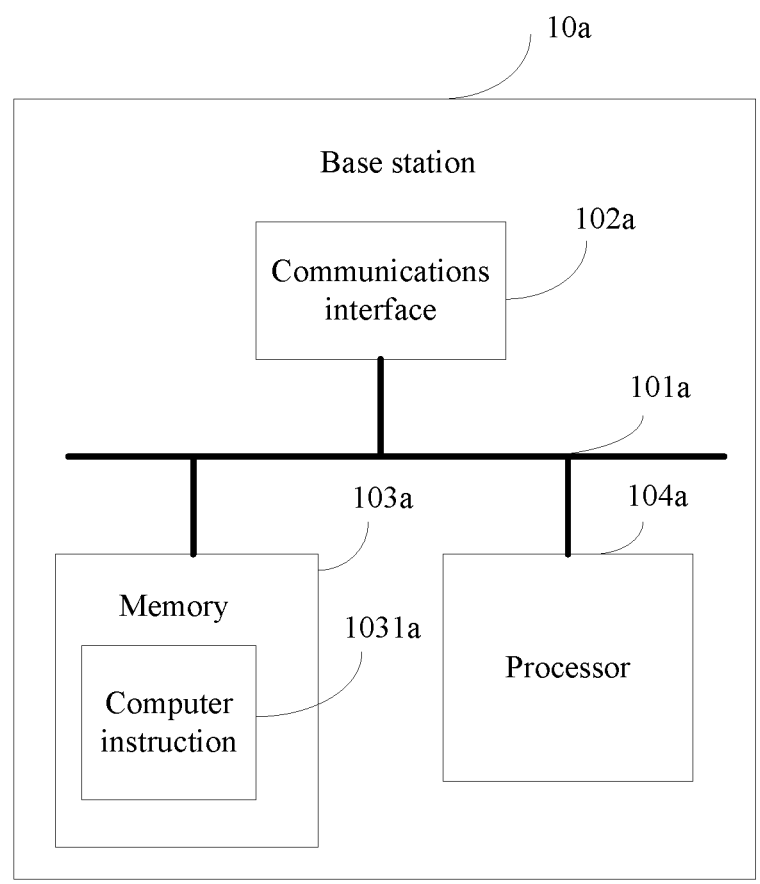
FIG. 40 is a schematic structural diagram of a base station according to Embodiment 20 of the present invention.

This embodiment of the present invention further provides a base station 10a. As shown in FIG. 40, the base station 10a includes a bus 101a, and a memory 103a and a processor 104a that are connected to the bus 101a. Optionally, the base station 10a further includes a communications interface 102a that is connected to the bus 101a and that is configured to communicate with another network element. For example, the processor 104a executes, by using the communications interface 102a, actions that include sending, receiving, and the like.

In this embodiment, the memory 103a is configured to store a computer instruction 1031a, and the processor 104a executes the computer instruction 1031a to:

determine that all HARQ processes in a first hybrid automatic repeat request HARQ buffer are in an occupied state; and send a second data block to user equipment UE by using an HARQ process that is in a second HARQ buffer and is in an idle state.

The first HARQ buffer and the second HARQ buffer are different HARQ buffers disposed on the base station. Optionally, the first HARQ buffer and the second HARQ buffer are a part of the memory.

Optionally, process IDs of the HARQ processes in the first HARQ buffer are in a one-to-one correspondence with process IDs of HARQ processes in the second HARQ buffer.

Optionally, the processor 104a executes the computer instruction 1031a to further: before it is determined that all the HARQ processes in the first HARQ buffer are in the occupied state, send a first data block to the UE by using an HARQ process that is in the first HARQ buffer and whose process ID is y; and before the second data block is sent to the UE by using the HARQ process that is in the second HARQ buffer and that is in the idle state, receive a feedback, of the UE, on the first data block, where if the feedback includes a negative acknowledgment NACK, the second data block is a data block, in the first data block, corresponding to the NACK; or if the feedback includes a positive acknowledgment ACK, the second data block is a data block different from the first data block.

Optionally, if the feedback includes a NACK and an HARQ process that is in the second HARQ buffer and whose process ID is y is in an idle state, the processor 104a executes the computer instruction 1031a to specifically: send the second data block to the UE by using the HARQ process that is in the second HARQ buffer and whose process ID is y, and send a downlink scheduling grant message to the UE, where the downlink scheduling grant message carries an NDI value, and the NDI value is the same as an NDI value sent by the base station to the UE last time.

Optionally, if the feedback includes a NACK, after the base station 10a sends the second data block to the UE by using the HARQ process that is in the second HARQ buffer and that is in the idle state, the processor 104a executes the computer instruction 1031a to further: determine that the second data block fails to be sent by using the HARQ process that is in the second HARQ buffer and that is in the idle state; and send, to the first base station, information that indicates the failure and a sequence number corresponding to the second data block, where the information that indicates the failure is used to trigger the first base station to retransmit the second data block to the UE. The base station 10a serves a secondary component carrier of the UE, and the first base station serves a primary component carrier of the UE.

Optionally, the processor 104a executes the computer instruction 1031a to specifically: receive the feedback from a first base station, where the feedback is sent by the UE to the first base station by using a first physical uplink control channel PUCCH code channel resource, and an identifier of the first PUCCH code channel resource is determined by the base station and is sent by the base station to the first base station and the UE, or an identifier of the first PUCCH code channel resource is received by the base station from the first base station after the base station requests the first base station to allocate a PUCCH code channel resource.

In this way, by disposing a first HARQ buffer and a second HARQ buffer on a second base station, a quantity of HARQ buffers is increased. When all HARQ processes in the first HARQ buffer are in an occupied state, a processor sends a second data block by using an HARQ process that is in the second HARQ buffer and that is in an idle state, which reduces a stop and wait phenomenon in a data transmission process and avoids a delay caused by a stop and a wait, thereby improving data transmission efficiency.

Embodiment 21

This embodiment of the present invention provides a data transmission system, which includes the base station described in Embodiment 20.

This embodiment of the present invention provides a data transmission system, which includes the base station described in Embodiment 21.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms. For another example, in some accompanying drawings of the embodiments of the present invention, for example, in FIG. 12 to FIG. 22, FIG. 25 to FIG. 33, and FIG. 37 to FIG. 39, some units are connected by using a solid line or a dashed line. It may be understood that, the solid line indicates a direct connection between the units, and the dashed line indicates an indirect connection between the units. The "direct connection" herein refers to implementing sending and receiving of information without being forwarded by using another unit provided in the embodiments of the present invention. The "indirect connection" refers to implementing sending and receiving or another processing action of information by being forwarded or triggered by using another unit provided in the embodiments of the present invention.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

It may be understood that the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   determining, by a secondary base station, x before a first moment, wherein x is a quantity of first data blocks to be transmitted from the secondary base station to user equipment (UE) at a second moment;
   sending, by the secondary base station, an identifier of a first physical uplink control channel (PUCCH) code channel resource to a primary base station at the first moment, so that the primary base station determines to receive, by using the first PUCCH code channel resource, a feedback that is on the x first data blocks and that is sent by the UE;
   receiving, by the secondary base station before the second moment, the x first data blocks from one of the primary base station or from a buffered service;
   sending, by the secondary base station, the identifier of the first PUCCH code channel resource and the x first data blocks to the UE at the second moment; and
   receiving, by the secondary base station, the feedback from the primary base station, wherein the feedback is received by the primary base station from the UE by using the first PUCCH code channel resource;
   wherein the second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE.

2. The method according to claim 1, wherein the method further comprises:
   receiving and buffering, by the secondary base station before the first moment, a service sent by the primary base station, when the secondary base station receives, before the second moment, the x data blocks from the buffered service; or
   sending, by the secondary base station, x to the primary base station at the first moment when the secondary base station receives, before the second moment, the x first data blocks from the primary base station.

3. The method according to claim 2, wherein
   when a first condition is met, the secondary base station acquires the x first data blocks from the buffered service, or the secondary base station sends x to the primary base station, wherein
   the first condition comprises: a priority of the UE is higher than a priority of another UE accessing the secondary base station.

4. The method according to claim 3, wherein the first condition further comprises:
   a priority of the service is higher than a priority of a message sent by the secondary base station to the another UE accessing the secondary base station.

5. The method according to claim 1, wherein the delay t of one-time inter-station unidirectional transmission between the secondary base station and the primary base station meets the following formula:

$$t=t1*A+B, \text{ wherein}$$

t1 is a theoretical transmission delay between the primary base station and the secondary base station, A is a constant for adjusting t1, and B is an offset constant of t1, and t is in milliseconds.

6. The method according to claim 1, wherein the method further comprises:
   retransmitting, by the secondary base station, retransmission data to the UE if the feedback comprises a negative acknowledgement (NACK), wherein the retransmission data comprises a data block, in the x first data blocks, corresponding to the NACK;
   determining, by the secondary base station, whether the retransmission fails; and if the secondary base station determines that the retransmission fails, sending, by the secondary base station to the primary base station, information indicating that the retransmission fails and a sequence number corresponding to the retransmission data, wherein the information indicating that the retransmission fails is used to trigger the primary base station to retransmit the retransmission data to the UE.

7. The method according to claim 1, wherein if the secondary base station receives the feedback from the primary base station within a preset period of time and the feedback comprises a negative acknowledgement (NACK), the method further comprises:
retransmitting, by the secondary base station, retransmission data to the UE in an automatic repeat request (ARQ) manner, wherein the retransmission data comprises a data block, in the x first data blocks, corresponding to the NACK.

8. A data transmission method, comprising:
sending, by a secondary base station, an identifier of a first physical uplink control channel (PUCCH) code channel resource to a primary base station at a first moment, so that the primary base station determines to receive, by using the first PUCCH code channel resource, a feedback that is on one or more first data blocks and that is sent by user equipment (UE);
sending, by the secondary base station, the identifier of the first PUCCH code channel resource and the one or more first data blocks to the UE at a second moment; and
receiving, by the secondary base station, the feedback from the primary base station, wherein the feedback is received by the primary base station from the UE by using the first PUCCH code channel resource;
wherein the second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE,
wherein a first hybrid automatic repeat request (HARQ) buffer and a second HARQ buffer are disposed on the secondary base station, and the method further comprises:
if the feedback comprises a negative acknowledgment (NACK) and all HARQ processes in the first HARQ buffer are in a waiting state, retransmitting, by the secondary base station, retransmission data to the UE by using an HARQ process in the second HARQ buffer, wherein the retransmission data comprises a data block, in the one or more first data blocks, corresponding to the NACK.

9. A data transmission method, comprising:
receiving, by a primary base station, a service of a delay insensitive data service type before a first moment;
receiving, by the primary base station from a secondary base station at the first moment, an identifier that is of a first physical uplink control channel (PUCCH) code channel resource and x, wherein x is a quantity of the first data blocks to be sent by the secondary base station to a user equipment (UE) at a second moment;
before the second moment, sending, by the primary base station, the x first data blocks to the secondary base station;
receiving, by the primary base station by using the first PUCCH code channel resource, a feedback sent by the UE, wherein the feedback is a feedback, of the UE, on the x first data blocks sent by the secondary base station at the second moment; and
sending, by the primary base station, the feedback to the secondary base station;
wherein the second moment is later than the first moment, an interval T between the second moment and the first moment is greater than or equal to a delay t of one-time inter-station unidirectional transmission between the secondary base station and the primary base station, the secondary base station serves a secondary component carrier of the UE, and the primary base station serves a primary component carrier of the UE.

10. The method according to claim 9, wherein before the first moment, the method further comprises:
receiving, by the primary base station, a service bearer setup request sent by the UE or a gateway, wherein the service bearer setup request is used to request to set up a service bearer between the UE, the gateway, and the primary base station; and
setting up, by the primary base station, a first Radio Link Control (RLC) layer logical channel and a second RLC layer logical channel, wherein the first RLC layer logical channel is used for transmission between the primary base station and the UE, and the second RLC layer logical channel is used for transmission between the primary base station and the secondary base station.

11. The method according to claim 10, wherein the method further comprises:
receiving, by the primary base station, a service sent by the gateway,
wherein the service of the delay insensitive data service type is included in the service; and
before the second moment, acquiring, by the primary base station, the x first data blocks from the service of the delay insensitive data service type,
wherein the primary base station sends the x first data blocks to the secondary base station by using the second RLC layer logical channel.

12. The method according to claim 10, wherein the method further comprises:
receiving, by the primary base station, a service sent by the gateway;
determining, by the primary base station, a second PUCCH code channel resource, wherein the second PUCCH code channel resource is used by the UE to send a feedback on a second data block to the primary base station; and
sending, by the primary base station, an identifier of the second PUCCH code channel resource and the second data block to the UE by using the first RLC layer logical channel, wherein the second data block is a data block corresponding to the service of the delay sensitive service type which is included in the service.

13. A base station, comprising,
a bus;
a memory configured to store a computer instruction; and
a processor, connected to the memory via the bus, configured to execute the computer instruction to:
determine x before a first moment, wherein x is a quantity of first data blocks to be transmitted from the base station to user equipment (UE) at a second moment;
send an identifier of a first physical uplink control channel (PUCCH) code channel resource to a first base station at the first moment, so that the first base station determines to receive, by using the first PUCCH code channel resource, a feedback that is on the x first data blocks and that is sent by the UE;

receive, before the second moment, the x first data blocks from one of the first base station or from a buffered service;

send the identifier of the first PUCCH code channel resource and the x first data blocks to the UE at the second moment; and receive the feedback from the first base station, wherein the feedback is received by the first base station from the UE by using the first PUCCH code channel resource;

wherein the second moment is later than the first moment, an interval T between the second moment and the first moment is greater than or equal to a delay t of one-time inter-station unidirectional transmission between the base station and the first base station, the base station serves a secondary component carrier of the UE, and the first base station serves a primary component carrier of the UE.

14. The base station according to claim 13, wherein the processor executes the computer instruction to further:

receive and buffer, before the first moment, a service sent by the first base station, when the base station receives, before the second moment, the x data blocks from the buffered service; or send x to the first base station at the first moment when the base station receives, before the second moment, the x first data blocks from the first base station.

15. The base station according to claim 14, wherein the processor executes the computer instruction to:

when a first condition is met, acquire the x first data blocks from the buffered service, or send x to the first base station, wherein the first condition comprises: a priority of the UE is higher than a priority of another UE accessing the base station.

16. The base station according to claim 15, wherein the first condition further comprises:

a priority of the service is higher than a priority of a message sent by the base station to the another UE accessing the base station.

17. The base station according to claim 13, wherein the delay t of one-time inter-station unidirectional transmission between the base station and the first base station meets the following formula:

$$t=t1*A+B, \text{ wherein}$$

t1 is a theoretical transmission delay between the first base station and the base station, A is a constant for adjusting t1, and B is an offset constant of t1, and t is in milliseconds.

18. The base station according to claim 13, wherein the processor executes the computer instruction to further:

retransmit retransmission data to the UE if the feedback comprises a negative acknowledgement (NACK), wherein the retransmission data comprises a data block, in the x first data blocks, corresponding to the NACK;

determine whether the retransmission fails; and if it is determined that the retransmission fails, send, to the first base station, information indicating that the retransmission fails and a sequence number corresponding to the retransmission data, wherein the information indicating that the retransmission fails is used to trigger the first base station to retransmit the retransmission data to the UE.

19. The base station according to claim 13, wherein the processor executes the computer instruction to:

if the base station receives the feedback from the first base station within a preset period of time and the feedback comprises a negative acknowledgement (NACK), retransmit retransmission data to the UE in an automatic repeat request (ARQ) manner, wherein the retransmission data comprises a data block, in the x first data blocks, corresponding to the NACK.

20. A base station, comprising:

a bus;

a memory configured to store a computer instruction, the memory comprising a first hybrid automatic repeat request (HARQ) buffer and a second HARQ buffer; and a processor, connected to the memory via the bus, configured to execute the computer instruction to:

send an identifier of a first physical uplink control channel PUCCH code channel resource to a first base station at a first moment, so that the first base station determines to receive, by using the first PUCCH code channel resource, a feedback that is on one or more first data blocks and that is sent by user equipment UE;

send the identifier of the first PUCCH code channel resource and the one or more first data blocks to the UE at a second moment;

receive the feedback from the first base station, wherein the feedback is received by the first base station from the UE by using the first PUCCH code channel resource;

wherein the second moment is later than the first moment, an interval T between the second moment and the first moment is greater than or equal to a delay t of one-time inter-station unidirectional transmission between the base station and the first base station, the base station serves a secondary component carrier of the UE, and the first base station serves a primary component carrier of the UE; and if the feedback comprises a negative acknowledgment (NACK) and all HARQ processes in the first HARQ buffer are in a waiting state, retransmit retransmission data to the UE by using an HARQ process in the second HARQ buffer, wherein the retransmission data comprises a data block, in the one or more first data blocks, corresponding to the NACK.

21. A base station, comprising:

a bus;

a memory configured to store a computer instruction; and a processor, connected to the memory via the bus, configured to execute the computer instruction to:

receive a service of a delay insensitive data service type before a first moment;

receive, from a second base station at the first moment, an identifier that is of a first physical uplink control channel PUCCH code channel resource and x, wherein x is a quantity of the first data blocks to be sent by a second base station to a user equipment (UE) at a second moment;

before the second moment, send the x first data blocks to the second base station;

receive, by using the first PUCCH code channel resource, a feedback sent by the UE, wherein the feedback is a feedback, of the UE, on the x first data blocks sent by the second base station at the second moment; and send the feedback to the second base station;

wherein the second moment is later than the first moment, an interval T between the second moment and the first moment is greater than or equal to a delay t for performing one-time transmission between the second base station and the base station, the second base station serves a secondary component carrier of the UE, and the base station serves a primary component carrier of the UE.

22. The base station according to claim 21, wherein the processor executes the computer instruction to further:
receive, before the first moment, a service bearer setup request sent by the UE or a gateway, wherein the service bearer setup request is used to request to set up a service bearer between the UE, the gateway, and the base station; and
set up a first Radio Link Control RLC layer logical channel and a second RLC layer logical channel, wherein the first RLC layer logical channel is used for transmission between the base station and the UE, and the second RLC layer logical channel is used for transmission between the base station and the second base station.

23. The base station according to claim 22, wherein the processor executes the computer instruction to further:
receive a service sent by the gateway,
wherein the service of the delay insensitive data service type is included in the service; and
before the second moment, acquire the x first data blocks from the service of the delay insensitive data service type,
wherein the base station sends the x first data blocks to the second base station by using the second RLC layer logical channel.

24. The base station according to claim 22, wherein the processor executes the computer instruction to further:
receive a service sent by the gateway;
determine a second PUCCH code channel resource, wherein the second PUCCH code channel resource is used by the UE to send a feedback on a second data block to the base station; and
send an identifier of the second PUCCH code channel resource and the second data block to the UE by using the first RLC layer logical channel, wherein the second data block is a data block corresponding to the service of the delay sensitive service type in the service.

* * * * *

UNITED STATES PATENT AND TRADEMARK OFFICE
CERTIFICATE OF CORRECTION

PATENT NO. : 10,314,032 B2
APPLICATION NO. : 15/221929
DATED : June 4, 2019
INVENTOR(S) : Anquan Yang et al.

Page 1 of 1

It is certified that error appears in the above-identified patent and that said Letters Patent is hereby corrected as shown below:

In the Claims

Column 58, Line 57:
In Claim 13, after "station," delete "comprising," and insert -- comprising: --, therefor.

Signed and Sealed this
Twenty-sixth Day of November, 2019

Andrei Iancu
*Director of the United States Patent and Trademark Office*